US007653861B2

(12) United States Patent
Kanai et al.

(10) Patent No.: US 7,653,861 B2
(45) Date of Patent: Jan. 26, 2010

(54) ACCESS CONTROL APPARATUS, ACCESS CONTROL SYSTEM, PROCESSOR, ACCESS CONTROL METHOD, MEMORY ACCESS CONTROL APPARATUS, MEMORY ACCESS CONTROL SYSTEM, AND MEMORY ACCESS CONTROL METHOD

(75) Inventors: Tatsunori Kanai, Kanagawa (JP); Kenichiro Yoshii, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 728 days.

(21) Appl. No.: 11/523,003

(22) Filed: Sep. 19, 2006

(65) Prior Publication Data

US 2007/0221724 A1 Sep. 27, 2007

(30) Foreign Application Priority Data

Mar. 22, 2006 (JP) ............................. 2006-079689

(51) Int. Cl.
*H03M 13/00* (2006.01)

(52) U.S. Cl. ........................ 714/758; 714/752; 341/67

(58) Field of Classification Search ................ 714/49, 714/752, 758; 341/67; 370/465, 505
See application file for complete search history.

(56) References Cited

U.S. PATENT DOCUMENTS

| 6,172,626 | B1 * | 1/2001 | McDonnell et al. ............ 341/67 |
| 6,961,877 | B2 * | 11/2005 | Si et al. ........................ 714/49 |
| 2004/0003337 | A1 | 1/2004 | Cypher | |

OTHER PUBLICATIONS

European Search Report issued by the European Patent Office on Feb. 5, 2008, for European Patent Application No. 07004887.1.
Kanai, "Utilizing Error Correcting Code for Access Capability Control in Trusted Memory Systems," IEICE (Aug. 1, 2006), J89-D, English-language abstract only.
Curran et al., "IBM Enterprise System/9000 Type 9121 system controller and memory subsystem design," IBM Journal of Research and Development (May 1991), 35:357-366.
U.S. Appl. No. 11/519,797, filed Sep. 13, 2006, to Kanai et al.
Blahut, "Algebraic Codes for Data Transmission," Cambridge University Press (2003), p. 63.
Hsiao, "A Class of Optimal Minimum Odd-weight-column SEC-DED Codes," IBM J. Res. Develop. (Jul. 1970), pp. 395-401.
z/Architecture, "Principles of Operation," IBM, SA22-7832-00, pp. 3-9 to 3-12, (Dec. 2000).

* cited by examiner

*Primary Examiner*—Sam Rizk
(74) *Attorney, Agent, or Firm*—Finnegan, Henderson, Farabow, Garrett & Dunner, L.L.P.

(57) ABSTRACT

An access control apparatus includes a writer syndrome generator that generates a writer syndrome of writer mask data to mask the parity-added data, the writer syndrome being associated with a writer access ID used when a writer that requests writing of the write data in the memory accesses the memory; a write mask generator that generates the writer mask data based on the writer syndrome, the writer access ID, and a write address in the memory at which the writer writes the write data; a first XOR calculator that obtains first post-operation data by calculating an XOR between the parity-added data and the writer mask data; and a write address converter that converts the write address into another address determined by the writer access ID.

16 Claims, 77 Drawing Sheets

$$G = \begin{pmatrix} \text{[matrix of binary digits]} \end{pmatrix}$$

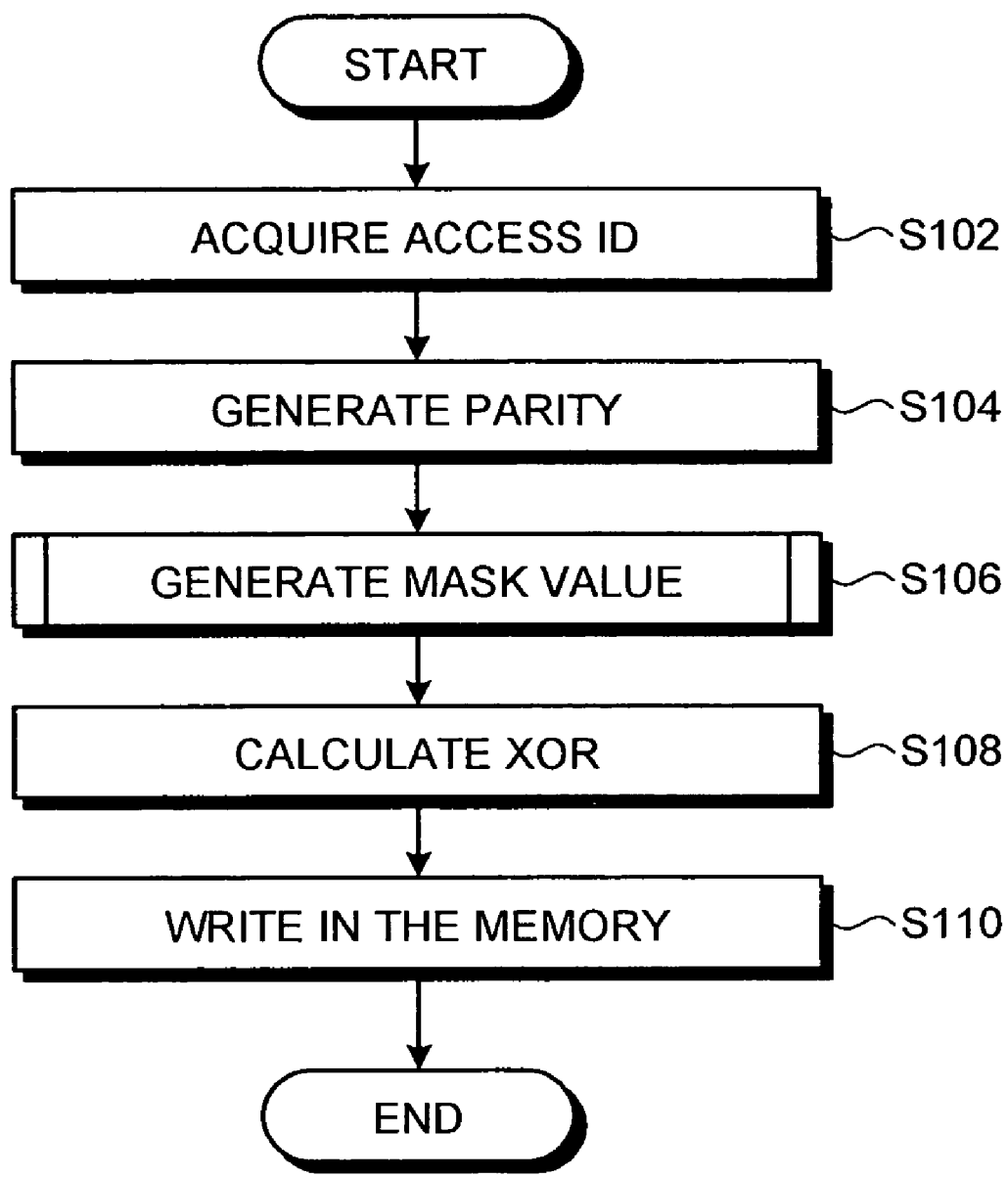

FIG.13

| PROCESS ID | PRIORITY INFORMATION | ACCESS RIGHT INFORMATION | PROGRAM COUNTER | REGISTER SAVING REGION | PAGE TABLE | ACCESS ID INFORMATION |
|---|---|---|---|---|---|---|
| | | | | | | |
| | | | | | | |
| | | | | | | |
| | | | | | | |
| | | | | | | |

| START ADDRESS | END ADDRESS | ACCESS ID |
|---|---|---|
| 00010000 | 0001FFFF | 25 |
| 00020000 | 0002FFFF | 64 |
| 00100000 | 0010FFFF | 103 |
| 00200000 | 0020FFFF | 79 |

FIG.26

| REQUESTOR ID | START ADDRESS | END ADDRESS | ACCESS ID |
|---|---|---|---|
| 0 | 00010000 | 0001FFFF | 25 |
| 0 | 00020000 | 0002FFFF | 64 |
| 1 | 00100000 | 0010FFFF | 103 |
| 1 | 00200000 | 0020FFFF | 79 |
| 1 | 00060000 | 0006FFFF | 83 |
| 2 | 00070000 | 0007FFFF | 95 |
| 3 | 00100000 | 0010FFFF | 103 |
| 3 | 00310000 | 0031FFFF | 62 |

| ACCESS ID | FIRST CHARACTERISTIC POLYNOMIAL COEFFICIENT | FIRST DELAY COEFFICIENT | FIRST INITIAL MASK | SECOND CHARACTERISTIC POLYNOMIAL COEFFICIENT | SECOND DELAY COEFFICIENT | SECOND INITIAL MASK | THIRD CHARACTERISTIC POLYNOMIAL COEFFICIENT | THIRD DELAY COEFFICIENT | THIRD INITIAL MASK |
|---|---|---|---|---|---|---|---|---|---|
| | | | | | | | | | |
| | | | | | | | | | |
| | | | | | | | | | |
| | | | | | | | | | |

1302

⊕ XOR CIRCUIT  ⊙ AND CIRCUIT

FIG.66B

| ADDRESS BEFORE CONVERT | ADDRESS AFTER CONVERT | ADDRESS BEFORE CONVERT | ADDRESS AFTER CONVERT |
|---|---|---|---|
| 1000000 | 0001001 | 1100000 | 0010101 |
| 1000001 | 0001011 | 1100001 | 0010110 |
| 1000010 | 0001000 | 1100010 | 0010111 |
| 1000011 | 0001010 | 1100011 | 0010100 |
| 1000100 | 1110001 | 1100100 | 0101100 |
| 1000101 | 1110010 | 1100101 | 0101111 |
| 1000110 | 1110000 | 1100110 | 0101110 |
| 1000111 | 1110011 | 1100111 | 0101101 |
| 1001000 | 0000001 | 1101000 | 0110100 |
| 1001001 | 0000010 | 1101001 | 0110101 |
| 1001010 | 0000011 | 1101010 | 0110111 |
| 1001011 | 0000000 | 1101011 | 0110110 |
| 1001100 | 0011100 | 1101100 | 0011001 |
| 1001101 | 0011110 | 1101101 | 0011000 |
| 1001110 | 0011111 | 1101110 | 0011011 |
| 1001111 | 0011101 | 1101111 | 0011010 |
| 1010000 | 0110011 | 1110000 | 0111101 |
| 1010001 | 0110010 | 1110001 | 0111110 |
| 1010010 | 0110000 | 1110010 | 0111111 |
| 1010011 | 0110001 | 1110011 | 0111100 |
| 1010100 | 1000001 | 1110100 | 1010000 |
| 1010101 | 1000000 | 1110101 | 1010010 |
| 1010110 | 1000010 | 1110110 | 1010011 |
| 1010111 | 1000011 | 1110111 | 1010001 |
| 1011000 | 1110110 | 1111000 | 0010000 |
| 1011001 | 1110111 | 1111001 | 0010010 |
| 1011010 | 1110100 | 1111010 | 0010001 |
| 1011011 | 1110101 | 1111011 | 0010011 |
| 1011100 | 1111010 | 1111100 | 1010110 |
| 1011101 | 1111001 | 1111101 | 1010111 |
| 1011110 | 1111011 | 1111110 | 1010101 |
| 1011111 | 1111000 | 1111111 | 1010100 |

3rd SECTION      4th SECTION

FIG.68

| ADDRESS a4..a0 | DATA d12..d0 |
|---|---|
| 00000 | 0100011000101 |
| 00001 | 1001000110101 |
| 00010 | 1101011000101 |
| 00011 | 1101110100110 |
| 00100 | 1111110101100 |
| 00101 | 0000110011100 |
| 00110 | 1000100110101 |
| 00111 | 0101010101100 |
| 01000 | 0111011000101 |
| 01001 | 0100110011010 |
| 01010 | 1011001101010 |
| 01011 | 1100010011010 |
| 01100 | 0001101100011 |
| 01101 | 1001110011100 |
| 01110 | 1011110101100 |
| 01111 | 1100110011010 |
| 10000 | 0001001011100 |
| 10001 | 1110001011001 |
| 10010 | 0000001101010 |
| 10011 | 0011101100011 |
| 10100 | 0110011001001 |
| 10101 | 1000000111001 |
| 10110 | 1110111000101 |
| 10111 | 1111010100110 |
| 11000 | 0010101101010 |
| 11001 | 0101101100101 |
| 11010 | 0110100110110 |
| 11011 | 0011000111010 |
| 11100 | 0111101101010 |
| 11101 | 1010001100011 |
| 11110 | 0010001010011 |
| 11111 | 1010111000110 |

FIG.72

| ACCESS ID | FIRST CHARACTE-RISTIC POLYNOMIAL COEFFICIENT | FIRST DELAY COEFFICIENT | FIRST INITIAL MASK | SECOND CHARACTE-RISTIC POLYNOMIAL COEFFICIENT | SECOND DELAY COEFFICIENT | SECOND INITIAL MASK | THIRD CHARACTE-RISTIC POLYNOMIAL COEFFICIENT | THIRD DELAY COEFFICIENT | THIRD INITIAL MASK | ADDRESS CONVERT INFORMATION 1302 |
|---|---|---|---|---|---|---|---|---|---|---|
| | | | | | | | | | | |
| | | | | | | | | | | |
| | | | | | | | | | | |
| | | | | | | | | | | |

ACCESS CONTROL APPARATUS, ACCESS
CONTROL SYSTEM, PROCESSOR, ACCESS
CONTROL METHOD, MEMORY ACCESS
CONTROL APPARATUS, MEMORY ACCESS
CONTROL SYSTEM, AND MEMORY ACCESS
CONTROL METHOD

CROSS-REFERENCE TO RELATED
APPLICATIONS

This application is based upon and claims the benefit of priority from the prior Japanese Patent Applications No. 2006-079689, filed on Mar. 22, 2006; the entire contents of which are incorporated herein by reference.

BACKGROUND OF THE INVENTION

1. Field of the Invention

The present invention relates to an access control apparatus, an access control system, a processor, an access control method, a memory access control apparatus, a memory access control system, and a memory access control method which can control access to a memory.

2. Description of the Related Art

In a recent computer system, a multi-programming system which performs processing while switching a plurality of processes (programs, tasks, or jobs) is used to effectively utilize various resources such as a memory and a CPU in the computer system.

For this reason, data on a memory used in processing is disadvantageously stolen by another process or broken by overwriting.

Therefore, in a conventional technique, as disclosed in z/Architecture Principles of Operation (IBM; SA22-7832-00; December 2000) pp. 3-9 to 3-12, information called a storage key is stored in a memory every predetermined size (for example 4 kB). When a process accesses the memory, a system which compares a key held by the process with the storage key of the memory to be accessed to determine whether the memory is accessible or not.

However, in the above memory protecting system using a storage key, in addition to a memory in which data is to be stored, a memory to store a storage key is required. For this reason, an amount of hardware increases.

A protection unit is a page unit of, e.g., 4 kB. When a user intends to protect small-size data, an unused wasteful memory area is generated. This problem can be solved such that storage keys are associated with smaller memory area units. However, in this case, a larger number of memories are requested to store the storage keys.

Furthermore, when a fault occurs in the memory, the memory can be accessible, and data may be illegally read.

SUMMARY OF THE INVENTION

According to one aspect of the present invention, an access control apparatus to control an access among a writer, a reader, and a memory, includes a parity generator that generates a parity of write data to be written in the memory; a parity adder that adds the parity to the write data to generate parity-added data; a writer syndrome generator that generates a writer syndrome of writer mask data to mask the parity-added data, the writer syndrome being associated with a writer access ID used when the writer accesses the memory, the writer requesting writing of the write data into the memory; a write mask generator that generates the writer mask data based on the writer syndrome, the writer access ID, and a write address in the memory at which the writer writes the write data; a first XOR calculator that obtains first post-operation data by calculating an XOR between the parity-added data and the writer mask data; a write address converter that converts the write address into another address determined by the writer access ID; a write unit that writes the first post-operation data to the address converted by the write address converter; a reader syndrome generator that generates a reader syndrome of reader mask data to mask the first post-operation data, the reader syndrome being associated with a reader access ID used when the reader accesses the memory, the reader requesting reading of data from the memory; a reader mask generator that generates the reader mask data based on the reader syndrome, the reader access ID, and a read address in the memory at which the reader reads the read data from; a read address converter that converts the read address into another address determined based on the reader access ID; a read unit that reads the first post-operation data from the address converted by the read address converter; a second XOR calculator that obtains second post-operation data by calculating an XOR between the reader mask data and the first post-operation data; a data syndrome calculator that calculates an actual data syndrome from the second post-operation data; and an output determining unit that determines whether the second post-operation data is to be output as the read data which is requested by the reader to read, based on the data syndrome.

According to another aspect of the present invention, an access control apparatus to control an access among a writer, a reader, a cache memory, and a memory, includes a read request receiver that acquires a read address from a reader; a cache monitor that determines whether the read address acquired by the read request receiver is stored in the cache memory, where the cache memory stores data requested by the writer or the reader, an address of the data, and a requester access ID used when the writer or the reader capable of accessing the data accesses the memory, the data, the address, and the requester access ID being associated with each other; a reader syndrome generator that generates a reader syndrome of the reader mask data to mask the data stored in the memory, the reader syndrome being associated with the reader access ID used when the reader accesses the memory, when the cache monitor determines that the read address acquired by the read request receiver is not stored in the cache memory; a reader mask generator that generates the reader mask data based on the reader syndrome, the reader access ID, and the read address; a read address converter that converts the address acquired by the read request receiver to another address determined by the reader access ID; a read unit that reads first post-operation data subjected to a predetermined calculation to the data from the address converted by the read address converter; a first XOR calculator that obtains second post-operation data by calculating an XOR between the reader mask data and the first post-operation data read by the read unit; a data syndrome calculator that calculates an actual data syndrome from the second post-operation data; and an output determining unit that determines whether the second post-operation data is output as the data which is requested by the reader to be read, based on the data syndrome.

According to another aspect of the present invention, a n access control system includes a processor; a memory controller; and a memory access control apparatus that controls access to a memory, wherein the memory access control apparatus includes a parity generator that generates a parity of write data to be written in the memory; a parity adder that adds the parity to the write data to generate parity-added data;

a writer syndrome generator that generates a writer syndrome of writer mask data to mask the parity-added data, the writer syndrome being associated with a writer access ID used when a writer accesses the memory, the writer requesting writing of the write data into the memory; a write mask generator that generates the writer mask data based on the writer syndrome, the writer access ID, and a write address in the memory at which the writer writes the write data; a first XOR calculator that obtains first post-operation data by calculating an XOR between the parity-added data and the writer mask data; a write address converter that converts the write address into another address determined by the writer access ID; a write unit that writes the first post-operation data to the address converted by the write address converter; a reader syndrome generator that generates a reader syndrome of reader mask data to mask the first post-operation data, the reader syndrome being associated with a reader access ID used when a reader accesses the memory, the reader requesting reading of data from the memory; a reader mask generator that generates the reader mask data based on the reader syndrome, the reader access ID, and a read address at which the reader data is to be read; a read address converter that converts the read address into another address determined based on the reader access ID; a read unit that reads the first post-operation data from the address converted by the read address converter; a second XOR calculator that obtains second post-operation data by calculating an XOR between the reader mask data and the first post-operation data; a data syndrome calculator that calculates an actual data syndrome from the second post-operation data; and an output determining unit that determines whether the second post-operation data is to be output as the read data which is requested by the reader to read, based on the data syndrome.

According to another aspect of the present invention, a n access control system includes a processor; and a memory access control apparatus that controls access to a memory, wherein the memory access control apparatus includes: a parity generator that generates a parity of write data to be written in the memory; a parity adder that adds the parity generated by the parity generator to the write data to generate parity-added data; a writer syndrome generator that generates a writer syndrome of writer mask data to mask the parity-added data, the writer syndrome being associated with a writer access ID used when a writer accesses the memory, the writer requesting writing of the write data into the memory; a write mask generator that generates the writer mask data based on the writer syndrome, the writer access ID, and a write address in the memory at which the writer writes the write data; a first XOR calculator that obtains first post-operation data by calculating an XOR between the parity-added data and the writer mask data; a write address converter that converts the write address into another address determined by the writer access ID; a write unit that writes the first post-operation data to the address converted by the write address converter; a reader syndrome generator that generates a reader syndrome of reader mask data to mask the first post-operation data, the reader syndrome being associated with a reader access ID used when a reader accesses the memory, the reader requesting reading of data from the memory; a reader mask generator that generates the reader mask data based on the reader syndrome, the reader access ID, and a read address at which the reader data is to be read; a read address converter that converts the read address into another address determined based on the reader access ID; a read unit that reads the first post-operation data from the address converted by the read address converter; a second XOR calculator that obtains second post-operation data by calculating an XOR between the reader mask data and the first post-operation data; a data syndrome calculator that calculates an actual data syndrome from the second post-operation data; and an output determining unit that determines whether the second post-operation data is to be output as the read data which is requested by the reader to read, based on the data syndrome.

According to another aspect of the present invention, a n access control system includes a processor; a memory controller; and a memory access control apparatus that controls access to a memory, wherein the memory access control apparatus includes a read request receiver that acquires data to be read from the memory, and a read address of the data from a reader which requests read out of data from the memory; a cache monitor that determines whether the read address acquired by the read request receiver is stored in a cache memory, where the cache memory stores data requested by a writer which requests data to be written in the memory or the reader, an address of the data, and a requester access ID used when the writer or the reader capable of accessing the data accesses the memory, the data, the address, and the requester access ID being associated with each other; a reader syndrome generator that generates a reader syndrome of the reader mask data to mask the data stored in the memory, the reader syndrome being associated with the reader access ID used when the reader accesses the memory, when the cache monitoring unit determines that the read address acquired by the read request receiver is not stored in the cache memory; a reader mask generator that generates the reader mask data based on the reader syndrome, the reader access ID, and the read address; a read address converter that converts the address acquired by the read request receiver to another address determined by the reader access ID; a read unit that reads first post-operation data subjected to a predetermined calculation to the data from the address converted by the read address converter; a first XOR calculator that obtains second post-operation data by calculating an XOR between the reader mask data and the first post-operation data read by the read unit; a data syndrome calculator that calculates an actual data syndrome from the second post-operation data; and an output determining unit that determines whether the second post-operation data is output as the data which is requested by the reader to be read, based on the data syndrome.

According to another aspect of the present invention, a n access control system includes a processor; and a memory access control apparatus that controls access to a memory, wherein the memory access control apparatus includes a read request receiver that acquires data to be read from the memory, and a read address of the data from a reader which requests read out of data from the memory; a cache monitor that determines whether the read address acquired by the read request receiver is stored in a cache memory, where the cache memory stores data requested by a writer which requests data to be written in the memory or the reader, a address of the data, and a requester access ID used when the writer or the reader capable of accessing the data accesses the memory, the data, the address, and the requester access ID being associated with each other; a reader syndrome generator that generates a reader syndrome of the reader mask data to mask the data stored in the memory, the reader syndrome being associated with the reader access ID used when the reader accesses the memory, when the cache monitoring unit determines that the read address acquired by the read request receiver is not stored in the cache memory; a reader mask generator that generates the reader mask data based on the reader syndrome, the reader access ID, and the read address;

a read address converter that converts the address acquired by the read request receiver to another address determined by the reader access ID; a read unit that reads first post-operation data subjected to a predetermined calculation to the data from the address converted by the read address converter; a first XOR calculator that obtains second post-operation data by calculating an XOR between the reader mask data and the first post-operation data read by the read unit; a data syndrome calculator that calculates an actual data syndrome from the second post-operation data; and an output determining unit that determines whether the second post-operation data is output as the data which is requested by the reader to be read, based on the data syndrome.

According to another aspect of the present invention, a processor includes a memory controller; and a memory access control apparatus that controls access to a memory, wherein the memory access control apparatus includes a parity generator that generates a parity of write data to be written in the memory; a parity adder that adds the parity generated by the parity generator to the write data to generate parity-added data; a writer syndrome generator that generates a writer syndrome of writer mask data to mask the parity-added data, the writer syndrome being associated with a writer access ID used when a writer accesses the memory, the writer requesting writing of the write data into the memory; a write mask generator that generates the writer mask data based on the writer syndrome, the writer access ID, and a write address in the memory at which the writer writes the write data; a first XOR calculator that obtains first post-operation data by calculating an XOR between the parity-added data and the writer mask data; a write address converter that converts the write address into another address determined by the writer access ID; a write unit that writes the first post-operation data to the address converted by the write address converter; a reader syndrome generator that generates a reader syndrome of reader mask data to mask the first post-operation data, the reader syndrome being associated with a reader access ID used when a reader accesses the memory, the reader requesting reading of data from the memory; a reader mask generator that generates the reader mask data based on the reader syndrome, the reader access ID, and a read address at which the reader data is to be read; a read address converter that converts the read address into another address determined based on the reader access ID; a read unit that reads the first post-operation data from the address converted by the read address converter; a second XOR calculator that obtains second post-operation data by calculating an XOR between the reader mask data and the first post-operation data; a data syndrome calculator that calculates an actual data syndrome from the second post-operation data; and an output determining unit that determines whether the second post-operation data is to be output as the read data which is requested by the reader to read, based on the data syndrome.

According to another aspect of the present invention, a n access control method to control an access among a writer, a reader, and a memory, includes generating a parity of write data to be written in the memory; adding the parity generated to the write data to generate parity-added data; generating a writer syndrome of writer mask data to mask the parity-added data, the writer syndrome being associated with a writer access ID used when the writer accesses the memory, the writer requesting writing of the write data into the memory; generating the writer mask data based on the writer syndrome, the writer access ID, and a write address in the memory at which the writer writes the write data; obtaining first post-operation data by calculating an XOR between the parity-added data and the writer mask data; converting the write address into another address determined by the writer access ID; writing the first post-operation data to the address converted; generating a reader syndrome of reader mask data to mask the first post-operation data, the reader syndrome being associated with a reader access ID used when the reader accesses the memory, the reader requesting reading of data from the memory; generating the reader mask data based on the reader syndrome, the reader access ID, and a read address at which the reader data is to be read; converting the read address into another address determined based on the reader access ID; reading the first post-operation data from the address converted; obtaining second post-operation data by calculating an XOR between the reader mask data and the first post-operation data; calculating an actual data syndrome from the second post-operation data; and determining whether the second post-operation data is to be output as the read data which is requested by the reader to read, based on the data syndrome.

According to another aspect of the present invention, a memory access control method to control an access among a writer, a reader, and a memory, includes acquiring data to be read from the memory, and a read address of the data from the reader which requests read out of data from the memory; determining whether the read address is stored in a cache memory, where the cache memory stores data requested by the writer which requests data to be written in the memory or the reader, a address of the data, and a requester access ID used when the writer or the reader capable of accessing the data accesses the memory, the data, the address, and the requester access ID being associated with each other; generating a reader syndrome of the reader mask data to mask the data stored in the memory, the reader syndrome being associated with the reader access ID used when the reader accesses the memory, when the read address is determined not to be stored in the cache memory; generating the reader mask data based on the reader syndrome, the reader access ID, and the read address; converting the address to another address determined by the reader access ID; reading first post-operation data subjected to a predetermined calculation to the data from the address converted; obtaining second post-operation data by calculating an XOR between the reader mask data and the first post-operation data; calculating an actual data syndrome from the second post-operation data; and determining whether the second post-operation data is output as the data which is requested by the reader to be read, based on the data syndrome.

BRIEF DESCRIPTION OF THE DRAWINGS

FIG. 4 is a diagram showing an example of an check matrix H of a SEC-DED code of Hsiao when a data length is 64 bits;

FIG. 5 is a diagram showing a generator matrix G corresponding to the check matrix H shown in FIG. 4;

FIG. 11 is a flow chart showing a write process included in an access control process in the access control system;

FIG. 13 is a diagram showing a process management table used in an access ID setting process;

FIG. 26 is a diagram schematically showing a data configuration of an access ID table according to a fourth embodiment;

FIG. 30 is a diagram schematically showing a data configuration of a data mask generation information table;

FIG. 66B is a diagram for explaining the address converting process performed by the address converting device;

FIG. 68 is a diagram showing an address converting table which realizes address conversion shown in FIGS. 66A and 66B;

FIG. 72 is a diagram schematically showing a data configuration of a data mask generation information table according to a second modification of the tenth embodiment;

DETAILED DESCRIPTION OF THE PREFERRED EMBODIMENTS

Embodiments of an access control apparatus, an access control system, a processor, an access control method, a memory access control apparatus, a memory access control system, and a memory access control method according to the present invention will be described below in detail with reference to the accompanying drawings. The present invention is not limited to the embodiments.

First Embodiment

Figure 1:
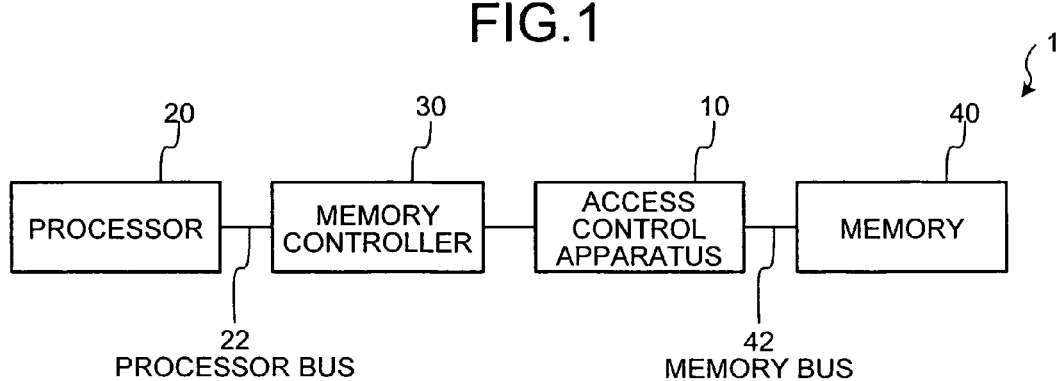
FIG. 1 is a diagram showing an entire configuration of an access control system according to a first embodiment of the present invention.

FIG. 1 is a diagram showing an entire configuration of an access control system 1 according to a first embodiment. The access control system 1 includes an access control apparatus 10, a processor 20, a memory controller 30, and a memory 40.

The processor 20 and the memory 40 are connected to each other by the memory controller 30 and the access control apparatus 10. The memory controller 30 serves to absorb a difference between a protocol of a processor bus 22 (signal line directly extended from the processor) and a protocol of a memory bus 42. More specifically, the memory controller 30 absorbs a difference between a signal for reading/writing data output from the processor 20 to a processor bus 22 and a signal to be read from or written in the memory 40.

For example, when the memory 40 is a DRAM, it is necessary to divide an address into an upper address and a lower address to give the upper and lower addresses to the memory 40 when the processor 20 designates an address to request to read data. The memory controller 30 converts a difference between addressing procedures of the processor and the DRAM.

The access control apparatus 10 is connected between the memory controller 30 and the memory 40. When data is read from the memory 40, it is determined whether a reader of the data has an access authority. Information related to the access authority is set in the access control apparatus 10 by the processor 20 through the memory controller 30. More specifically, information such as an access ID (will be described later) is set.

The access control apparatus 10 has a function of ECC (Error Correcting Code or Error Control Code). More specifically, the access control device 10 adds an ECC to data to be written by the processor 20 into the memory 40. The access control apparatus 10 performs ECC check of the ECC-added data read from the memory 40. Since the ECC is used, a unit for access control, i.e., protection for the memory 40 is 32 bits or 64 bits equal to that of the ECC. More specifically, the memory 40 can be protected in small units.

Request sources (requesters) of memory data access the access authority of which is managed by the access control apparatus 10, i.e., a reader and a writer of data are processes managed in the processor 20.

Figure 2:
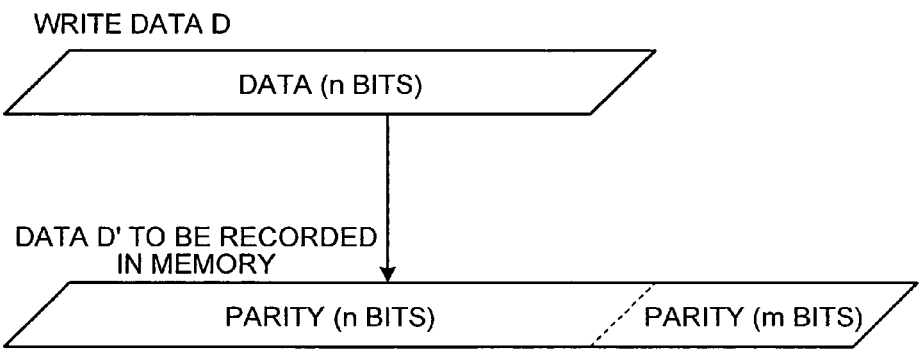
FIG. 2 is a diagram for explaining a process performed when data is written in a memory.
Figure 3:
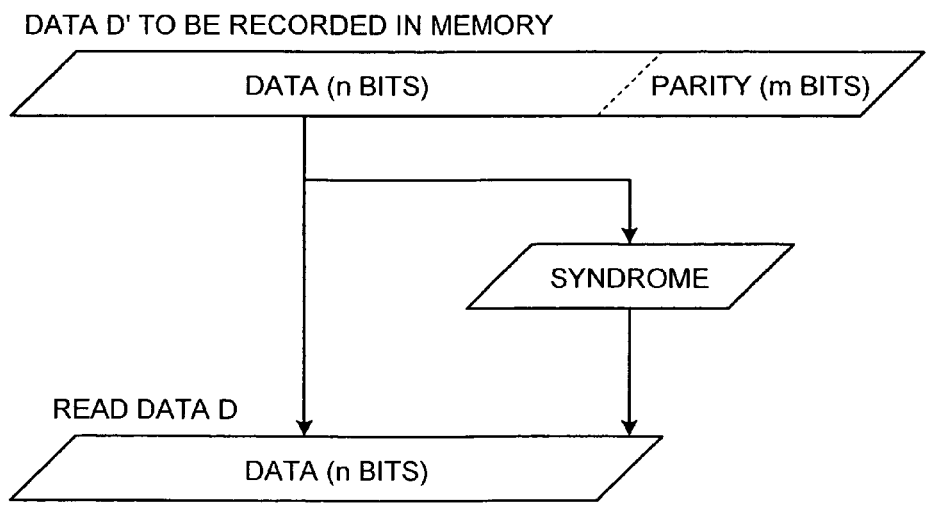
FIG. 3 is a diagram for explaining a process performed when data D' is read out.

Here, the ECC will be described below. FIGS. 2 and 3 are diagrams for explaining the ECC. FIG. 2 is a diagram for explaining a process performed when data is written in the memory 40. In general, as shown in FIG. 2, to data D which has a size of n bits and which is to be read from or written in the memory 40 at once, an m-bit parity calculated from the value of the data is added. An (n+m)-bit data D' is written in the memory 40.

For example, to data which has a size of 64 (=n) bits and which is to be read from and written in the memory 40 at once, an 8 (=m) bit parity calculated from the value of the data is added. A 72-bit-parity-added data is written in the memory 40.

FIG. 3 is a diagram for explaining a process performed when data D' is read. When data D' is read from the memory 40, an m-bit value is calculated by a product of the data D' and a transposed matrix of a check matrix "H". The m-bit value is called a syndrome. A syndrome of "0" means that a value of n-bit data is free from an error.

A syndrome which is not "0" means that an error is present. When error correction is possible, the error is corrected. When an error is present and cannot be corrected, the processor 20 serving as a requester of memory data access is notified by means for interruption or the like that the error occurs.

The ECC includes various systems. The various systems have the different numbers of bits of parities, different methods of calculating the numbers of parity bits, different check matrixes for calculating syndromes, and different methods of calculating bit positions for error correction from syndromes or the like.

An SEC-DED code (single-error correction double-error detection code) is popularly used in a memory of a computer system. The SEC-DED code can specify an error position when data or a parity thereof includes a 1-bit error (also called a single error). When the data or the parity thereof includes a 2-bit error (also called a double error), a position cannot be specified, but the presence of an error can be detected. In general, as an ECC, a 7-bit parity is added to 32-bit data, an 8-bit parity is added to 64-bit data, and a 9-bit parity is added to 128-bit data.

There are also various types of SEC-DED codes, depending on methods of calculating the parities of the codes and methods of forming check matrixes. Of the SEC-DED codes of various types, an extended humming code and a code of Hsiao are popularly used. In particular, the SEC-DED code of Hsiao has properties which are good for mounting a circuit and is popularly used. The extended humming code is described in Algebraic Code for Data Transmission; Richard E. Blahut, 2003, Cambridge University Press, p. 63. The code of Hsiao is described in A Class of Optimal Minimum Odd-weight-column SEC-DED Codes; M. Y. Hsiao, IBM Journal of Research and Development, July 1970, pp. 395 to 401. The SEC-DED codes of two types have different methods of interpreting values of syndromes, but have equal error correction/detection capabilities.

In the access control system 1 according to the first embodiment, it is assumed that an Hsiao code which adds an 8-bit parity to 64-bit data. However, the data length is not limited to the length in the assumption. Access control can be similarly performed to data having various lengths such as 32 bits, 16 bits, and 128 bits. Furthermore, when, for example, other SEC-DED codes such as an extended humming code or another error correction code are used, the same access control as that in the above description can be performed.

Figure 4:
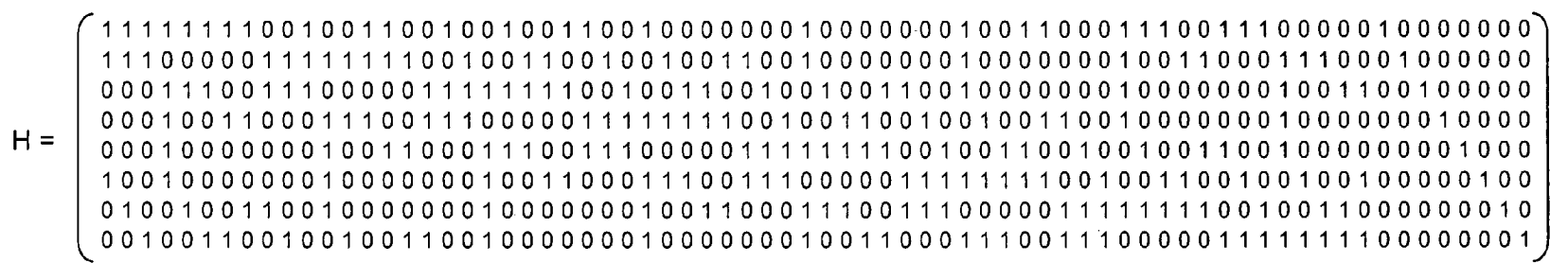

FIG. 4 is a diagram showing an example of a check matrix "H" of a SEC-DED code of Hsiao obtained when a data length is 64 bits. The check matrix "H" is a matrix in 8 rows and 72 columns. Sixty-four columns from the left correspond to bit positions of data of a 64-bit memory, and 8 remaining right columns correspond to bits of a parity. The 8 columns corresponding to the parity is an 8×8 unit matrix.

FIG. 5 is a diagram showing a generator matrix "G" corresponding to the check matrix "H" shown in FIG. 4. The generator matrix "G" is used to calculate a parity to original data to which no parity is added. The generator matrix "G" is a matrix in 64 rows and 72 columns. The left 64 columns constitute a 64×64 unit matrix. The 8 remaining right columns constitute a 64-column transposed matrix on the left of the generator matrix "G".

Figure 6:
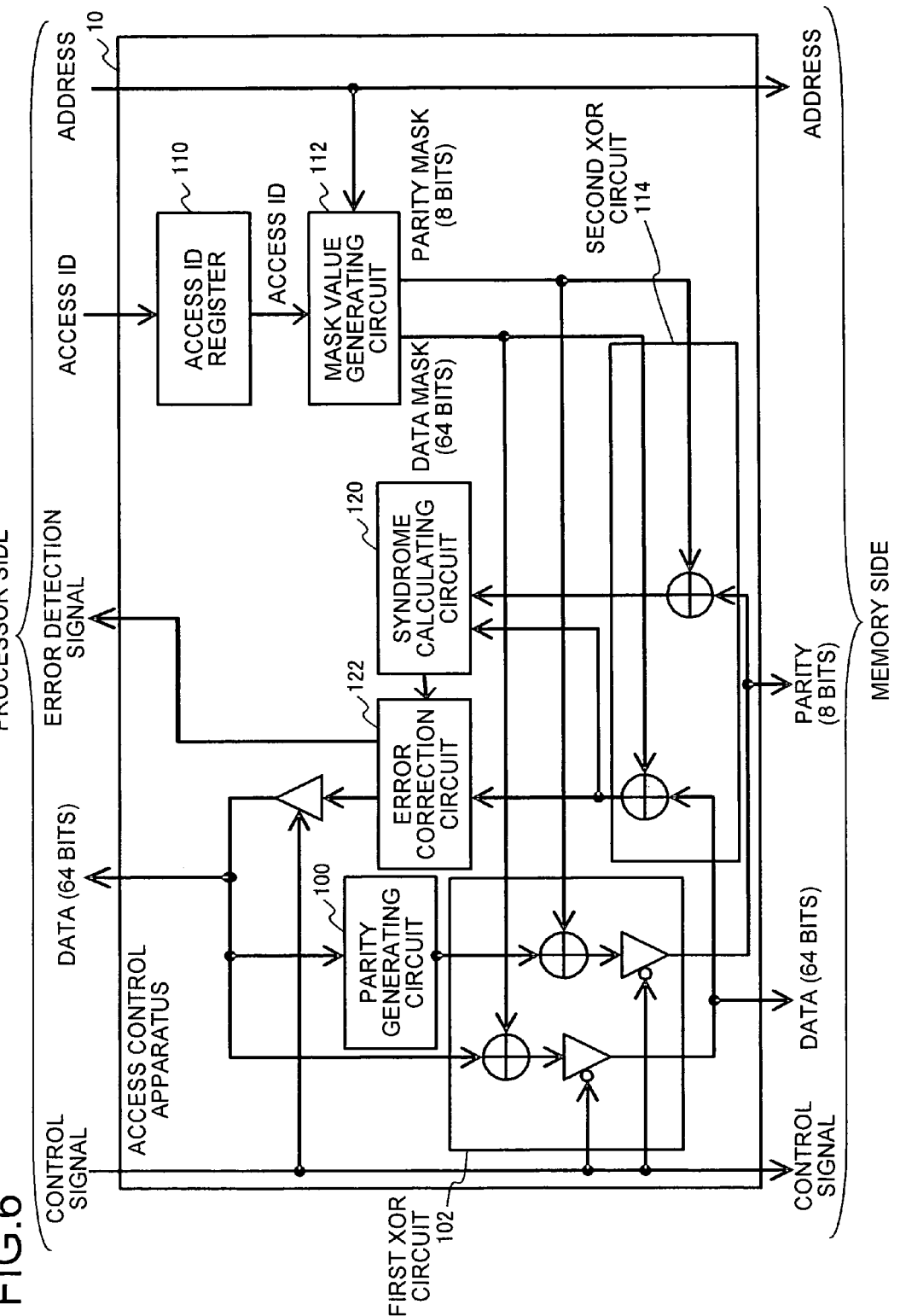
FIG. 6 is a block diagram showing a detailed functional configuration of an access control apparatus.

FIG. 6 is a block diagram showing a detailed functional configuration of the access control apparatus 10. The access control apparatus 10 includes a parity generating circuit 100, a first XOR circuit 102, an access ID register 110, a mask value generating circuit 112, a second XOR circuit 114, a syndrome calculating circuit 120, and an error correction circuit 122.

The access control apparatus 10 includes, in addition to a conventional ECC circuit, a circuit which forms a mask value for checking access authority, records data with a parity in the memory 40, and checks access authority to data read from the memory 40 by using the mask value. Circuits except for the first XOR circuit 102, the access ID register 110, the mask value generating circuit 112, and the second XOR circuit 114 are the same as those in a conventional ECC circuit.

When the memory controller 30 to which the access control apparatus 10 is connected includes an ECC circuit, the ECC circuit of the memory controller 30 may be used without giving the functions of the ECC circuit to the access control apparatus 10.

The parity generating circuit 100 generates a parity for data acquired from the processor 20 through the memory controller 30. The parity is added to the data acquired from the processor 20.

More specifically, 64-bit data is acquired from the processor 20 through the memory controller 30. An 8-bit parity is calculated from the acquired data to output the data to the first XOR circuit 102. This calculation is performed by using a generator matrix "G" explained with reference to FIG. 5.

It is assumed that 64-bit input data "d" is expressed as 64-element vector as expressed in Equation 1 and that a code word "x" added with an 8-bit parity corresponding to the data "d" is expressed as a 72-element vector as expressed in Equation 2.

$$d=(d1, d2, d3, \ldots, d64) \qquad \text{(Equation 1)}$$

$$x=(d1, d2, d3, \ldots, d64, p1, p2, \ldots, p8) \qquad \text{(Equation 2)}$$

In this case, the code word (data with parity) "x", the generator matrix "G", and the data "d" have a relationship expressed by Equation 3.

$$x=dG \qquad \text{(Equation 3)}$$

More specifically, 64-bit data is multiplied by the generator matrix "G" to make it possible to calculate the code word "x". The final eight elements of the calculated code word "x" are output as an 8-bit parity.

It is well known that the parity generating circuit 100 can be realized as a combination circuit which calculates a parity by a product of the vector and the matrix explained here.

The access ID register 110 acquires an access ID from the processor 20 through the memory controller 30. In this case, the access ID is information used when a process serving as a requester of data access to the memory 40 accesses the memory 40. In the embodiment, since an 8-bit parity is added to 64-bit data, access IDs of 128 types can be managed. For example, 7-bit numbers 0 to 127 serve as access IDs.

When a process operated on the processor 20 accesses the memory 40, an access ID is set in the access ID register 110 of the access control apparatus 10.

Figure 7:
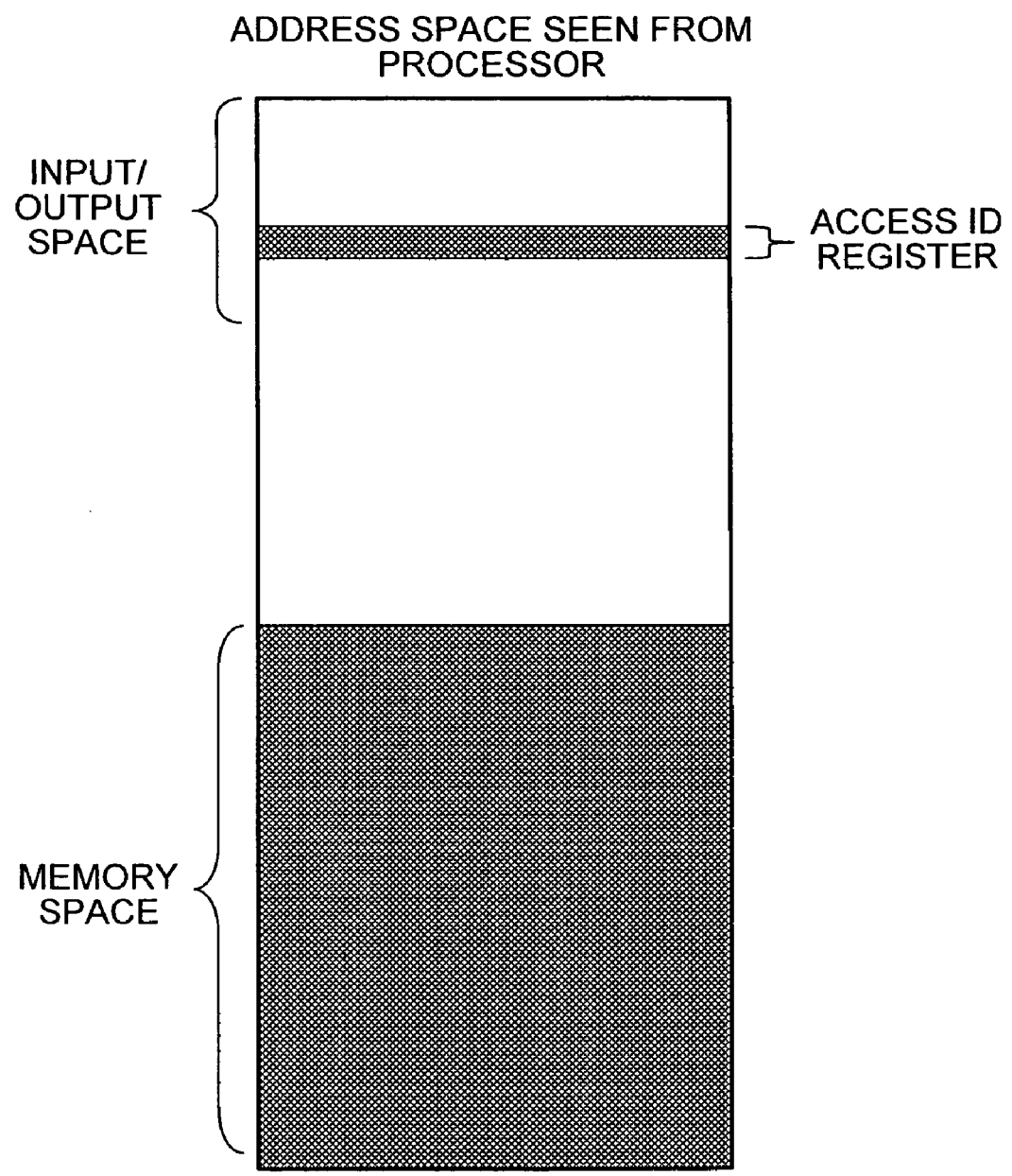
FIG. 7 is a diagram showing an address space viewed from a processor.

FIG. 7 is a diagram showing an address space viewed from the processor 20. As shown in FIG. 7, the access ID register 110 of the access control apparatus 10 is mapped in an input/output space in an address space which can be viewed from the processor 20. When the processor 20 writes an access ID at an address where the access ID register 110 is mapped in the input/output space, the written access ID is written in the access ID register 110. A means which sets an access ID in the access ID register 110 is not limited to the above means.

When an arbitrary program executed on the processor 20 is designed to make it possible to set an arbitrary ID, an access authority cannot be protected. It is desired that the access ID is set by a means such as an OS operated on the processor 20 or hardware authentication. In this manner, only when an in-execution program has an access authority, the access ID of the program can be set in the access ID register 110. In this case, the access ID register 110 functions as a writer access ID receiver and a reader access ID receiver.

The explanation is returned to FIG. 6. The mask value generating circuit 112 generates a mask value on the basis of an access ID held by the access ID register 110 and an address value of the memory 40 to which the processor 20 must access. A mask value is the data for masking the data to be written into the memory 40 or the data to be read from the memory 40, and can be uniquely determined from the access ID and the address of the memory 40 to be accessed. The mask value generating circuit 112 according to this embodiment functions as a write mask generator and a reader mask generator.

The first XOR circuit 102 calculates an "XOR" (exclusive OR) between data to be written in the memory 40 and a parity generated from the data, and a mask value when data is written in the memory 40. Combinations of the resultant values are written in the memory 40. More specifically, the mask value generated by the mask value generating circuit 112 is written to overlap the data and the parity. This value is referred to as first post-operation data.

The second XOR circuit 114 cancels the mask value by calculating an "XOR" between the data read from the memory 40 and the mask value when the data is read from the memory 40.

The syndrome calculating circuit 120 calculates a syndrome on the basis of the calculation result of the second XOR circuit 114. The error correction circuit 122 properly performs error correction depending on the value of the syndrome calculated by the syndrome calculating circuit 120.

In this case, processes in the syndrome calculating circuit 120 and the error correction circuit 122 will be described in detail. From data with parity read from the memory 40, a syndrome is calculated to detect and correct an error. More specifically, the syndrome calculating circuit 120 acquires 64-bit data read from the memory 40 and an 8-bit parity added to the data. By using the check matrix "H", an 8-bit syndrome is calculated from the 64-bit data and the 8-bit parity. The syndrome is output to the error correction circuit 122.

It is assumed that an 8-bit syndrome "s" is expressed as Equation 4 and that a vector "x" composed of 64-bit data serving as an input and an 8-bit parity is expressed as Equation 5.

$$s=(s1, s2, \ldots, s8) \quad \text{(Equation 4)}$$

$$x=(d1, d2, d3, \ldots, d64, p1, p2, \ldots, p8) \quad \text{(Equation 5)}$$

In this case, the syndrome "s" can be calculated from the vector "x" and the check matrix "H" as expressed by Equation 6.

$$s=xH^T \quad \text{(Equation 6)}$$

where $H^T$ represents a transposed matrix "H" of the check matrix "H". In this manner, the syndrome calculating circuit 120 calculates and outputs an 8-bit syndrome.

When the SEC-DED code has no error, the value of the syndrome becomes "0". When the SEC-DED code has one error, the syndrome has a value equal to elements of columns of the check matrix "H" corresponding to an erroneous bit position. When the syndrome is not "0", the columns included in the check matrix "H" includes a column vector having a value equal to that of the syndrome, the bit position corresponding to the column is erroneous. In this case, 1 bit in the data or parity corresponding to the bit position is inverted, thereby the error can be corrected.

When the syndrome has a non-zero value, and when a column vector of the check matrix "H" having a value equal to that of the syndrome does not exist, an uncorrectable error occurs. More specifically, an error of two or more bits occurs.

In a code of Hsiao, in each column of the check matrix of the code, the number of elements each having a value "1" is an odd number. According to the properties, the code has the following properties. That is, the number of values "1" in a syndrome when an error of an odd-number of bits occurs is necessarily an odd number, and the number of values "1" in the syndrome when an error of an even-number of bits occurs is necessarily an even number.

When an error of two bits occurs, the number of values "1" in the syndrome in the code of Hsiao is necessarily an even number which is not 0. For this reason, a double error can be necessarily detected. When an error of an odd-number of bits which are three or more bits, the number of values "1" in the syndrome is necessarily an odd number. However, in this case, the syndrome may not be discriminated from the syndrome in case of single error. As a result, when the syndrome is the same as the syndrome of a 1-bit error, the detection result shows only one error bit and incorrect correction acts, otherwise, the error is detected as an uncorrectable error.

When an error of an even-number of bits which are 4 or more bits occurs, the number of values "1" in the syndrome is necessarily an even number. However, the number of values "1" may be zero. When the number is zero, it is determined that no error occurs, otherwise, the error is detected as an uncorrectable error. When a normal SEC-DED code is used, the SEC-DED code is used on the assumption that up to a double error occurs.

Even though an error occurs in a parity part of a general SEC-DED code, the parity part can be corrected. In the embodiment, a value obtained after the parity part is corrected is not used, error correction is not performed on the parity part. As another example, the parity part may be corrected.

Figure 8:
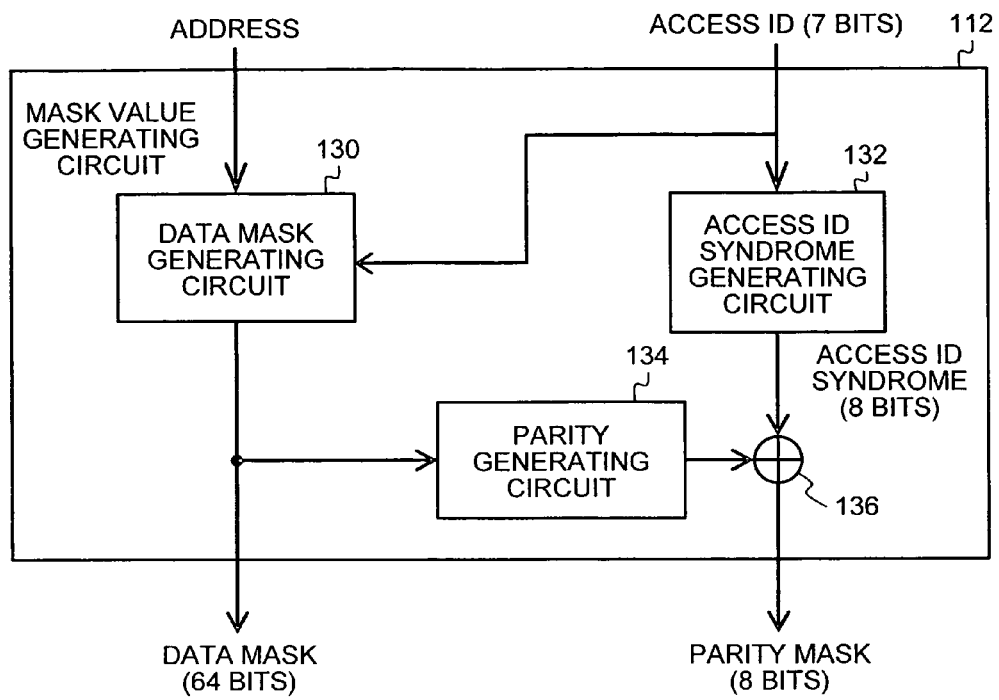
FIG. 8 is a block diagram showing a detailed functional configuration of a mask value generating circuit.

FIG. 8 is a block diagram showing a detailed functional configuration of the mask value generating circuit 112. The mask value generating circuit 112 generates such a mask value that a syndrome to a mask generated from the acquired access ID has a predetermined value.

The mask value generating circuit 112 has a data mask generating circuit 130, an access ID syndrome generating circuit 132, a parity generating circuit 134, and an XOR circuit 136.

Figure 9:
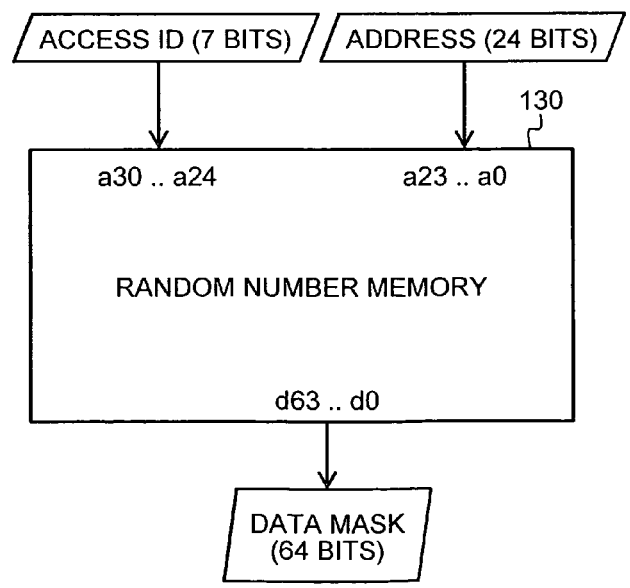
FIG. 9 is a diagram showing a concrete configuration of a data mask generating circuit.

FIG. 9 is a diagram showing a concrete configuration of the data mask generating circuit 130. The data mask generating circuit 130 uses, as inputs, an address and an access ID of the memory 40 which the data mask generating circuit 130 desires to access, and outputs a mask for 64-bit data corresponding to the two values, i.e., a data mask. More specifically, the data mask generating circuit 130 is a random-number memory as shown in FIG. 9. The random-number memory is constituted by a normal memory element.

In the random-number memory, random values are written. The access ID and the address are connected to an address terminal of the random-number memory. In this manner, random values corresponding to the access ID and the address are output from a data terminal of the random-number memory as data mask values.

It is satisfied that the data mask generating circuit 130 can output a value uniquely determined by the address and the access ID. A configuration therefor is not limited to the embodiment. The data mask generating circuit 130 functions as a writer data mask generator and the reader data mask generator.

Figure 10A:
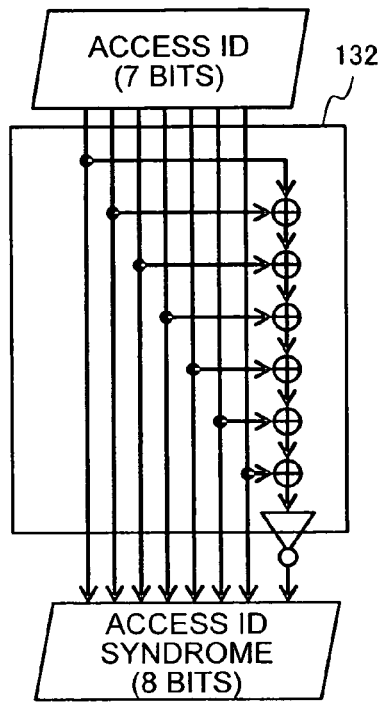
FIG. 10A is a diagram showing an access ID syndrome generating circuit.

FIG. 10A is a diagram showing the access ID syndrome generating circuit 132. The access ID syndrome generating circuit 132 determines a syndrome of a parity to be generated by the acquired access ID. More specifically, as described above, the syndrome is constituted as shown in FIG. 10A such that all the numbers of values "1" in the syndrome are uniformly odd numbers as described above.

Figure 10B:
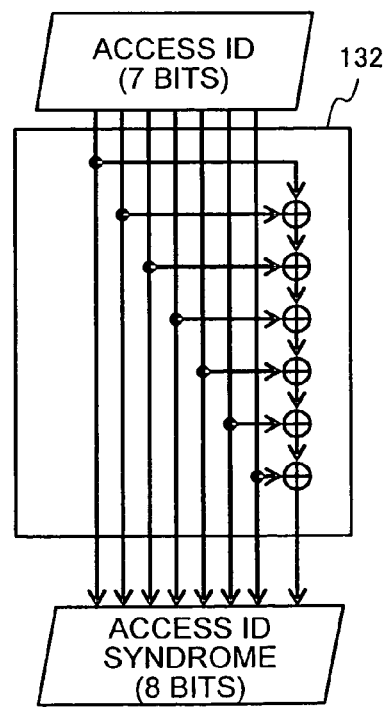
FIG. 10B is a diagram showing the access ID syndrome generating circuit.

When all the numbers of values "1" in the syndrome are uniformly even numbers, the syndrome is constituted as shown in FIG. 10B. The number of values "1" in the syndrome generated by the access ID syndrome generating circuit 132 will be described later.

The access ID syndrome generating circuit 132 functions as a writer syndrome generator which generates a writer syndrome of writer mask data and a reader syndrome generator which generates a reader syndrome of reader mask data.

The parity generating circuit 134 calculates a parity of a data mask generated by the data mask generating circuit 130. The XOR circuit 136 outputs an "XOR" between the parity generated by the parity generating circuit 134 and the access ID syndrome generated by the access ID syndrome generating circuit 132 as a mask for a parity, i.e., a parity mask. The XOR circuit 136 functions as a writer parity mask generator and a reader parity mask generator.

In general, arbitrary data and a syndrome of a parity calculated from the data become zero. However, when a syndrome is calculated by using a value obtained by calculating an "XOR" between the parity and an arbitrary value "x" as a new parity, the syndrome becomes "x".

This is because the portion in the check matrix "H" corresponding to a parity is a unit matrix. Utilizing the above characteristics, such a parity mask is generated as to obtain the access ID syndrome generated by the access ID syndrome generating circuit 132 with respect to the data mask generated by the data mask generating circuit 130.

FIG. 11 is a flow chart showing a write process included in an access control process in the access control system 1. First, an access ID is acquired from the access ID register 110 (step S102). The parity generating circuit 100 generates a parity and adds the parity to data to be written in the memory 40 (step S104). The mask value generating circuit 112 generates a mask value (step S106). More specifically, the mask value generating circuit 112 generates a data mask and a parity mask.

The first XOR circuit 102 then calculates an "XOR" between the data, the parity, and the mask generated by the mask value generating circuit 112 (step S108). More specifically, an "XOR" between the data acquired from the processor 20 and the data mask generated by the mask value generating circuit 112 is calculated. Furthermore, an "XOR" between the parity generated by the parity generating circuit 100 and the parity mask generated by the mask value generating circuit 112 is calculated. The first post-operation data obtained by the first XOR circuit 102 is written in the memory 40 (step S110). The writing operation then comes to an end.

Figure 12:
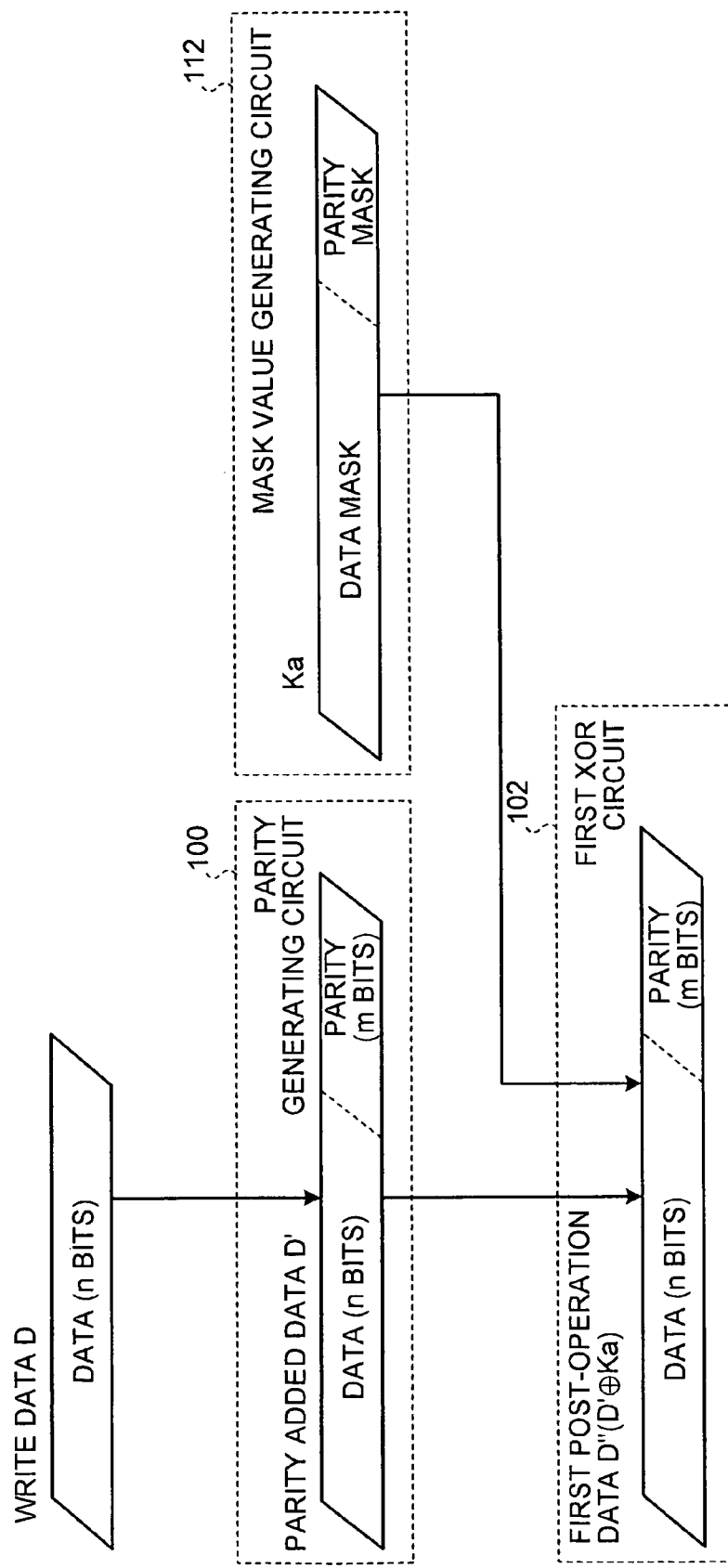
FIG. 12 is a flow chart showing a flow of data in the write process.

FIG. 12 is a flow chart showing a flow of data in the write process. When a process in operation is to write data D in the memory 40, a parity is added to the data D by virtue of an ECC, so as to form parity added data D'.

Next, an "XOR" between the parity added data D' and a mask value "Ka" generated by the mask value generating circuit 112:

$$D' \oplus Ka$$

which is the first post-operation data D", is written in the memory 40.

Here, detailed processes in an access ID setting process which sets information related to an access ID in the access control apparatus 10 will be described below. FIG. 13 is a diagram showing a process management table used in the access ID setting process. The process management table is held by an operating system (OS). When a plurality of processes are executed on the processor 20, the OS generally manages these processes. At this time, the process management table shown in FIG. 13 is used.

The process management table records priority information, access right information, a program counter, a saving area for registers, and a pointer to a page table associated with the process ID. Furthermore, access ID information is recorded associated with the process ID. Information managed by the process management table depends on OSs and is not limited to the embodiment.

Figure 14:
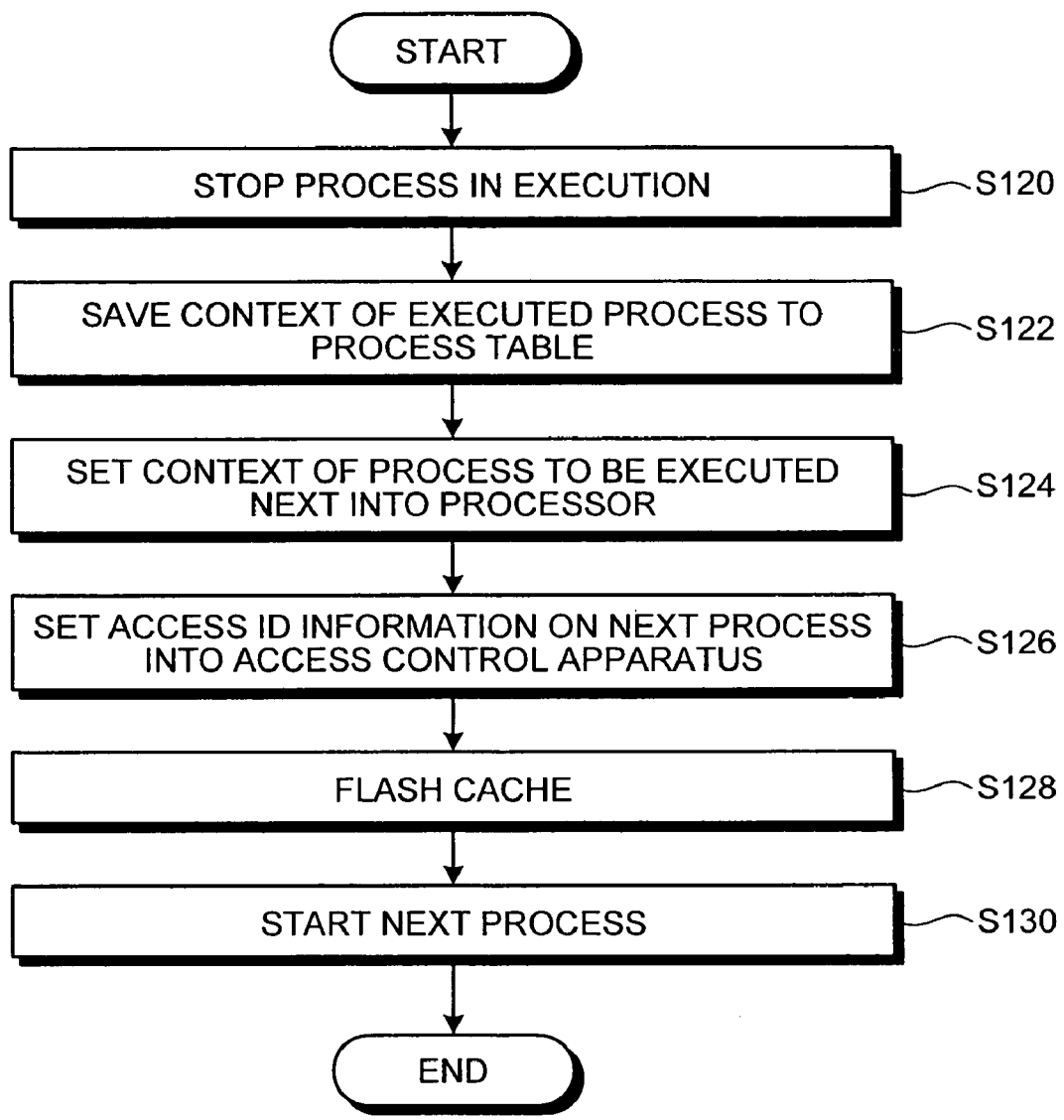
FIG. 14 is a flow chart showing detailed processes in the access ID setting process.

FIG. 14 is a flow chart showing detailed processes in the access ID setting process. More specifically, the processes are processes performed by the processor 20 when the OS switches the processes. When an in-execution process is stopped (step S120), a context of the process which has been executed up to now, i.e., execution states of the register and a value of the program counter are saved in the process management table (step S122). With reference to the process management table, a context of a process to be executed, i.e., the register, the value of the program counter, a page table, and the like are set in the processor 20 (step S124).

Further, access ID information of a process to be executed next is set in the access control apparatus 10 (step S126). The access ID information includes an access ID used when the process accesses.

Thereafter, the cache is flushed (step S128). The cache is flushed because an access can be made without access authority when data used by the previous process remains in the cache. The control of the process to be executed next is started (step S130). Here, the access ID setting process comes to an end.

As in the embodiment, the cache is flushed by the OS. However, the cache may be flushed by another means. Furthermore, the cache may be flushed (step S128) at any timing before the start of a process to be executed next (step S130) and after the context of the process which has been executed is saved (step S122). As another example, when a setting of the access ID register 110 is converted, the access control apparatus 10 interrupts the processor 20, and the cache may be flushed in an interrupt process routine.

Figure 15:
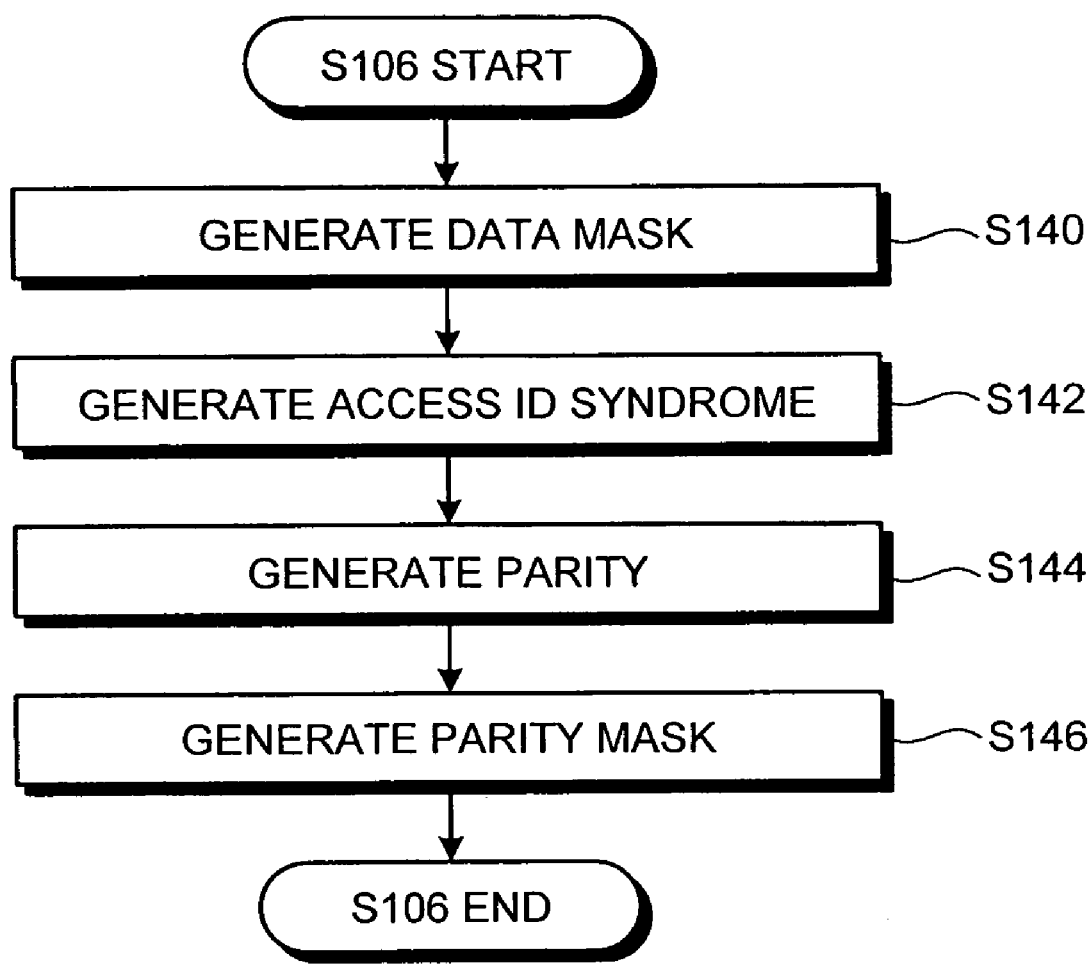
FIG. 15 is a flow chart for explaining detailed processes of a mask value generating circuit in a mask value generating process.

FIG. 15 is a flow chart for explaining detailed processes of the mask value generating circuit 112 in the mask value generating process (step S106). The data mask generating circuit 130 generates a data mask on the basis of an access ID and an address to be accessed (step S140). The access ID syndrome generating circuit 132 generates an access ID syndrome on the basis of the access ID (step S142).

Next, the parity generating circuit 134 generates a parity of the data mask generated by the data mask generating circuit 130 (step S144). The XOR circuit 136 calculates an "XOR" between the parity generated by the parity generating circuit 134 and the syndrome generated by the access ID syndrome generating circuit 132. More specifically, a parity mask is generated (step S146). Here, the mask value generating operation (step S106) comes to an end. A timing of generation of the data mask may be any timing before the timing of generation of the parity, and is not necessarily a timing before the timing of generation of the access ID syndrome.

Figure 16:
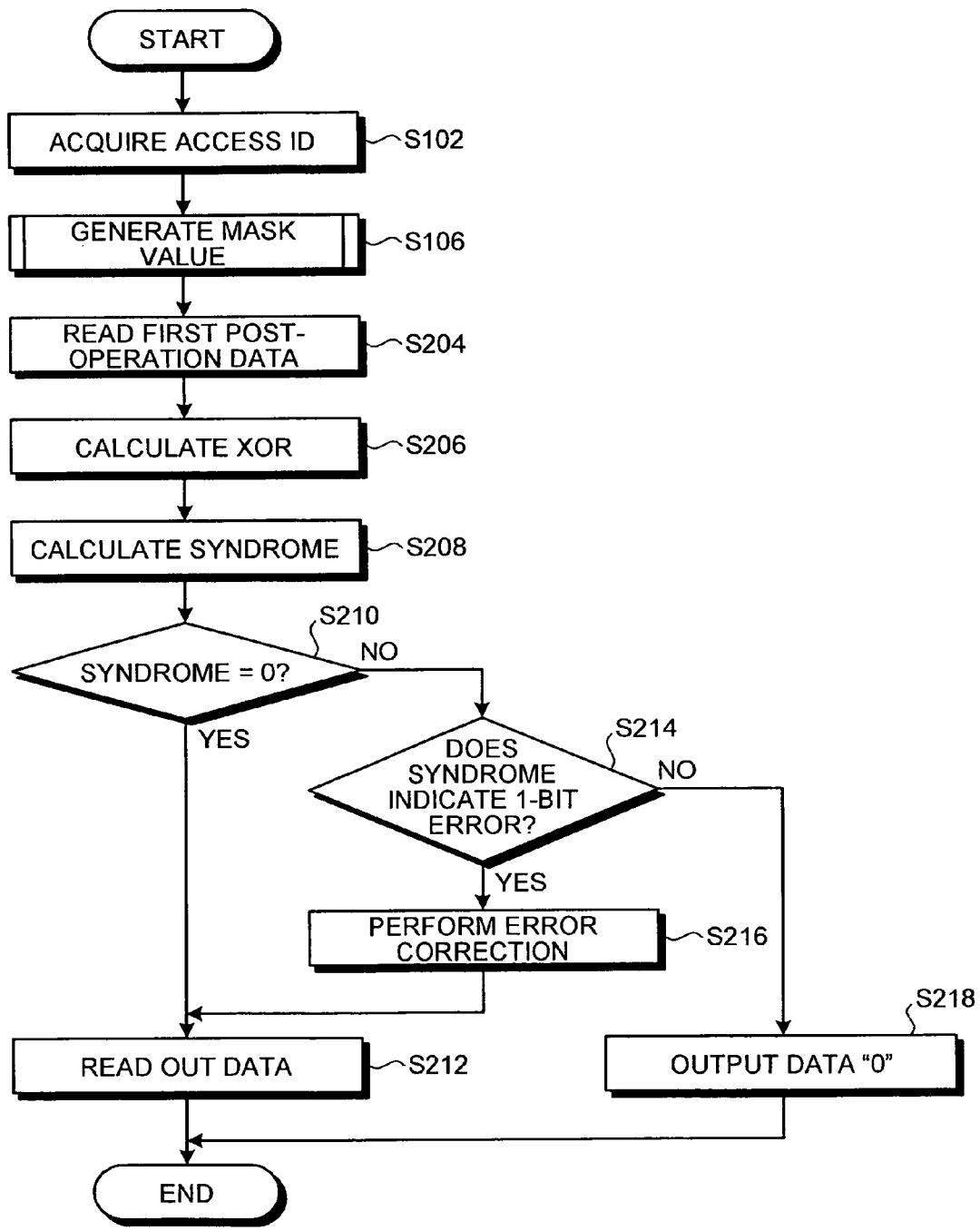
FIG. 16 is a flow chart showing a process of reading data from the memory included in the access control process.

FIG. 16 is a flow chart showing a process of reading data from the memory 40 included in the access control process. First, an access ID is acquired from the access ID register 110

(step S102). The mask value generating circuit 112 then generates a mask value (step S106). The mask value generating process (step S106) is the same as the mask value generating process (step S106) explained with reference to FIGS. 14 and 15.

The second XOR circuit 114 reads the first post-operation data D" written in the memory 40 (step S204). An "XOR" between the read first post-operation data D" and the mask value generated by the mask value generating circuit 112 is calculated (step S206).

Furthermore, the syndrome calculating circuit 120 calculates a syndrome by ECC (step S208). When the syndrome is "0", i.e., when no error is detected (Yes in step S210), the syndrome calculating circuit 120 reads out data D (step S212).

When the syndrome is not "0", and when the number of values "1" in the syndrome is an odd number (No in step S210 and Yes in step S214), i.e., when one error is detected, the error correction circuit 122 performs error correction (step S216) to read out the corrected data D (step S212). When the syndrome is not "0", and when the syndrome is not a single-error syndrome (No in step S210 and No in step S214), i.e., when an error is uncorrectable, the error correction circuit 122 outputs "0" data in place of the data D (step S218). In this manner, the data reading process is completed. In the embodiment, in step S218, it is assumed that the "0" data is output. However, as another example, in place of this, the data may not be output. As still another example, the data read from the memory 40 may be directly output.

As still another example, when an uncorrectable error occurs, the error correction circuit 122 outputs an error detection signal representing that an error is detected. On the basis of the signal, the error correction circuit 122 may notify the processor 20 that the error occurs by means of interruption or the like.

Figure 17:
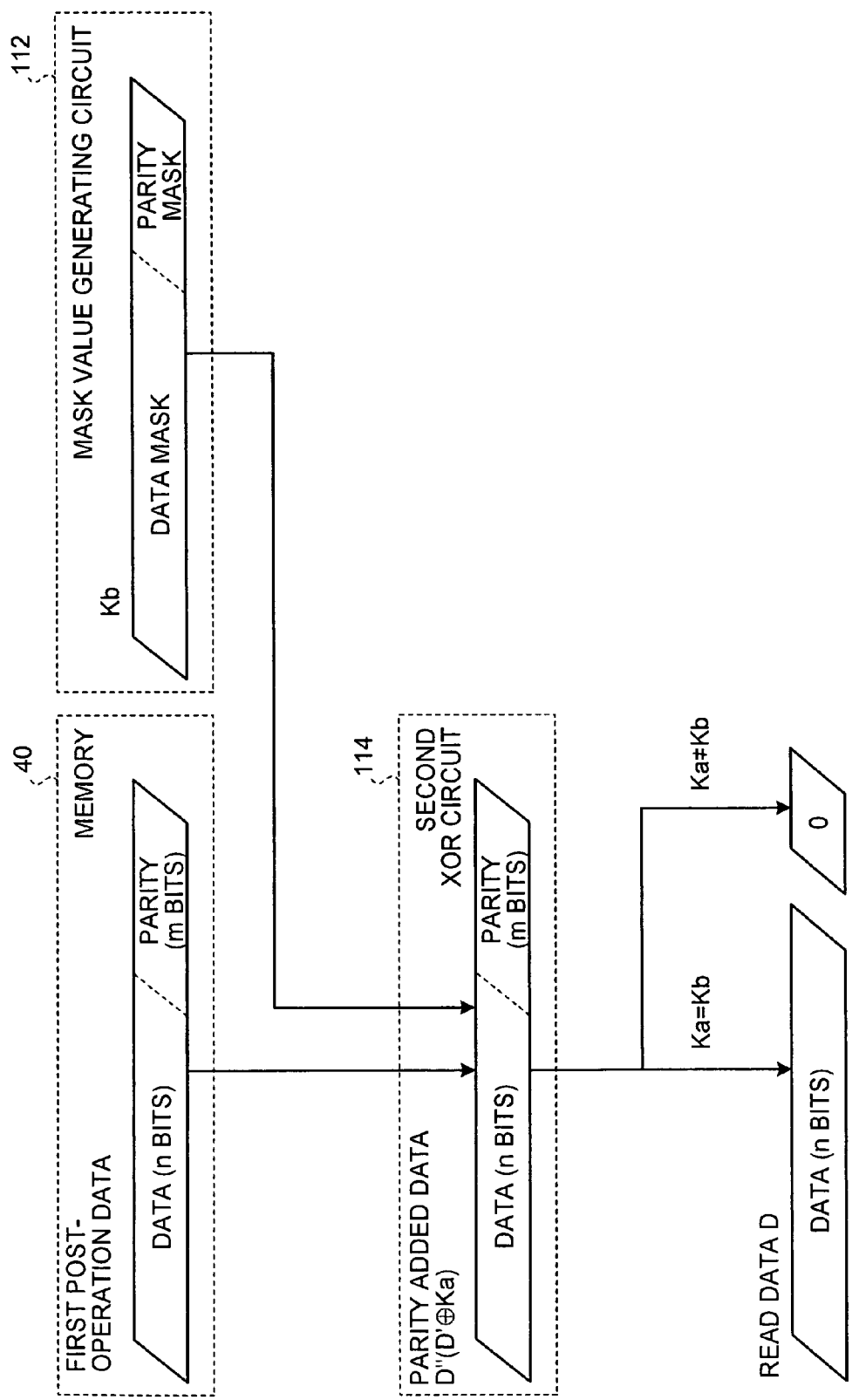
FIG. 17 is a diagram for explaining a process performed when the data written in the memory is read.

FIG. 17 is a diagram for explaining a process performed when the data written in the memory 40 is read. When a process in operation is to read out the data from the memory 40, an "XOR" between the first post-operation data D": D'⊕Ka, which is read from the memory, and a mask "Kb" generated based on the access ID set in the access ID register 110 during the process is calculated by $$D''\oplus Kb = D'\oplus(Ka\oplus Kb)$$

This value corresponds to a second post-operation data. Thereafter, on the basis of the calculation result obtained by the syndrome calculating circuit 120, a value subjected to error detection and error correction by ECC is read out.

When masks obtained in a write operation and a read operation are equal to each other, i.e., when Ka=Kb is satisfied, correct data D can be read. When the masks obtained in the write operation and the read operation are different from each other, i.e., when Ka≠Kb is satisfied, errors that are equivalent to the number of "1" bits in the value, Ka⊕Kb exist in the first post-operation data D" read from the memory 40. Therefore, in this case, the error correction circuit 122 outputs "0" data.

As still another example, when masks obtained in the write operation and the read operation are different from each other, the error correction circuit 122 may not output any data in place of outputting of "0" data.

As described above, in the access control system 1 according to the embodiment, when data is written in the memory 40, data and a parity, that are obtained by calculating an "XOR" between the data to be written and its parity and a mask value inherent in a requester, are written in the memory 40. When the requester reads the data from the memory 40, data and a parity that are obtained by calculating an "XOR" between the data and the parity read from the memory 40 and a mask value inherent in a requester are produced. Data obtained by performing an error correcting process on the data and the parity is returned to the requester.

When writing in and reading from the memory 40 are performed by the same requester, access IDs are equal to each other, and mask values are equal to each other. For this reason, a mask value the XOR of which is calculated in the write operation is equal to a mask value the XOR of which is calculated in the read operation. Therefore, the effect of the mask is canceled to make it possible to correctly read data.

On the other hand, in the embodiment, when writing in and reading from the memory 40 are performed by different requesters, a mask value is set such that an error is determined by the error correction circuit 122. For this reason, a mask value the XOR of which is calculated in a write operation is different from a mask value the XOR of which is calculated in the read operation. Therefore, data can be prevented from being read by different requesters.

In order to prevent unauthorized access from the different requesters, when mask values obtained in a write operation and a read operation are different from each other, a mask value is selected such that a syndrome expressing that the error is uncorrectable is generated. More specifically, it is necessary only that a value obtained by calculating an XOR between a value of the syndrome calculated from the mask value in the write operation and a value of a syndrome calculated from the mask value obtained in the read operation is not "0" and that the number of "1" of the value is an even number.

For this purpose, it is necessary only that all the numbers of "1" in the values of the syndromes calculated from the mask values must be uniformly set to be an odd number or an even number. The number is set to be an odd number or an even number, so that the access ID syndrome generating circuit 132 shown in FIGS. 10A and 10B may be selected.

When the mask value is selected as described above, the number of requesters which can be managed is equal to the number of syndromes which satisfy the condition. More specifically, in a configuration in which an 8-bit parity is added to 64-bit data, when the numbers of "1" in syndromes are uniformly set to be an odd number, 128 requesters can be discriminated from each other. When the numbers are uniformly set to be an even number (including 0), 128 requesters can also be discriminated from each other.

A mask is set to have a unique value in each process. Therefore, when data written by a predetermined process is to be read by another process, the data cannot be read in the access control system 1 according to the embodiment. More specifically, data can be protected from another process.

The access control system 1 prevents data from being read by the above illegal process and protects data in a data write operation such that the data can be written by a process which is essentially permitted to write the data. More specifically, when data is to be written in the memory 40, the data temporarily written in the memory 40 is read out before the data is written. Data is controlled such that the data cannot be written at an address to which read access cannot be performed due to mismatch between masks. In this manner, protection for write access in detailed units can be provided.

Furthermore, a mask value used in the access control system 1 is generated on the basis of an access ID which discriminates processes serving as access requesters from each other and an address of a memory area to be accessed. Therefore, access control can be performed for each requester and for each memory region to be accessed.

Second Embodiment

Figure 18:
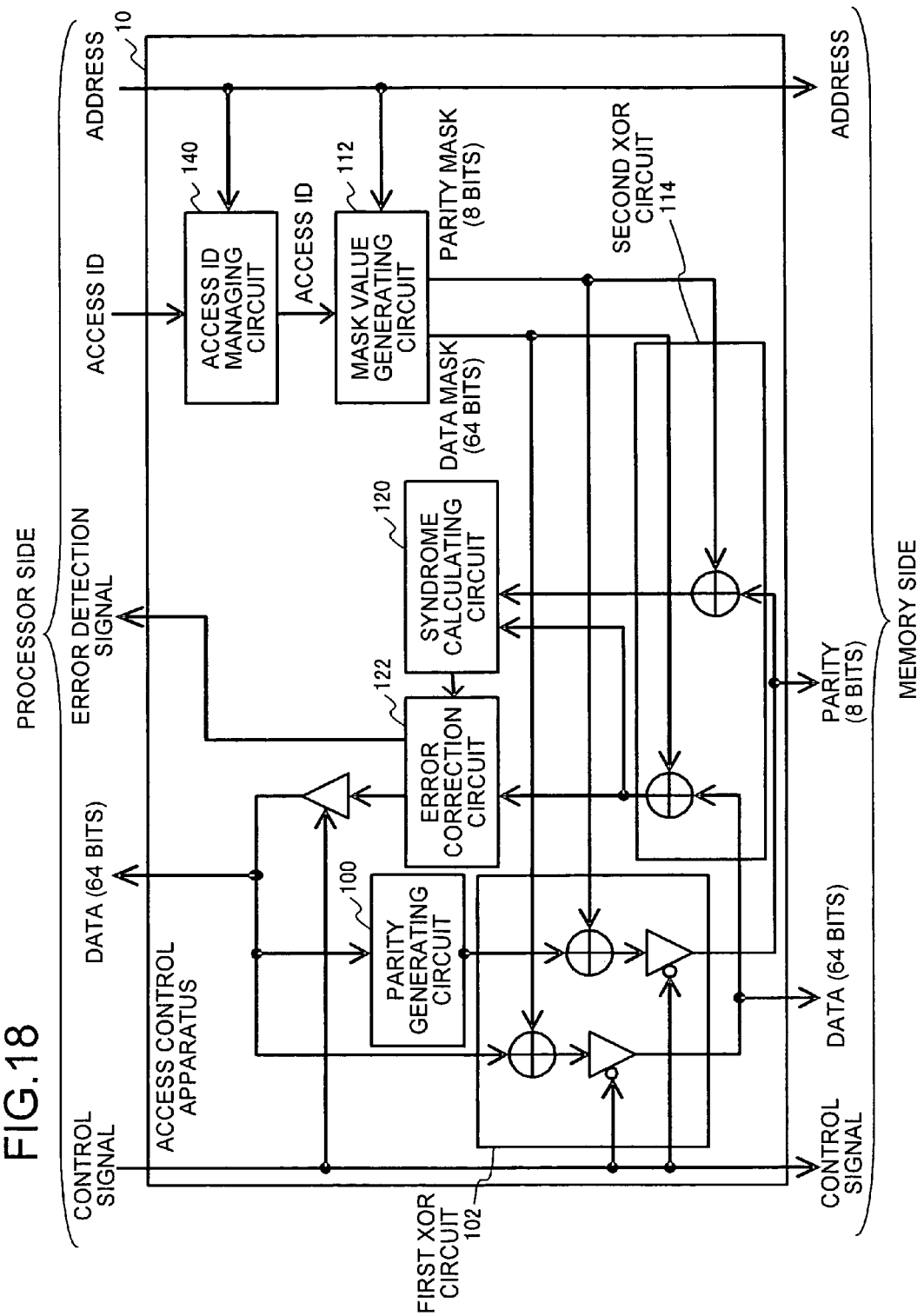
FIG. 18 is a block diagram showing a functional configuration of an apparatus according to a second embodiment.

FIG. 18 is a block diagram showing a functional configuration of an access control apparatus 10 according to a second embodiment. An access control apparatus 10 according to the second embodiment includes an access ID management circuit 140 in place of an access ID register 110 of the access control apparatus 10 according to the first embodiment. With respect to this point, the access control system 1 according to the second embodiment is different from the access control system 1 according to the first embodiment.

Figures 19, 20:
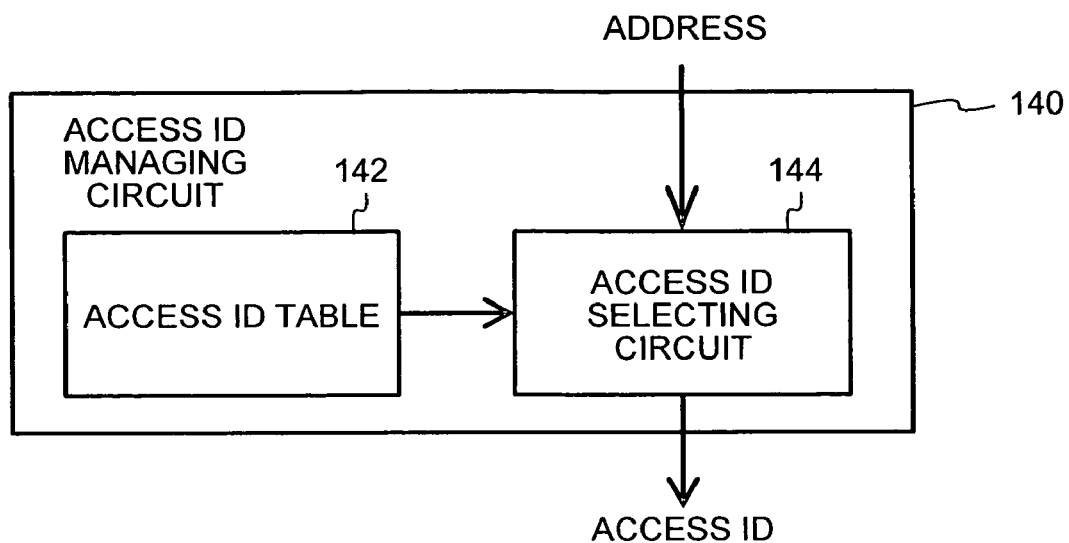
FIG. 19 is a block diagram showing a detailed functional configuration of an access ID management circuit.
FIG. 20 is a diagram schematically showing a data configuration of an access ID table.

FIG. 19 is a block diagram showing a detailed functional configuration of the access ID management circuit 140. The access ID management circuit 140 has an access ID table 142 and an access ID selecting circuit 144.

FIG. 20 is a diagram schematically showing a data configuration of the access ID table 142. The access ID table 142 records an access ID and a start address and an end address of a memory area which can be accessed by a requester discriminated by the access ID associated with each other. The access ID table 142 according to the embodiment functions as a writer access ID holding unit and a reader access ID holding unit. The access ID management circuit 140 according to the embodiment functions as a write address receiver and a read address receiver.

When processes executed on the processor 20 are switched, the processor 20 writes a necessary number of combinations of access IDs held by a switched process and start addresses and end addresses of memory areas corresponding to the access IDs into the access ID table 142. More specifically, in the access ID table 142, data corresponding to a switched process is recorded each time processes are switched.

Data recorded on the access ID table 142 corresponding to each process is recorded in access ID information of a process management table shown in FIG. 13. When the processes are switched, i.e., in step S126 explained with reference to FIG. 14 in the first embodiment, data recorded in the access ID information is set in the access ID table 142.

The access ID table 142 is mapped in an input/output space of an address space which can be viewed from the processor 20 in advance. In this manner, the processor 20 can directly write data in the access ID table 142.

The access ID selecting circuit 144 acquires an access request from the processor 20 to the memory 40. This access request includes an address of a memory area to be accessed. An access ID corresponding to the memory area is output with reference to the access ID table 142. The access ID selecting circuit 144 according to the embodiment functions as a writer access ID specifying unit and a reader access ID specifying unit.

Figure 21:
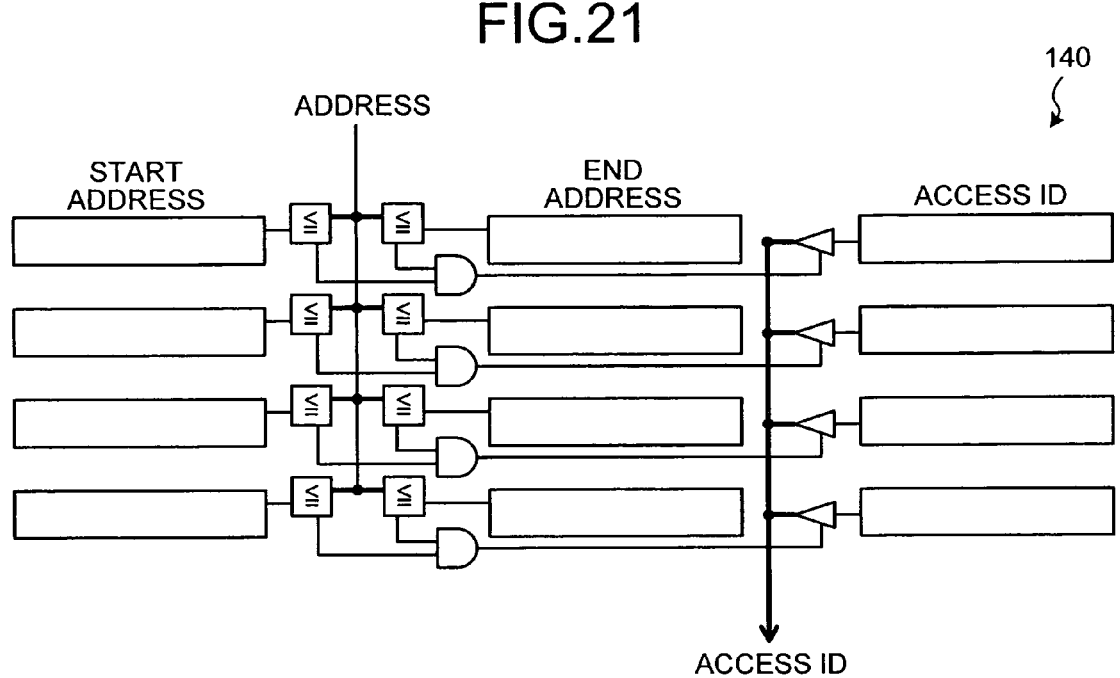
FIG. 21 is a diagram showing a concrete configuration of the access ID management circuit.

FIG. 21 is a diagram showing a concrete configuration of the access ID management circuit 140. As shown in FIG. 21, a start address, an end address and an access ID are recorded. An arithmetic operation is performed on these data to realize the access ID table 142 and the access ID selecting circuit 144.

Figures 22, 23:
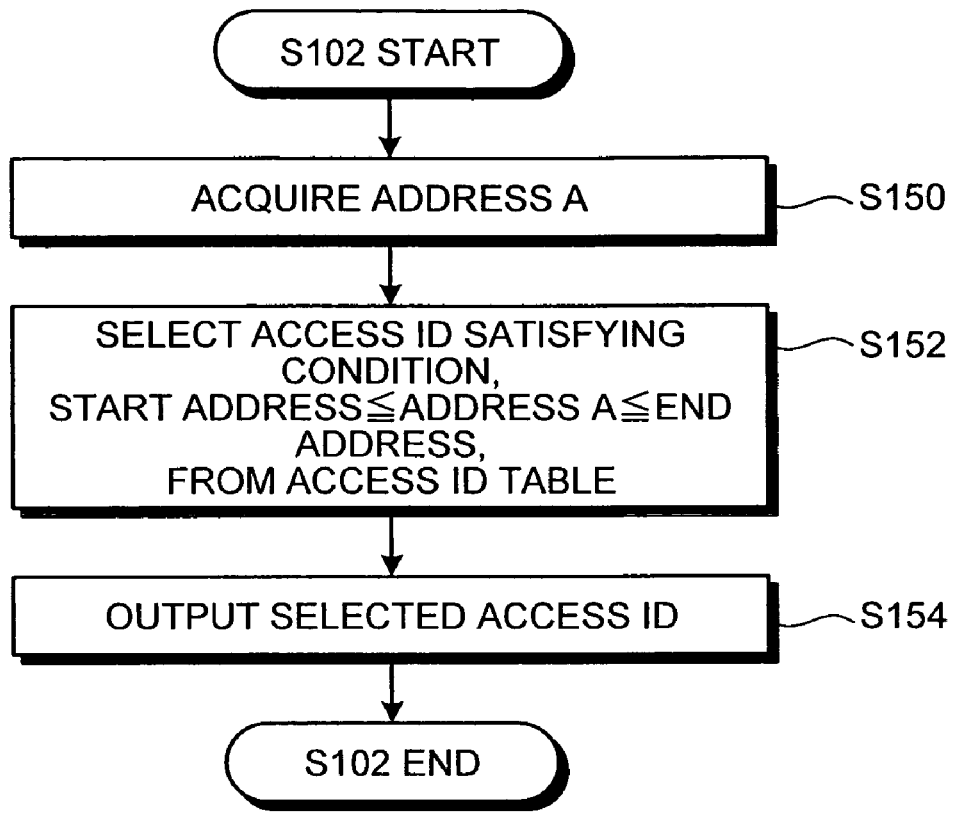
FIG. 22 is a flow chart showing detailed processes in an access ID acquiring process in an access control system according to the second embodiment.
FIG. 23 is a diagram schematically showing a data configuration of an access ID table included in an access ID management circuit in an access control system according to a third embodiment.

FIG. 22 is a flow chart showing detailed processes in the access ID acquiring process (step S102) in the access control system 1 according to the second embodiment.

As described above, address A is acquired from the processor 20 (step S150). The access ID selecting circuit 144 selects an access ID associated with a start address and an end address which are set such that address A is a start address or more and an end address or less with reference to the access ID table 142 (step S152). The selected access ID is output to the mask value generating circuit 112 (step S154). In this manner, the access ID acquiring process (step S102) is completed.

In the access control system 1 according to the second embodiment, access IDs of access requesters convert depending on memory areas. For this reason, access control for each memory area can be performed.

When a memory area is shared by a plurality of processes executed by the processor 20, processes which can access the memory areas are frequently desired to be set in units of memory areas to check access authority. The access control apparatus 10 of the access control system 1 according to the second embodiment can check access authorities corresponding to the memory areas.

In the embodiment, a cache is flushed by the following manner. That is, when the access ID tables 142 are converted, the access control apparatus 10 interrupts the processor 20, and the flushing is performed in the interrupting process routine.

Other configurations and processes of the access control system 1 according to the second embodiment are the same as the configurations and the processes of the access control system 1 according to the first embodiment.

Third Embodiment

An access control system 1 according to the third embodiment will be described below. The access control system 1 according to the third embodiment includes an access ID management circuit 140 like the access control system 1 according to the second embodiment. However, the access ID management apparatuses 140 according to the second and third embodiments are different from each other in process. The access ID management circuit 140 according to the third embodiment functions as a writer ID receiver and a reader ID receiver. An access ID selecting circuit 144 according to the third embodiment acquires a requester ID which discriminates requesters and selects an access ID on the basis of the requester ID.

FIG. 23 is a diagram schematically showing a data configuration of an access ID table 142 included in the access ID management circuit 140 in the access control system 1 according to the third embodiment. As shown in FIG. 23, the access ID table 142 holds requester IDs and access IDs associated with each other. The access ID table 142 according to the third embodiment functions as a writer access ID holding unit and a reader access ID holding unit.

The access ID selecting circuit 144 acquires a requester ID which discriminates requesters of access requests in place of an address. To a processor bus 22 which can connect a plurality of processors 20 to each other, a signal representing a specific unit outputs a request is output in general. Therefore, the access ID selecting circuit 144 specifies a requester ID on the basis of the signal. With reference to the access ID table 142, an access ID associated with the acquired requester ID is selected. The access ID selecting circuit 144 according to the embodiment functions a writer access ID specifying unit and a reader access ID specifying unit.

Figure 24:
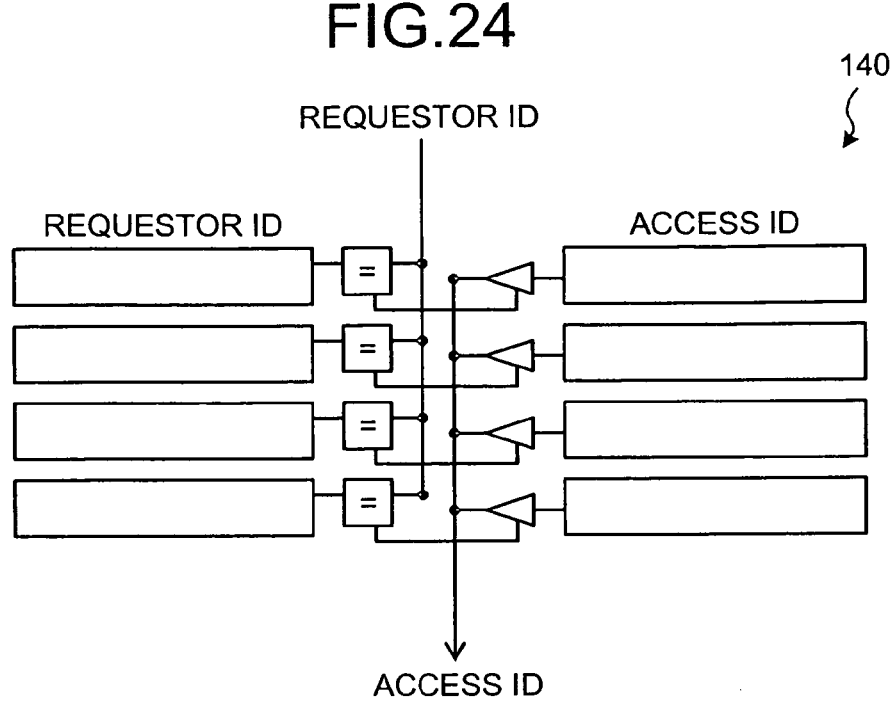
FIG. 24 is a diagram showing a concrete configuration of the access ID management circuit.

FIG. 24 is a diagram showing a concrete configuration of the access ID management circuit 140. As shown in FIG. 24, a requester ID and an access ID are recorded. An arithmetic operation is performed on these data to realize the access ID table 142 and the access ID selecting circuit 144.

Figure 25:
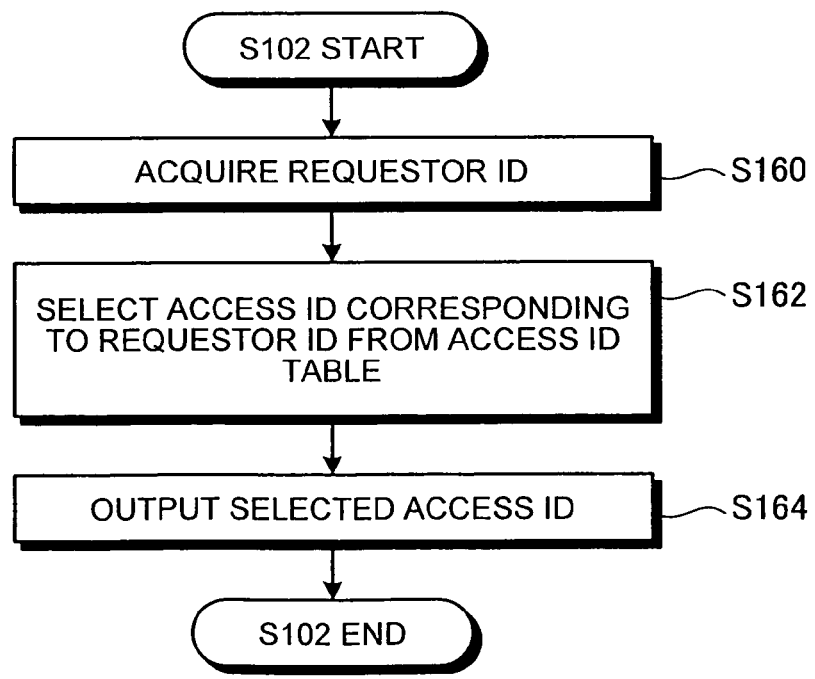
FIG. 25 is a flow chart showing detailed processes in an access ID acquiring process in the access control system according to the third embodiment.

FIG. 25 is a flow chart showing detailed processes in an access ID acquiring process (step S102) in the access control system 1 according to the third embodiment.

First, a requester ID is acquired from the processor bus 22 (step S160). The access ID selecting circuit 144 selects an access ID corresponding to the requester ID with reference to the access ID table 142 (step S162). The selected access ID is output to a mask value generating circuit 112 (step S164). In this manner, the access ID acquiring process (step S102) is completed.

As described above, in place of direct acquisition of an access ID from a requester, a requester ID is acquired to make it possible to further improve security. For example, even though a plurality of processors 20 and a plurality of input/output devices are connected to the processor bus 22, access authorities of these connected devices can be checked.

Other configurations and processes of the access control system 1 according to the third embodiment are the same as the configurations and the processes of the access control system 1 according to the other embodiments.

Fourth Embodiment

An access control system 1 according to a fourth embodiment will be described below. The access control system 1 according to the fourth embodiment includes both the functions of the access ID management circuit 140 according to the second embodiment and the access ID management circuit 140 according to the third embodiment. More specifically, on the basis of both pieces of information of a memory area of an access destination and a requester ID of an access request, an access ID is determined.

FIG. 26 is a diagram schematically showing a data configuration of the access ID table 142 according to the fourth embodiment. The access ID table 142 holds requester IDs, start addresses, end addresses, and access IDs associated with each other. The access ID selecting circuit 144 specifies an address area included in an access request acquired from the processor 20 and further acquires a requester ID from a processor bus 22.

Figure 27:
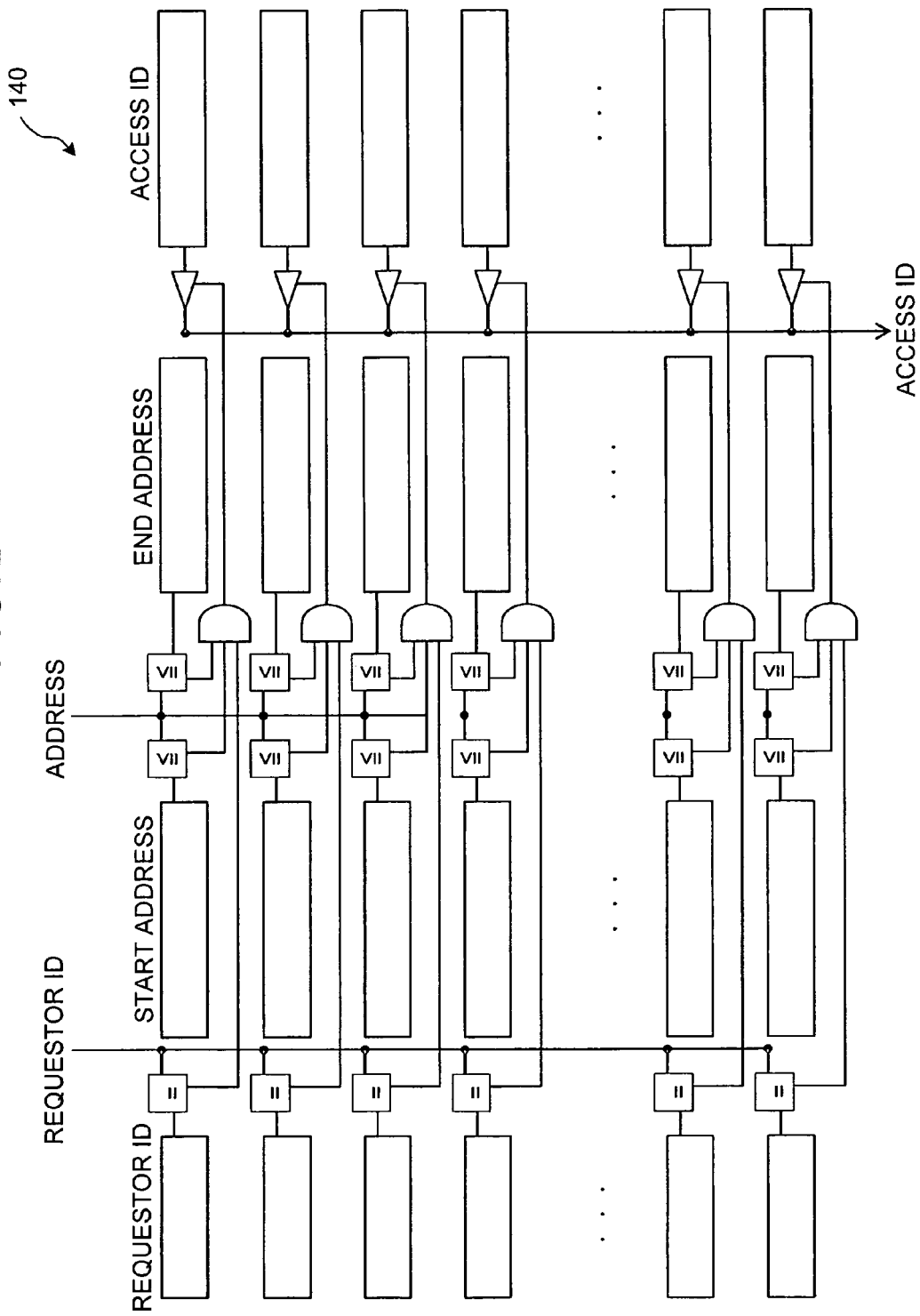
FIG. 27 is a diagram showing a concrete configuration of an access ID management circuit.

FIG. 27 is a diagram showing a concrete configuration of the access ID management circuit 140. As shown in FIG. 27, the start addresses, the end addresses, the requester IDs, and the access IDs are recorded in advance. An arithmetic operation is performed on these data to realize the access ID table 142 and the access ID selecting circuit 144.

Figure 28:
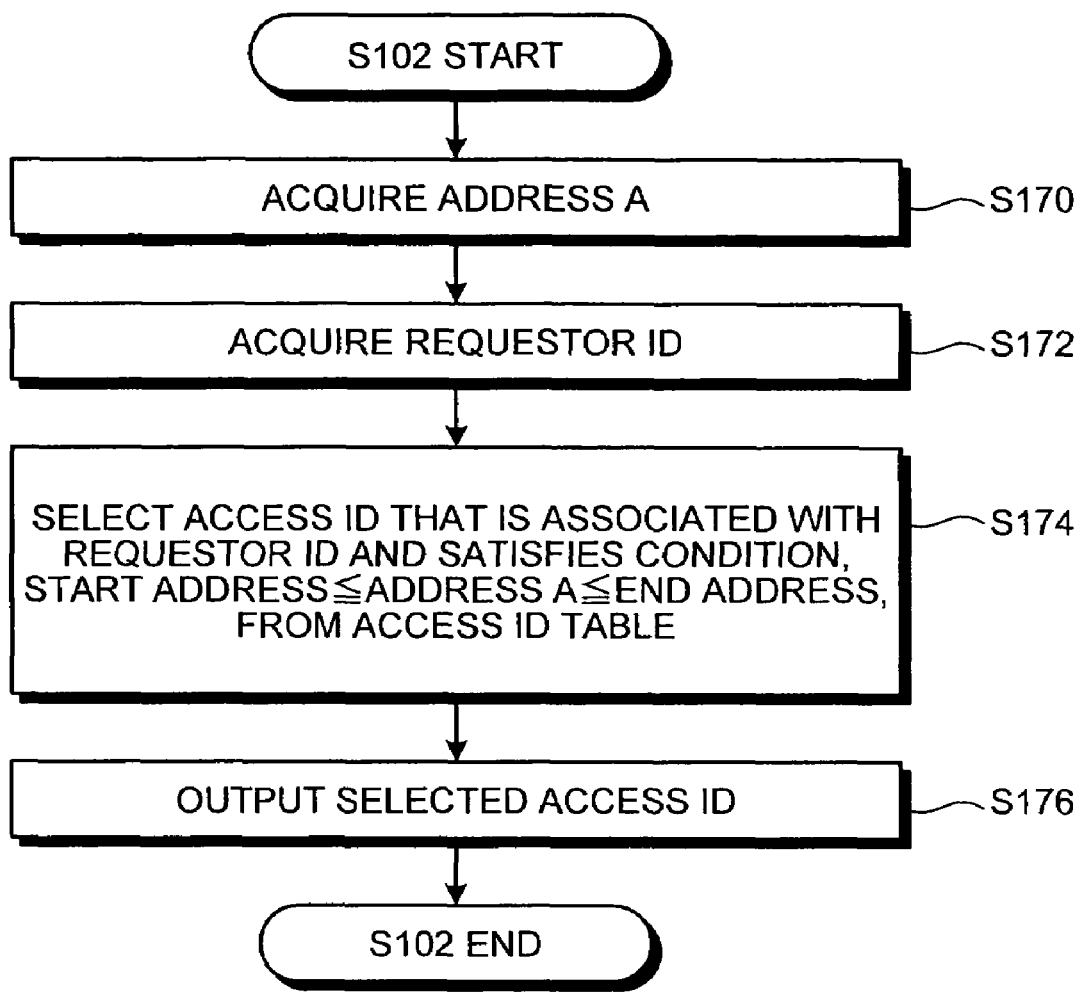
FIG. 28 is a flow chart showing detailed processes in an access ID acquiring process in an access control system according to the fourth embodiment.

FIG. 28 is a flow chart showing detailed processes in an access ID acquiring process (step S102) in the access control system 1 according to the fourth embodiment. The access ID selecting circuit 144 acquires address A from the processor 20 (step S170). Furthermore, a requester ID is acquired from a processor bus 22 (step S172). The access ID selecting circuit 144 refers to the access ID table 142 to select a requester ID and an access ID corresponding to address A (step S174). Then, the selected access ID is output to a mask value generating circuit 112 (step S176). In this manner, the access ID acquiring process (step S102) is completed.

The other configurations and the other processes of the access control system 1 according to the forth embodiment are the same as the configurations and the processes of the access control system 1 according to the other embodiments.

Fifth Embodiment

An access control system 1 according to a fifth embodiment will be described below. A random mask generating process in an access control apparatus 10 according to the fifth embodiment is different from a process in the access control apparatus 10 according to the other embodiments.

Figure 29:
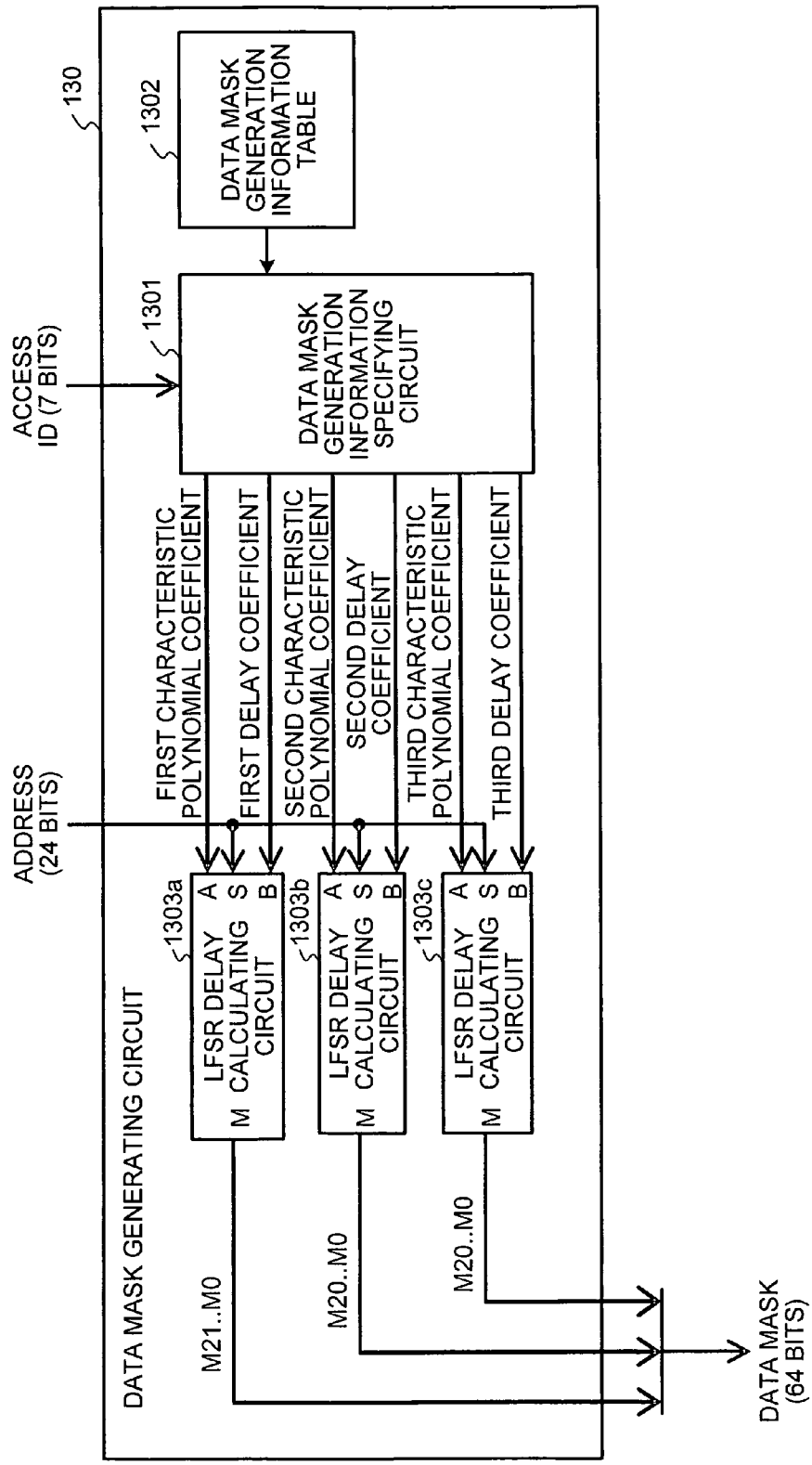
FIG. 29 is a block diagram showing a functional configuration of a data mask generating circuit according to a fifth embodiment.

FIG. 29 is a block diagram showing a functional configuration of a data mask generating circuit 130 according to the fifth embodiment. The data mask generating circuit 130 has a data mask generation information specifying circuit 1301, a data mask generation information table 1302, and LFSR (Linear Feedback Shift Register) delay calculating circuits 1303$a$, 1303$b$, and 1303$c$.

FIG. 30 is a diagram schematically showing a data configuration of the data mask generation information table 1302. The data mask generation information table 1302 records, associated with an access ID, data mask generating information used when a data mask value is generated from the access ID, i.e., various parameters. As the parameters, coefficients of a characteristic polynomial, a delay coefficient, an initial mask, and the like serving as parameters input to the LFSR delay calculating circuits 1303$a$, 1303$b$, and 1303$c$ are included. Since the LFSR delay calculating circuits 1303$a$, 1303$b$, and 1303$c$ according to the fifth embodiment do not use initial masks, the data need not be recorded.

The explanation is returned to FIG. 29. When the data mask generation information specifying circuit 1301 acquires an access ID from an access ID register 110 or an access ID management circuit 140, the data mask generation information specifying circuit 1301 refers to the data mask generation information table 1302 to specify data mask generating information associated with the acquired access ID, i.e., specifies various parameters.

The parameters specified by the data mask generation information specifying circuit 1301 are input to the LFSR delay calculating circuits 1303$a$, 1303$b$, and 1303$c$, respectively. Furthermore, an address of a memory 40 to be accessed is input to the LFSR delay calculating circuits 1303$a$, 1303$b$, and 1303$c$. The LFSR delay calculating circuits 1303$a$, 1303$b$, and 1303$c$ calculate data masks on the basis of the acquired data.

In general, a sequence generated by an LFSR using a primitive polynomial as a characteristic polynomial is called an M sequence. It is popularly known that the M sequence has good property as a pseudo random number. Therefore, in the embodiment, an address of the memory 40 to be accessed in an initial state is set by an LFSR corresponding to a certain characteristic polynomial. An internal state obtained by shifting the LFSR by a predetermined step corresponding to an access ID is used as a data mask.

In the embodiment, it is assumed that the number of bits of an address is 24. Three 24-step LFSRs having three 24-order primitive polynomials as characteristic polynomials are arranged. The internal state of each 24-step LFSR consists of 24 bits. Therefore, a mask of up to 72 bits can be extracted from the three LFSR delay calculating circuits 1303$a$, 1303$b$, and 1303$c$. However, since 64 bits are necessary in the embodiment, 22 bits are extracted from the LFSR delay calculating circuit 1303$a$, and 21 bits are extracted from the remaining LFSR delay calculating circuits 1303$b$ and 1303$c$ each.

Addresses are set in the initial states of the LFSR delay calculating circuits 1303$a$, 1303$b$, and 1303$c$, and an internal state "Mx" obtained by shifting the LFSR by a step corresponding to a delay coefficient determined by an access ID is extracted. These values are added up to output as a data mask. The arrangement of the signal lines used when the values extracted from the three LFSR delay calculating circuits 1303$a$, 1303$b$, and 1303$c$ are output as the data mask is not particularly limited.

A process of the LFSR delay calculating circuit 1303$a$ will be described below in detail. The processes of the LFSR delay calculating circuits 1303$b$ and 1303$c$ are the same as that of the LFSR delay calculating circuit 1303a. A characteristic polynomial of the LFSR is expressed by Equation 7:

$$f(x)=A_0x^0+A_1x^1+A_2x^2+\ldots+A_{24}x^{24} \quad \text{(Equation 7)}$$

In this case, in order to calculate a value output after d steps later by the LFSR, a remainder g(x) is obtained by dividing $x^d$ by f(x). A value g(x) is expressed by Equation 8:

$$g(x)=B_0x^0+B_1x^1+B_2x^2+\ldots+B_{23}x^{23} \quad \text{(Equation 8)}$$

A sum of products of coefficients ($B_0, B_1, \ldots, B_{23}$) of the value g(x) and internal states (the vector of the value of each step in the shift register) of the LFSR is calculated to obtain 1-bit values output d step after the internal states. The values $B_0, B_1, \ldots, B_{23}$ are called delay coefficients.

In the data mask generation information table 1302, coefficients $A_0, A_1, \ldots, A_{n-1}$ of a characteristic polynomial, delay coefficients $B_0, B_1, \ldots, B_{n-1}$, and internal states $S_0, S_1, \ldots, S_{n-1}$ serving as initial values are held. Since it is trivial that an uppermost coefficient $A_n$ of the characteristic polynomial must be 1, the value $A_n$ need not be held in advance.

The LFSR delay calculating circuits 1303a, 1303b, and 1303c outputs values $M_0, M_1, \ldots, M_{m-1}$ after steps determined by the delay coefficients $B_0, B_1, \ldots, B_{n-1}$ from the initial values. In the embodiment, the value n is 24. Values m vary depending on the LFSR delay calculating circuits 1303a, 1303b, and 1303c. More specifically, since the LFSR delay calculating circuits 1303b and 1303c are circuits from which 21 bits are extracted, the value m is 21. Since the LFSR delay calculating circuit 1303a is a circuit from which 22 bits are extracted, the value m is 22.

Figure 31:
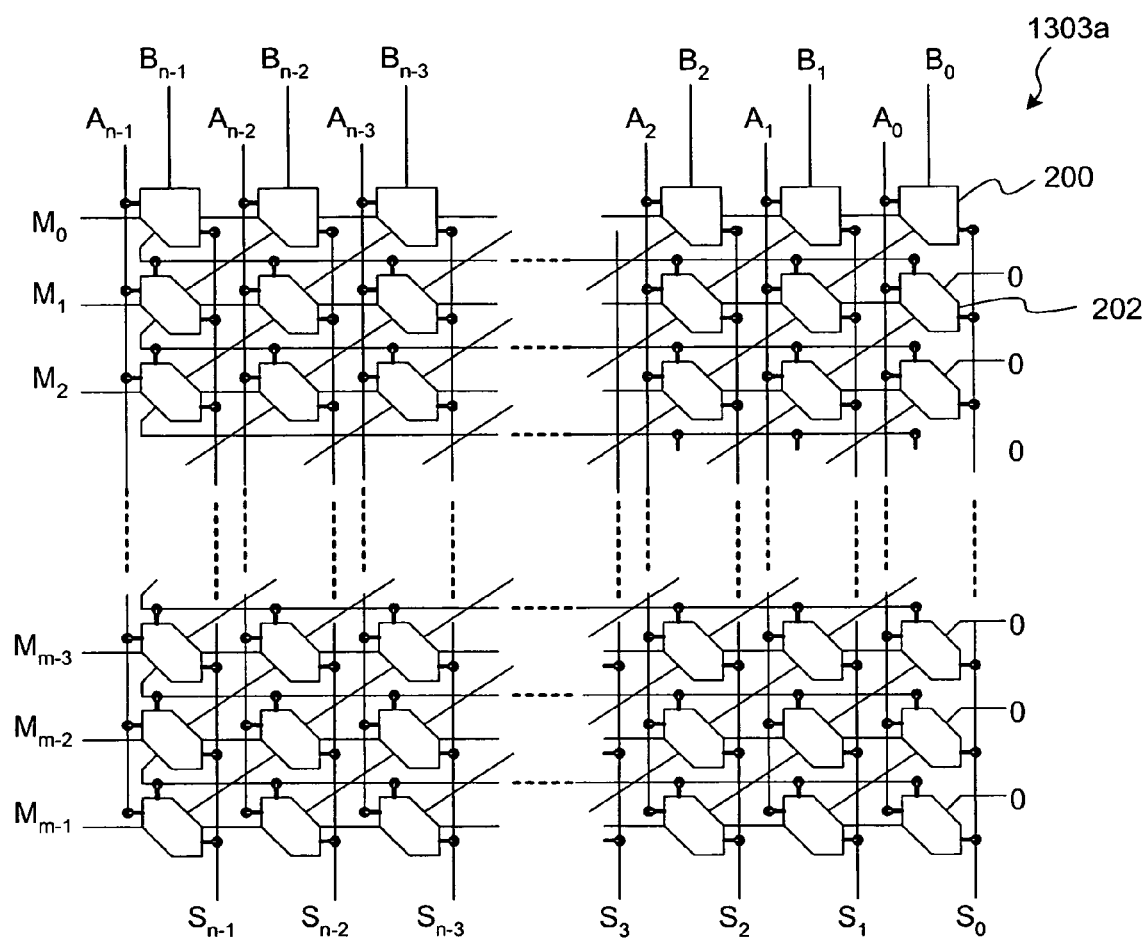
FIG. 31 is a diagram showing a more concrete configuration of an LFSR delay calculating circuit.
Figure 32:
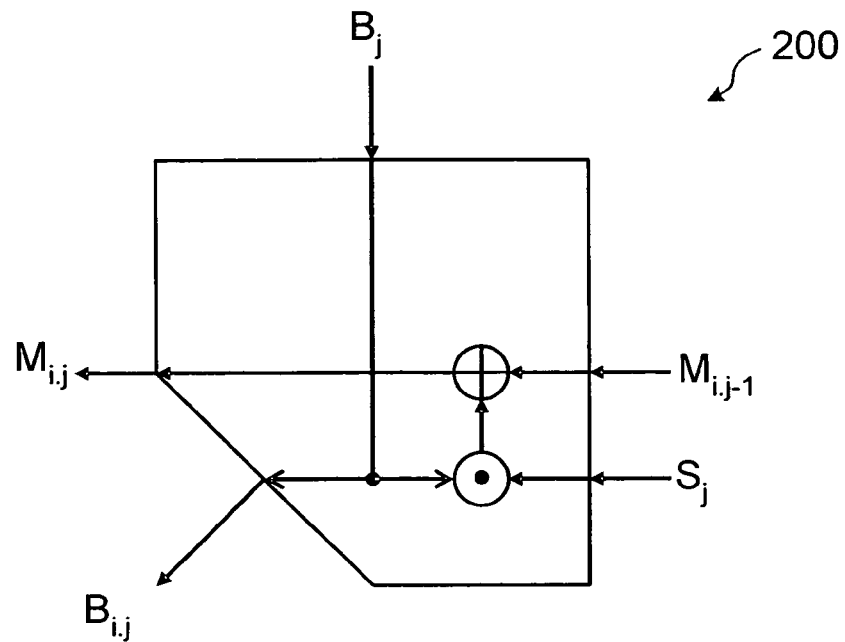
FIG. 32 is a detailed diagram of a circuit included in the LFSR delay calculating circuit.
Figure 33:
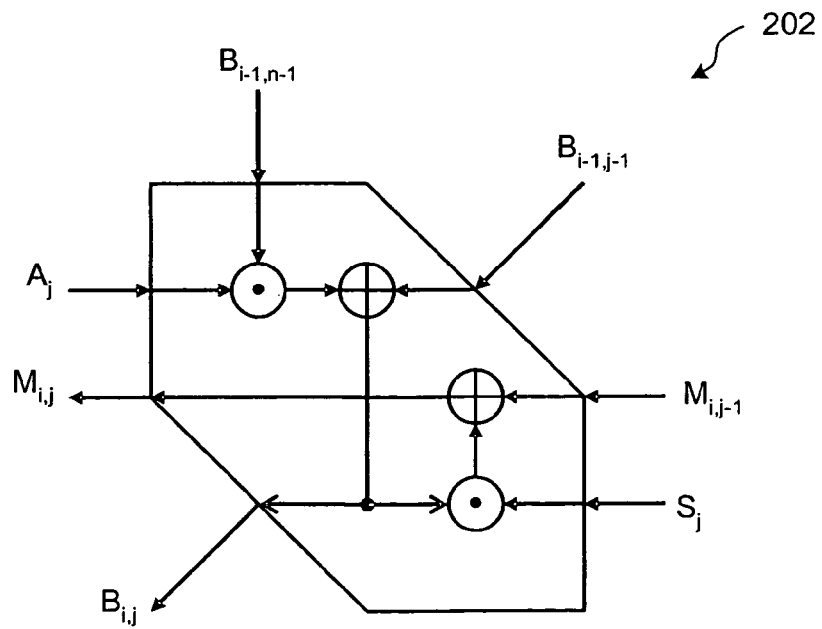
FIG. 33 is a detailed diagram of a circuit included in the LFSR delay calculating circuit.

FIG. 31 is a diagram showing a more concrete configuration of the LFSR delay calculating circuit 1303a. The configurations of the other LFSR delay calculating circuits 1303b and 1303c are the same as that of the LFSR delay calculating circuit 1303a. FIG. 32 is a detailed diagram of a circuit 200 included in the LFSR delay calculating circuit 1303a. FIG. 33 is a detailed diagram of a circuit 202 included in the LFSR delay calculating circuit 1303a.

A first-stage circuit of the LFSR delay calculating circuit 1303a constituted by the circuit 200 shown in FIG. 32 calculates bits M obtained after delay determined by the delay coefficient B. More specifically, a sum of products of the delay coefficients $B_0, B_1, \ldots, B_{n-1}$ and the initial values $S_0, S_1, \ldots, S_{n-1}$ are calculated and output as a value $M_0$.

A second-stage circuit and subsequent circuits of the LFSR delay calculating circuit 1303a constituted by the circuit 202 shown in FIG. 33 calculates bits obtained after delay of a 1-step destination. More specifically, delay coefficients of this stage are calculated from delay coefficients of the upper stage and a characteristic polynomial, and a sum of products of the delay coefficients and the initial values is calculated and output.

Delay coefficients of the stage are calculated from the delay coefficients of the upper stage by the following manner. That is, when g(x) expresses a delay coefficient of a d step, a remainder g'(x) obtained by dividing g(x)·x by f(x) expresses a delay coefficient of a d+1 step. By using the relationship, the upper-stage delay coefficient is shifted by 1 bit. When the coefficient of the maximum degree of the delay coefficient is 1, the delay coefficient is larger than f(x). For this reason, when the delay coefficient is divided by f(x), a delay coefficient of the stage is calculated. When the delay coefficient is divided by f(x), an XOR between the delay coefficient and the coefficient of f(x) may be calculated.

It is desired that a delay coefficient stored associated with each access ID by the data mask generation information table 1302 has a value varying depending on access IDs. Also, it is desired that a plurality of delay coefficients corresponding to the access IDs have different values.

A delay coefficient associated with each access ID is desirably determined by using a random number or the like at the time of the access ID generation. At this time, the number of steps d is calculated by a random number or the like, and a delay coefficient corresponding to the number of delay steps d is desirably calculated. As another example, the value of the random number may be directly used as a delay coefficient.

The other configurations and the processes of the access control system 1 according to the fifth embodiment are the same as the configurations and the processes of the access control system 1 according to the other embodiments.

A modification of the access control system 1 according to the fifth embodiment will be described below. In the embodiment, a characteristic polynomial is determined on the basis of an access ID. However, in place of this, a characteristic polynomial may be set in advance. More specifically, the characteristic polynomial may be fixed. Characteristic polynomials used by the LFSR delay calculating circuits 1303a, 1303b, and 1303c may be equal to each other or different from each other.

In this case, in the data mask generation information table 1302, coefficients of the characteristic polynomial may not be recorded. Furthermore, the data mask generation information table 1302 can be realized as a circuit which is simpler than the LFSR delay calculating circuit 1303a explained with reference to FIG. 31 or the like.

Sixth Embodiment

An access control system 1 according to a sixth embodiment will be described below. The access control system 1 according to the sixth embodiment is almost the same as the access control system 1 according to the fifth embodiment except for processes in the data mask generating circuit 130.

Figure 34:
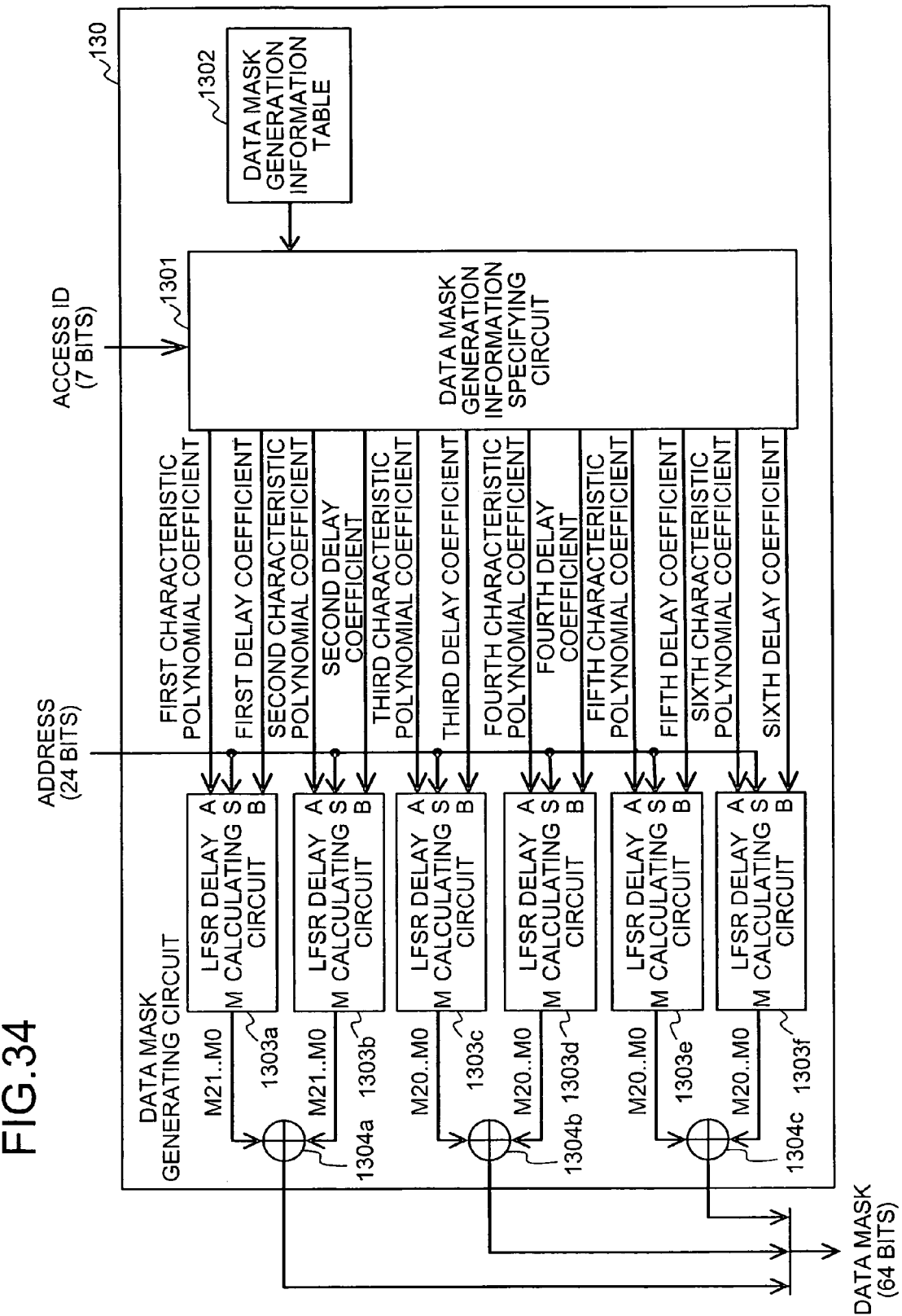
FIG. 34 is a block diagram showing a functional configuration of a data mask generating circuit according to a sixth embodiment.

FIG. 34 is a block diagram showing a functional configuration of the data mask generating circuit 130 according to the sixth embodiment. The data mask generating circuit 130 according to the sixth embodiment includes a data mask generation information specifying circuit 1301, a data mask generation information table 1302, LFSR delay calculating circuits 1303a, 1303b, 1303c, 1303d, 1303e, and 1303f, and XOR circuits 1304a, 1304b, and 1304c.

The data mask generating circuit 130 according to the sixth embodiment combines two LFSR delay calculating circuits 1303 and uses an XOR of values output from the respective delay calculating circuits 1303 as a data mask.

For example, the LFSR delay calculating circuit 1303a and the LFSR delay calculating circuit 1303b are combined to each other. The XOR circuit 1304a calculates an XOR between a value M output from the LFSR delay calculating circuit 1303a and a value M output from the LFSR delay calculating circuit 1303b. The combination of the LFSR delay calculating circuits 1303c and the LFSR delay calculating circuit 1303d and the XOR circuit 1304b perform the same calculation as described above. The combination of the LFSR delay calculating circuit 1303e and the LFSR delay calculating circuit 1303f and the XOR circuit 1304c perform the same calculation as described above.

In this manner, the data mask generating circuit 130 according to the sixth embodiment does not use a single LFSR delay calculating circuit, but combines two LFSR delay calculating circuits to each other to calculate an XOR of outputs from the LFSR delay calculating circuits. For this reason, the randomness of a data mask output from the data mask generating circuit 130 can be more improved.

The other configurations and the other processes of the access control system 1 according to the sixth embodiment are the same as the configurations and the processes of the access control system 1 according to the fifth embodiment.

As a modification of the sixth embodiment, although an XOR of output values from two LFSR delay calculating circuits is calculated in the sixth embodiment, a combination may be constituted by three or more LFSR delay calculating circuits to use an XOR of output values from the LFSR delay calculating circuits as a data mask. Furthermore, a combination of two LFSR delay calculating circuits and a combination of three LFSR delay calculating circuits may be arranged at once.

Seventh Embodiment

An access control system 1 according to a seventh embodiment will be described below. The access control system 1 according to the seventh embodiment is almost the same as the access control system 1 according to the fifth embodiment except for processes performed in a data mask generating circuit 130.

Figure 35:
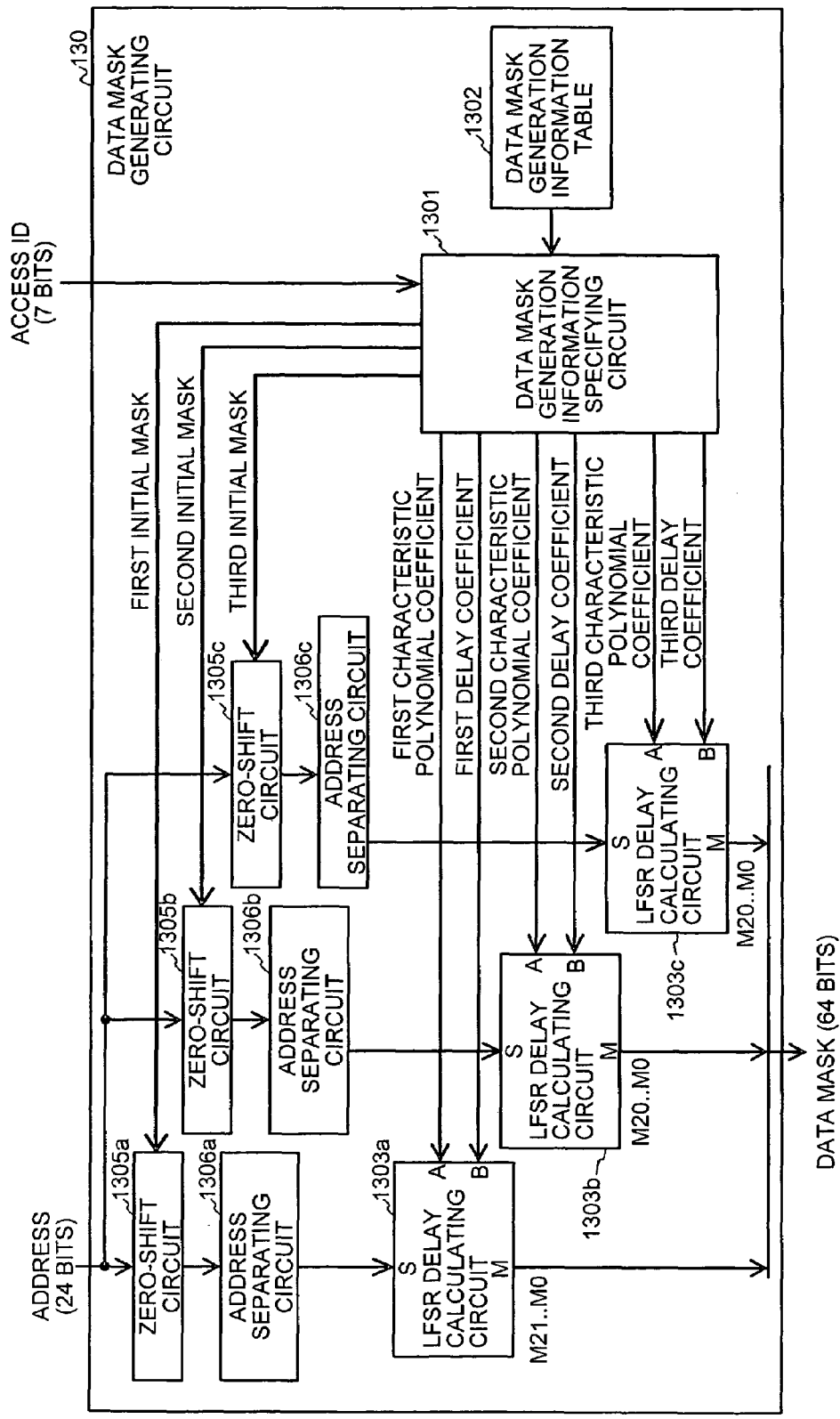
FIG. 35 is a block diagram showing a functional configuration of a data mask generating circuit according to a seventh embodiment.

FIG. 35 is a block diagram showing a functional configuration of the data mask generating circuit 130 according to the seventh embodiment. The data mask generating circuit 130 according to the seventh embodiment further includes zero-shift circuits 1305*a*, 1305*b*, and 1305*c* and address separating circuits 1306*a*, 1306*b*, and 1306*c*.

Addresses themselves are not directly input to LFSR delay calculating circuits 1303*a*, 1303*b*, and 1303*c* according to the seventh embodiment. Addresses subjected to zero shift and address diffusion are input to the LFSR delay calculating circuits 1303*a*, 1303*b*, and 1303*c* through the zero-shift circuits 1305*a*, 1305*b*, and 1305*c* and the address separating circuits 1306*a*, 1306*b*, and 1306*c*, respectively.

The processes in the zero-shift circuits 1305*a*, 1305*b*, and 1305*c* are equal to each other. The processes in the address separating circuits 1306*a*, 1306*b*, and 1306*c* are equal to each other. For this reason, the zero-shift circuit 1305*a* and the address separating circuit 1306*a* will be described below.

The zero-shift circuit 1305*a* converts a zero address into another address. The LFSR delay calculating circuit 1303*a* always outputs zero when the address is zero. Therefore, when the address is zero, it is not preferable that even though the address has been subjected to processing by the LFSR delay calculating circuit 1303*a*, the address is output as it is. Therefore, the zero-shift circuit 1305*a* converts zero into another value which is not zero.

More specifically, for example, an input address added with an initial mask is output. The initial mask is recorded on the data mask generation information table 1302, read by the data mask generation information specifying circuit 1301, and sent to the zero-shift circuits 1305*a*, 1305*b*, and 1305*c*.

As another example, an XOR between the input address and the initial mask may be output.

The address separating circuit 1306*a* converts addresses closed to each other into addresses separated from each other. If addresses to be input are continued, the number of bit positions having different values is probably 1 when the two continued addresses are compared with each other. For this reason, mask values of adjacent addresses may undesirably have correlation. Therefore, in order to prevent the correlation, adjacent addresses are converted to addresses more distant from each other.

Figure 36:
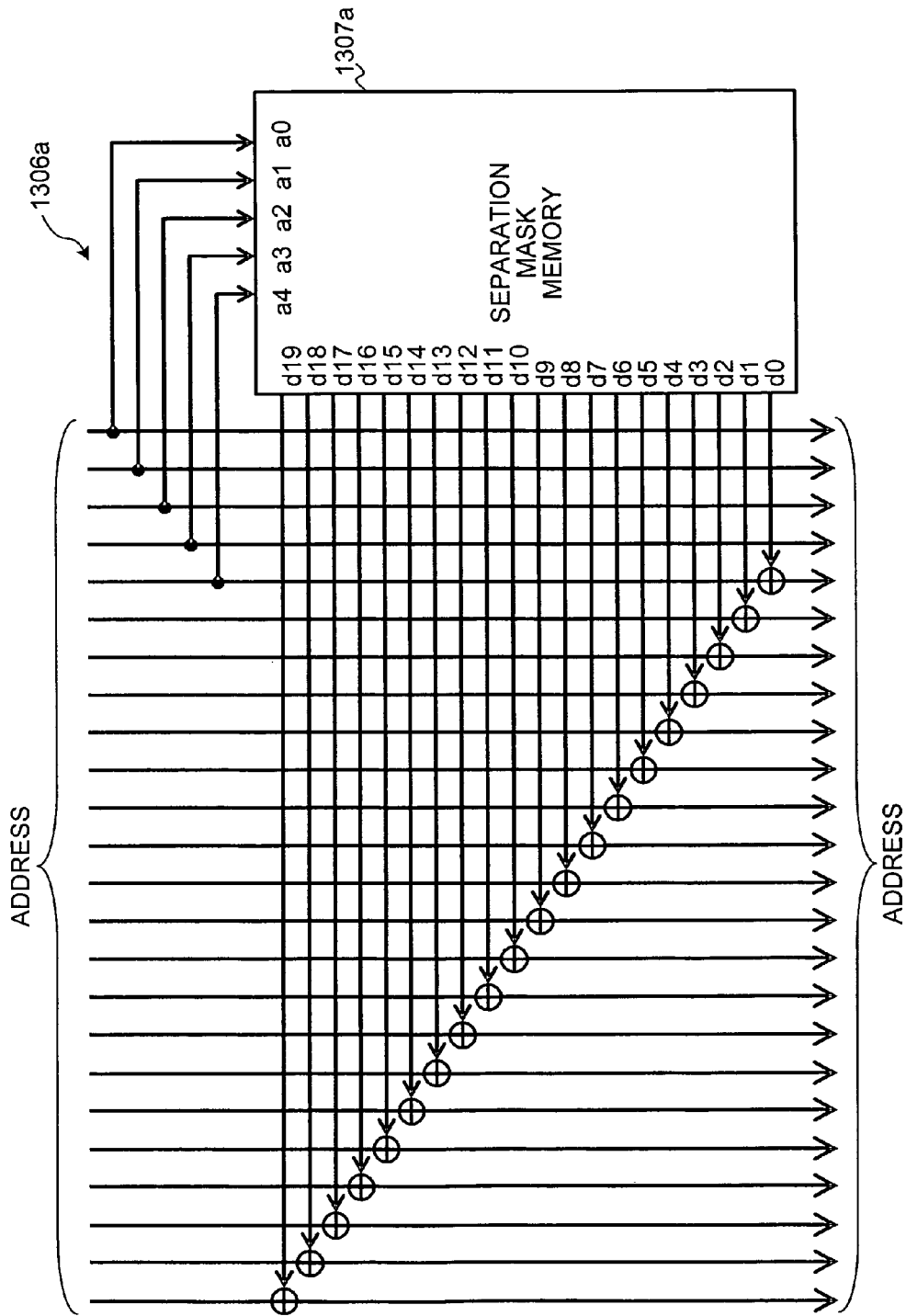
FIG. 36 is a diagram showing a concrete configuration of an address separating circuit.

FIG. 36 is a diagram showing a concrete configuration of the address separating circuit 1306*a*. The address separating circuit 1306*a* has a separation mask memory 1307*a*. In the separation mask memory 1307*a*, a diffusion pattern is recorded in advance. When an address is input to the address separating circuit 1306*a*, the separation mask memory 1307*a* is referred by using lower bits of the address. A XOR of the resultant value and the upper bits of the address is calculated. In this manner, even though continuous addresses are input, the addresses are output as converted addresses more distant from each other.

The other configurations and the other processes of the access control system 1 according to the seventh embodiment are the same as the configurations and the processes of the access control system 1 according to the fifth embodiment.

Figure 37:
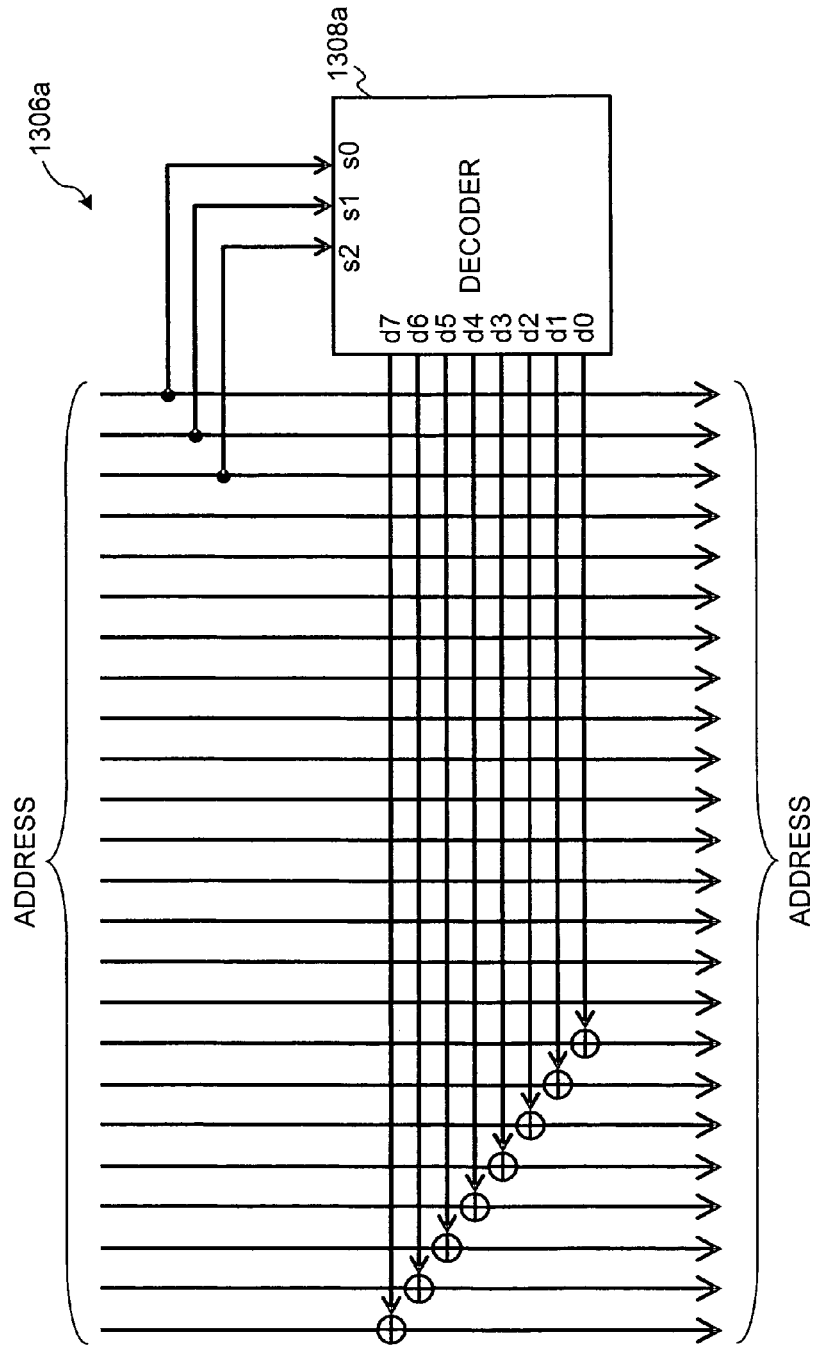
FIG. 37 is a diagram showing a concrete configuration of an address separating circuit according to a first modification of the seventh embodiment.

A first modification of the data mask generating circuit 130 according to the seventh embodiment will be described below. FIG. 37 is a diagram showing a concrete configuration of an address separating circuit 1306*a* according to the first modification. The address separating circuit 1306*a* according to the first modification has a decoder 1308*a*. The decoder 1308*a* selects one of upper addresses from lower bits of addresses and inverts a value of the selected address by an XOR. In this case, as in the address separating circuit 1306*a* according to the seventh embodiment, adjacent addresses can be converted to addresses more distant from each other.

As a second modification, the data mask generating circuit 130 in the access control system 1 according to the seventh embodiment has both sets of the zero-shift circuits 1305*a*, 1305*b*, and 1305*c*, and the address separating circuits 1306*a*, 1306*b*, and 1306*c*. However, the data mask generating circuit 130 may have only one of the sets of the zero-shift circuits 1305*a*, 1305*b*, and 1305*c*, and the address separating circuits 1306*a*, 1306*b*, and 1306*c*.

Figure 38:
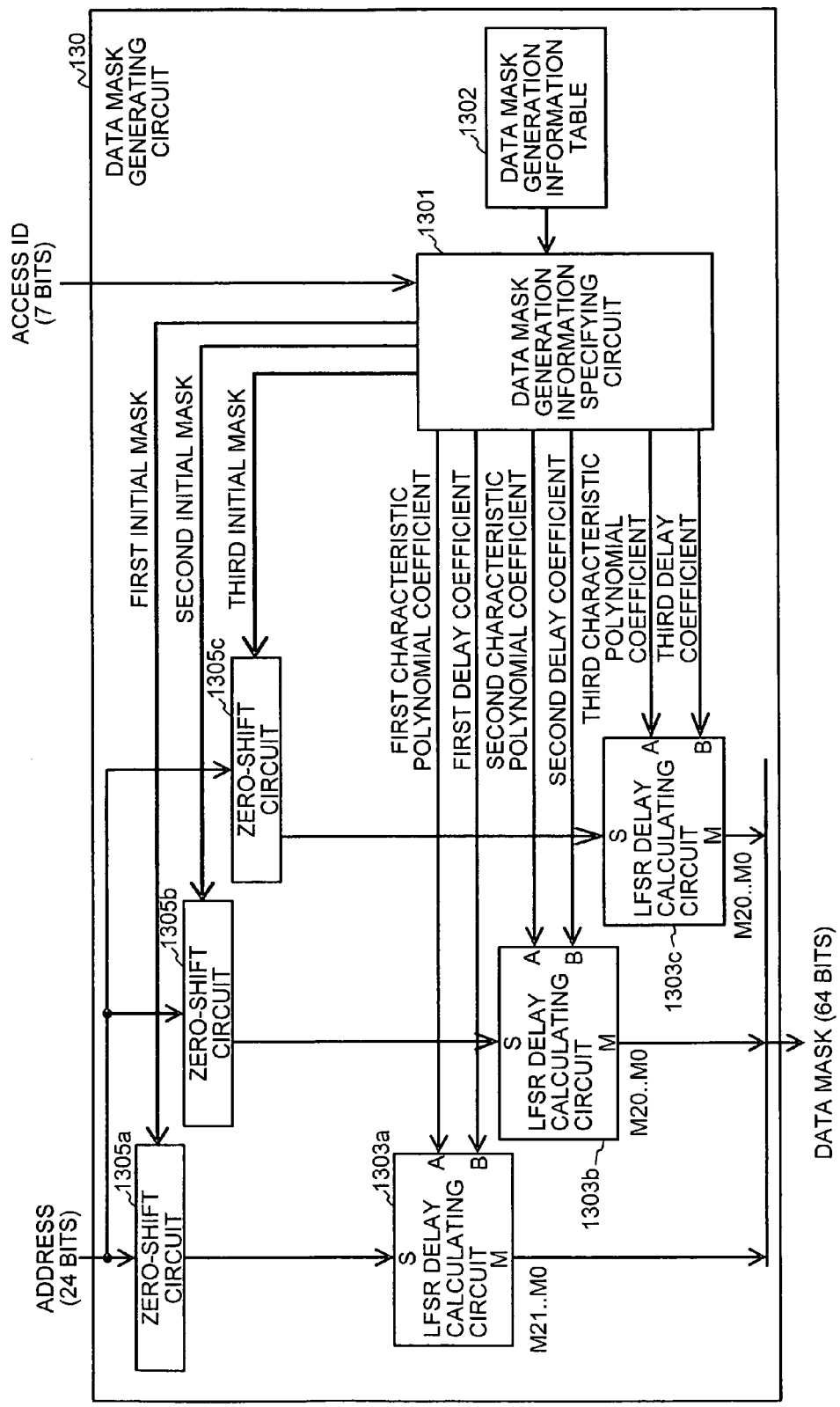
FIG. 38 is a block diagram of the data mask generating circuit having only zero-shift circuits.
Figure 39:
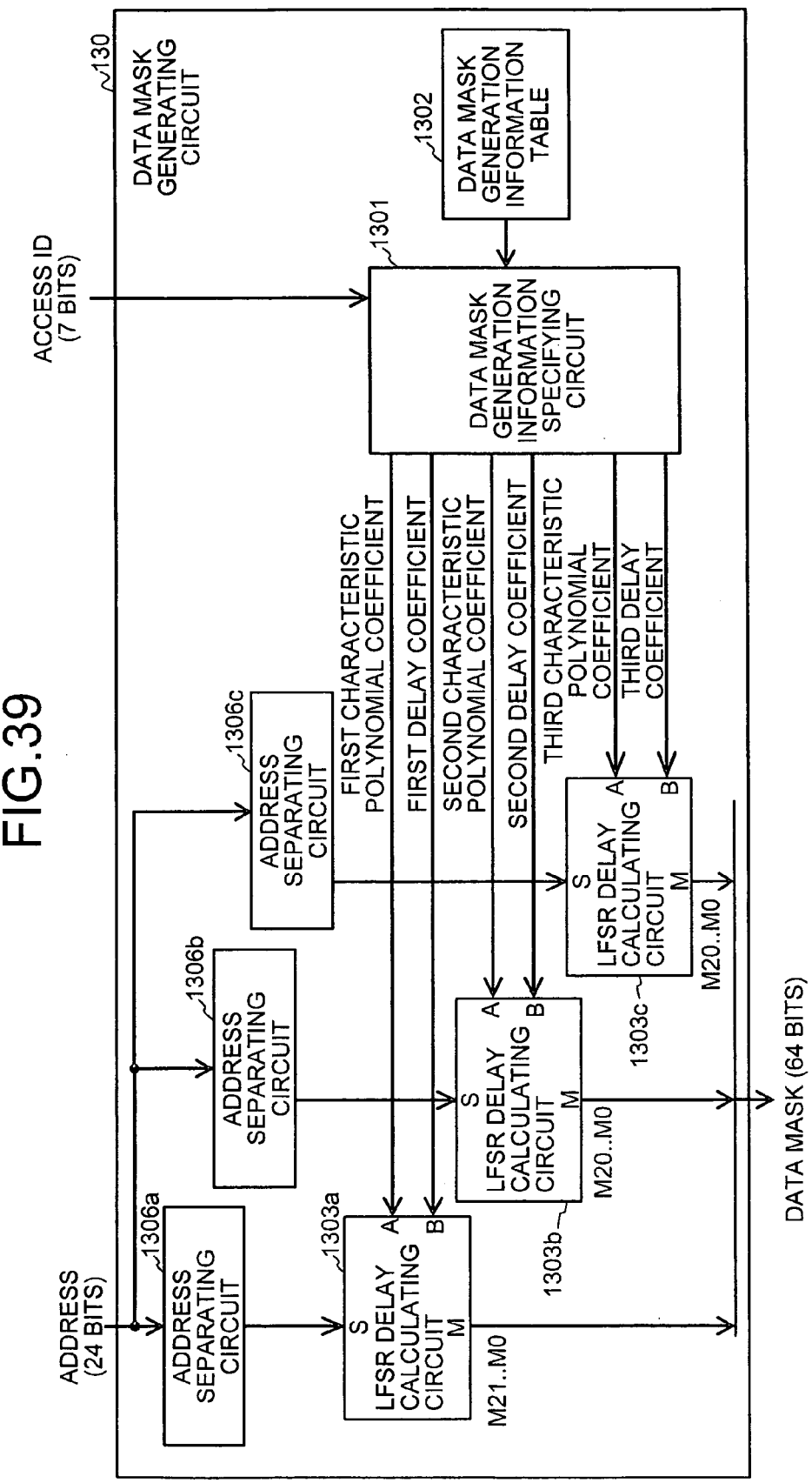
FIG. 39 is a block diagram of the data mask generating circuit having only address separating circuits.

FIG. 38 is a block diagram of the data mask generating circuit 130 having only the zero-shift circuits 1305*a*, 1305*b*, and 1305*c*. FIG. 39 is a block diagram of the data mask generating circuit 130 having only the address separating circuits 1306*a*, 1306*b*, and 1306*c*.

Figure 40:
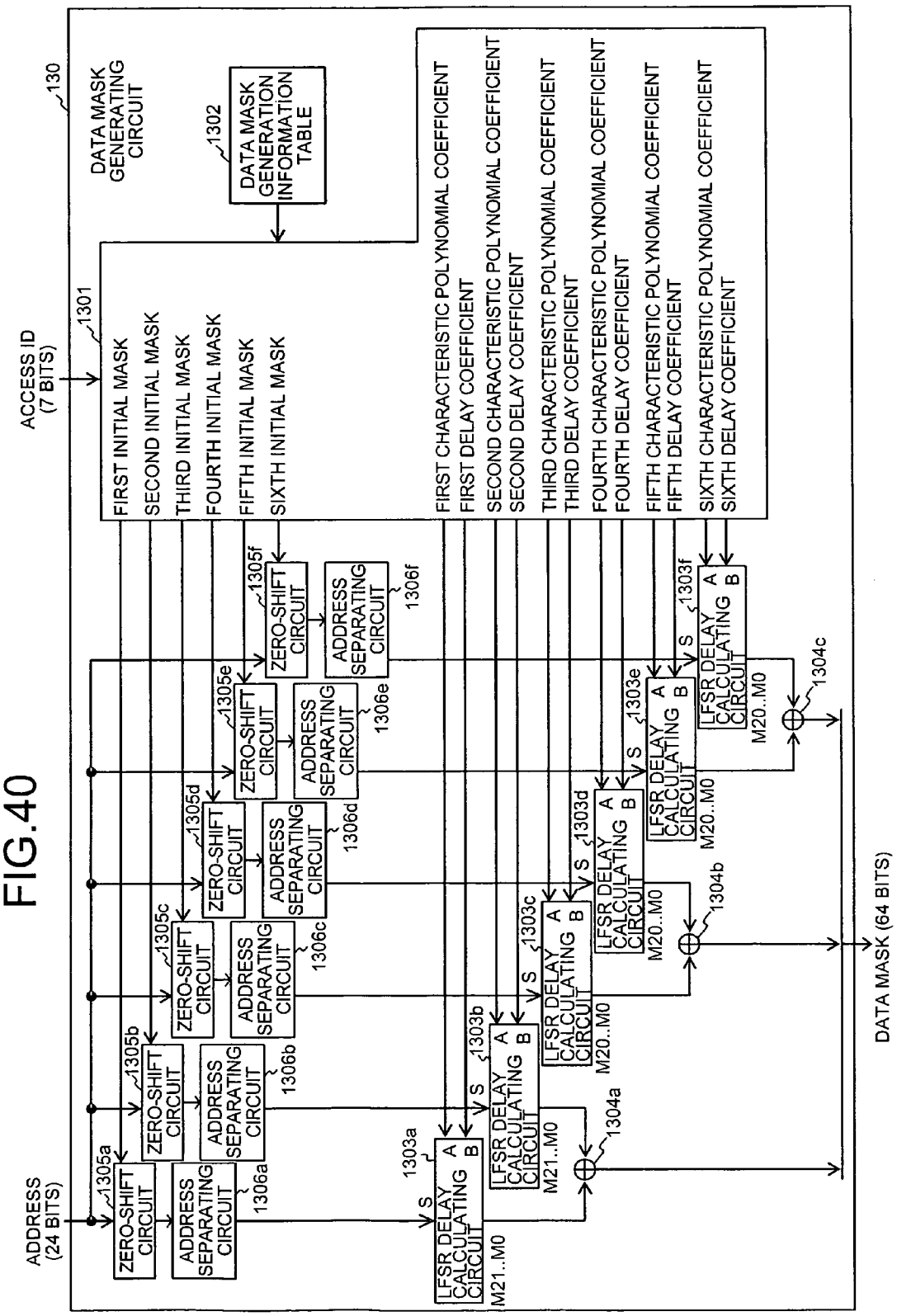
FIG. 40 is a block diagram showing a data mask generating circuit according to a third modification of the seventh embodiment.

FIG. 40 is a block diagram showing a data mask generating circuit 130 according to a third modification. The data mask generating circuit 130 according to the modification is obtained by applying the data mask generating circuit 130 according to the seventh embodiment to the data mask generating circuit 130 according to the sixth embodiment. A zero-shift circuit 1305 and an address separating circuit 1306 may be arranged in each of the LFSR delay calculating circuits 1303 used in pairs.

In this case, only the zero-shift circuits 1305 may be arranged. As another example, the data mask generating circuit 130 may have only the address separating circuit 1306.

Figure 41:
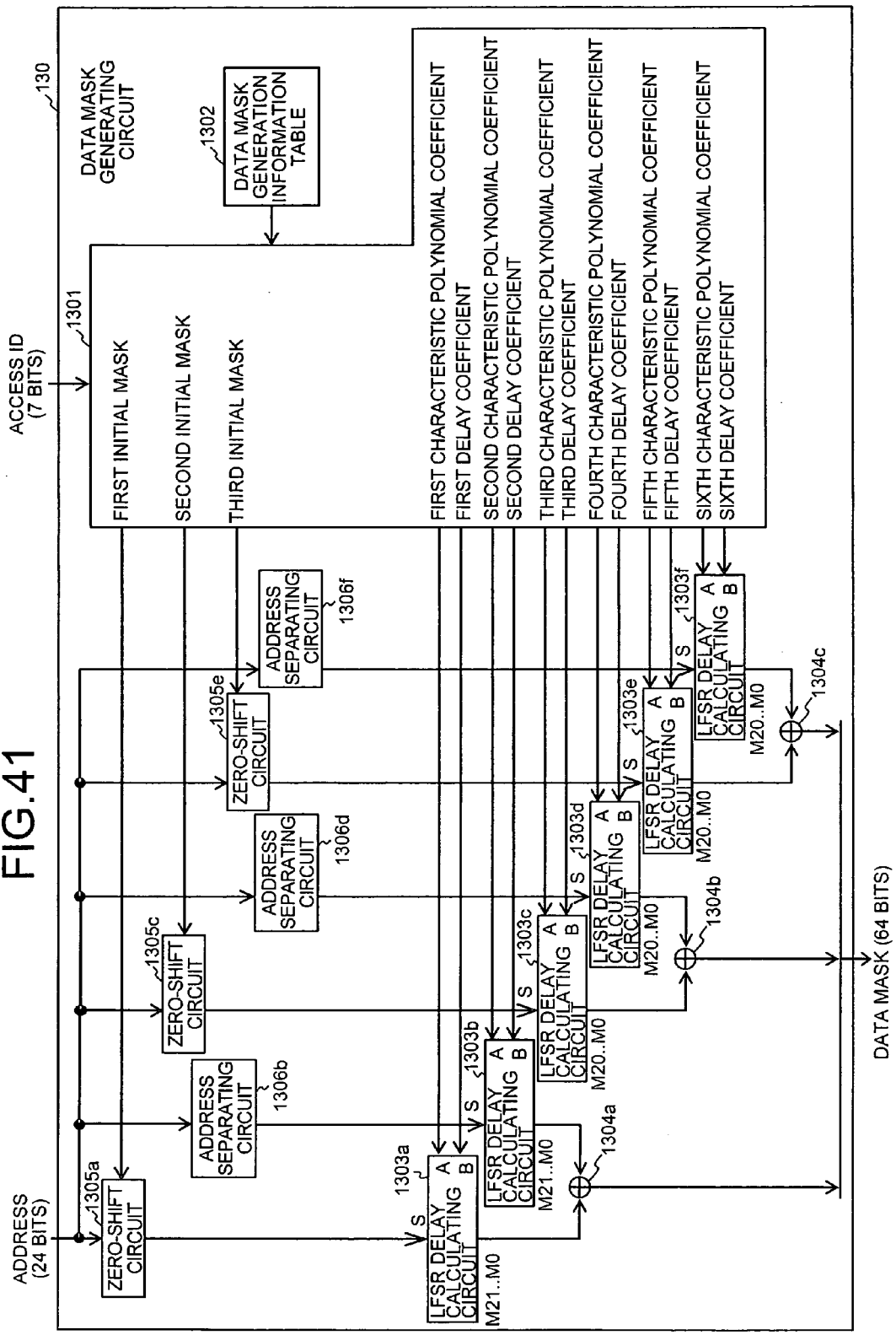
FIG. 41 is a block diagram of a data mask generating circuit according to a fourth modification of the seventh embodiment.

FIG. 41 is a block diagram of a data mask generating circuit 130 according to a fourth modification. The data mask generating circuit 130 shown in FIG. 41 uses two LFSR delay calculating circuits 1303 in pairs as in the configuration of the data mask generating circuit 130 shown in FIG. 40. A zero-shift circuit 1305 is arranged in one of the pair of two LFSR delay calculating circuits 1303, and an address separating circuit 1306 is arranged in the other. In this manner, the presence/absence of the zero-shift circuit 1305 and the address separating circuit 1306 may be converted depending on the LFSR delay calculating circuits 1303.

Figure 42:
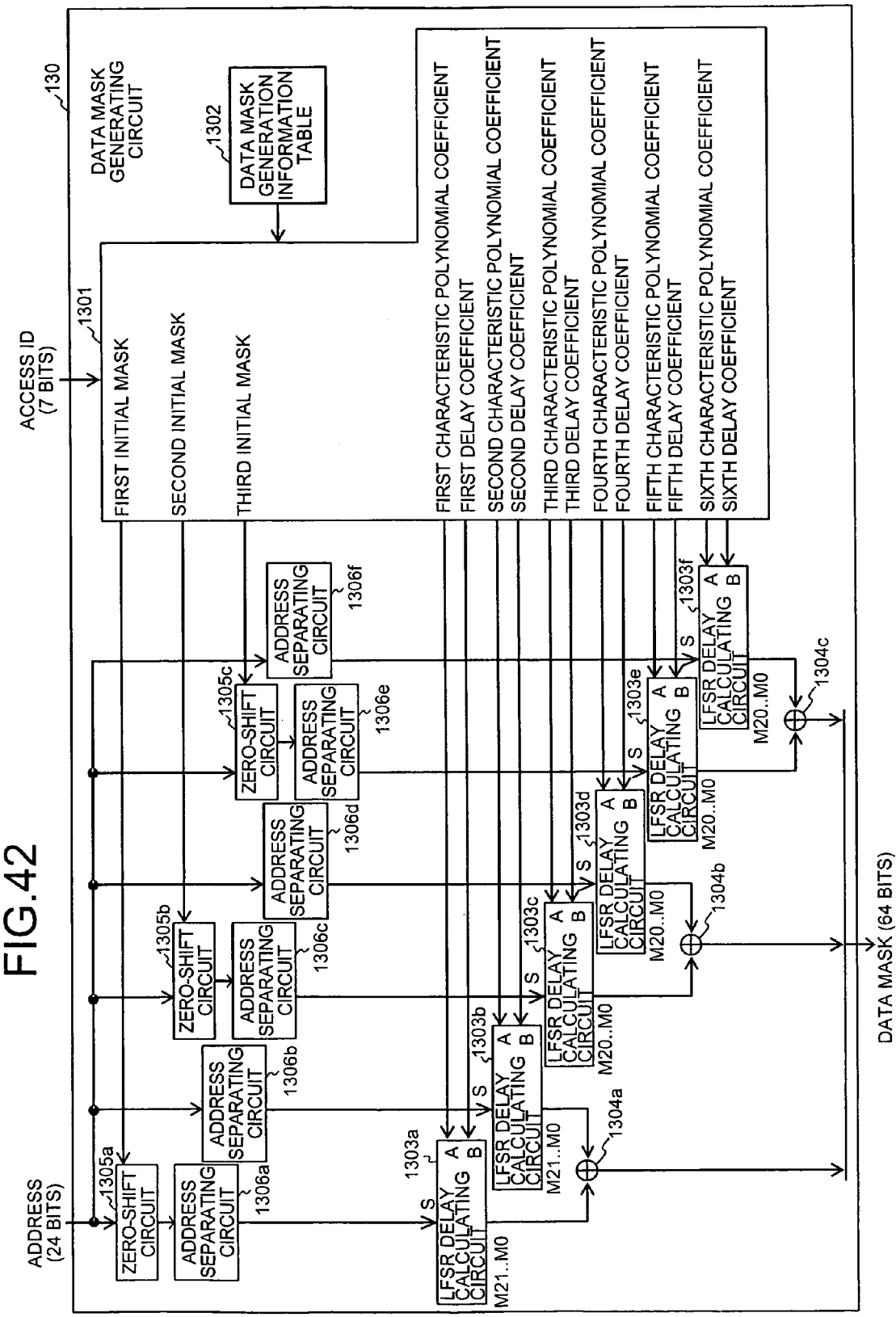
FIG. 42 is a block diagram of a data mask generating circuit according to a fifth modification of the seventh embodiment.

FIG. 42 is a block diagram of a data mask generating circuit 130 according to a fifth modification. The data mask generating circuit 130 uses two LFSR delay calculating circuits 1303 in pairs as in the configuration of the data mask generating circuit 130 shown in FIG. 40. A zero-shift circuit 1305 and an address separating circuit 1306 are arranged in one of the pair of two LFSR delay calculating circuits 1303, and only an address separating circuit 1306 is arranged in the other. The combination of the zero-shift circuit and the address separating circuit is not limited to the above, and various combinations can be employed.

Eighth Embodiment

Figure 43:
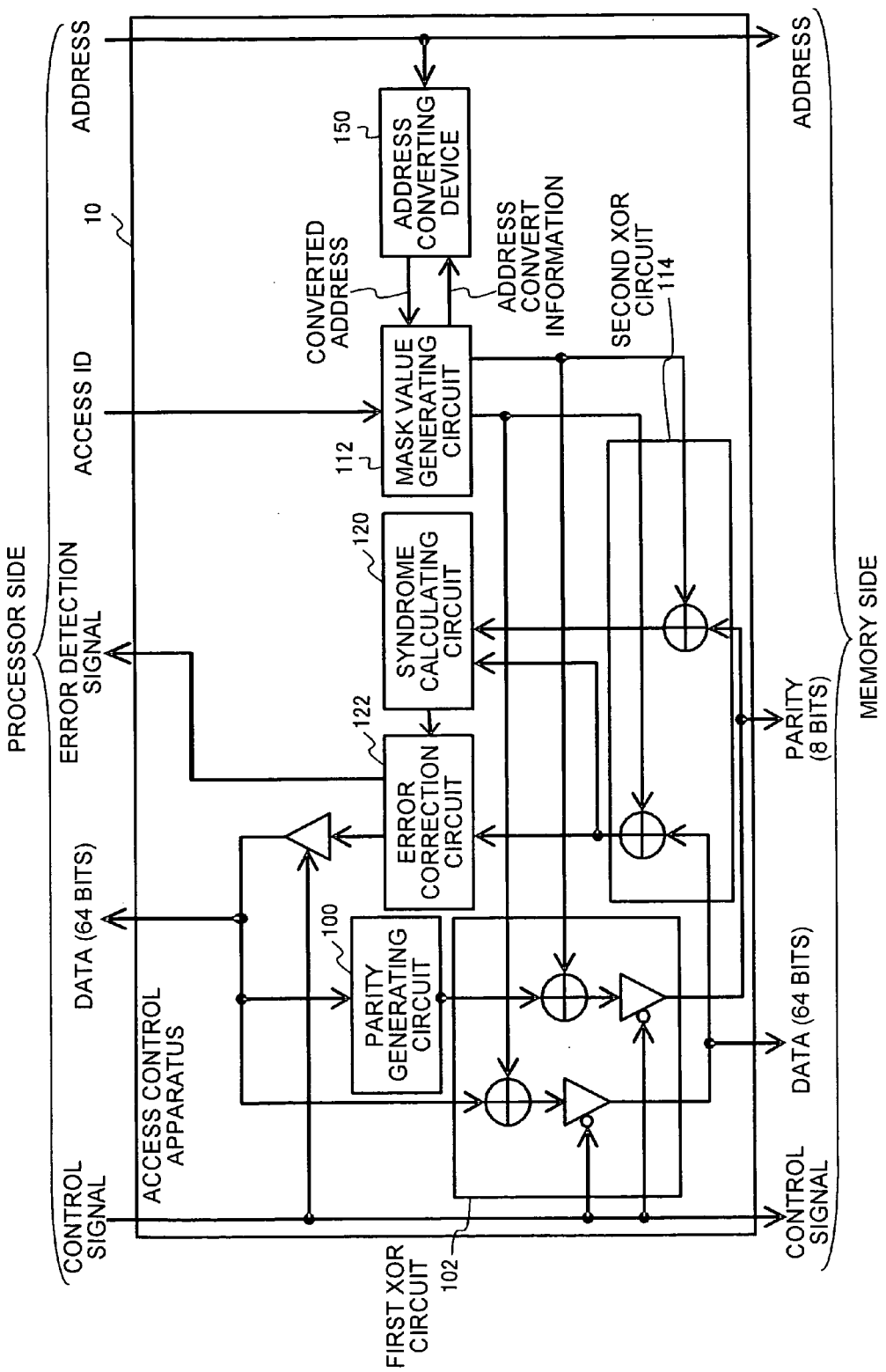
FIG. 43 is a block diagram showing a functional configuration of an apparatus according to an eighth embodiment.

An access control system 1 according to the eighth embodiment will be described below. FIG. 43 is a block diagram of a functional configuration of an access control apparatus 10 according to the eighth embodiment. The access control apparatus 10 according to the eighth embodiment further includes an address converting device 150. With respect to this point, the access control apparatus 10 is different from the access control apparatus 10 according to the other embodiments.

The address converting device 150 converts addresses acquired from a processor 20. The mask value generating circuit 112 acquires an address after converted by the address converting device 150. The mask value generating circuit 112 generates a mask value on the basis of the address.

In this manner, in the access control apparatus 10 according to the eighth embodiment, the mask value generating circuit 112 generates a mask value on the basis of an address obtained after address conversion. Therefore, in comparison with a case where a mask value is generated on the basis of an address acquired from the processor 20, a mask value which less correlates with the address acquired from the processor 20 can be generated.

Figure 44:
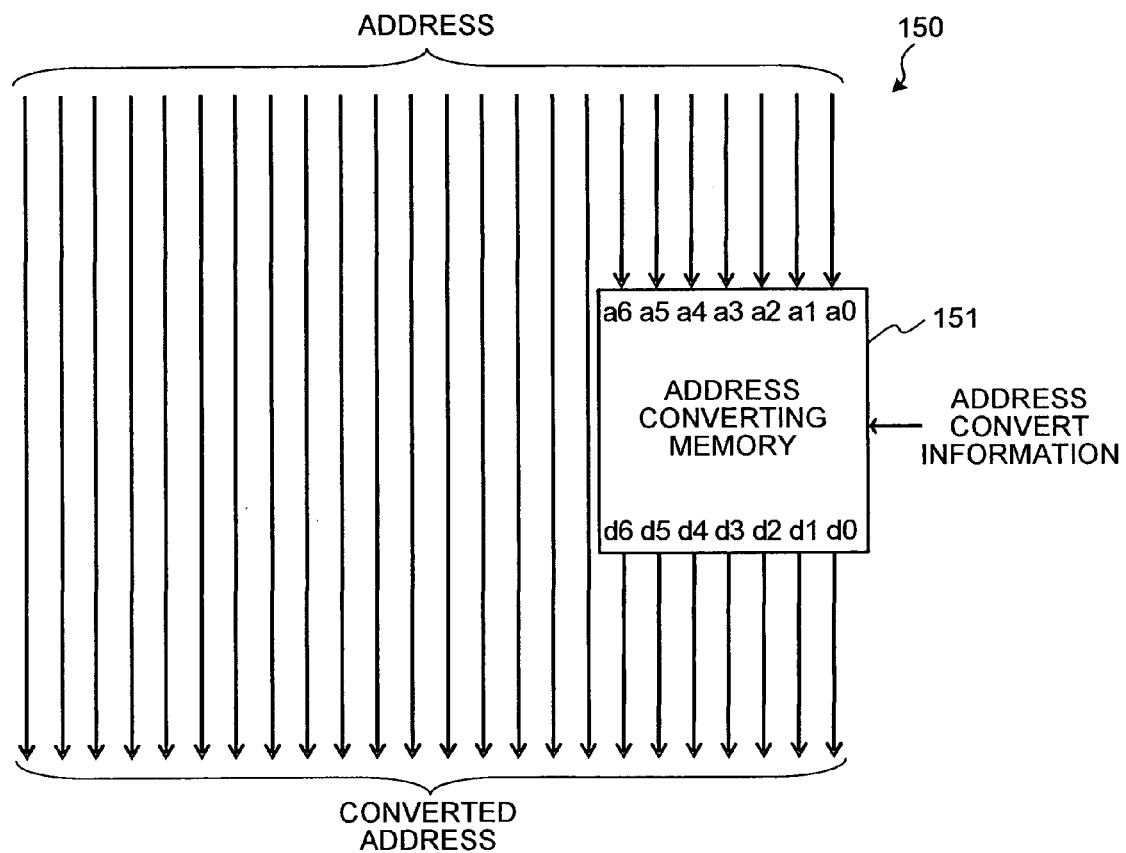
FIG. 44 is a diagram showing a concrete configuration of an address converting device.

FIG. 44 is a block diagram showing a concrete configuration of the address converting device 150. The address converting device 150 has an address converting memory 151. In the address converting memory 151, a corresponding table which shows correspondence between addresses and converted addresses is recorded. Lower bits of the input address are converted and output.

The corresponding table recorded in the address converting memory 151 is desirably converted depending on access IDs. The corresponding tables of the access IDs are held in the mask value generating circuit 112. More specifically, the corresponding tables are held in the data mask generation information table 1302. In switching of access IDs, the corresponding tables are written in the address converting memory 151.

The other configurations and the other processes of the access control system 1 according to the eighth embodiment are the same as the configurations and the processes of the access control system 1 according to the other embodiments.

Figure 45:
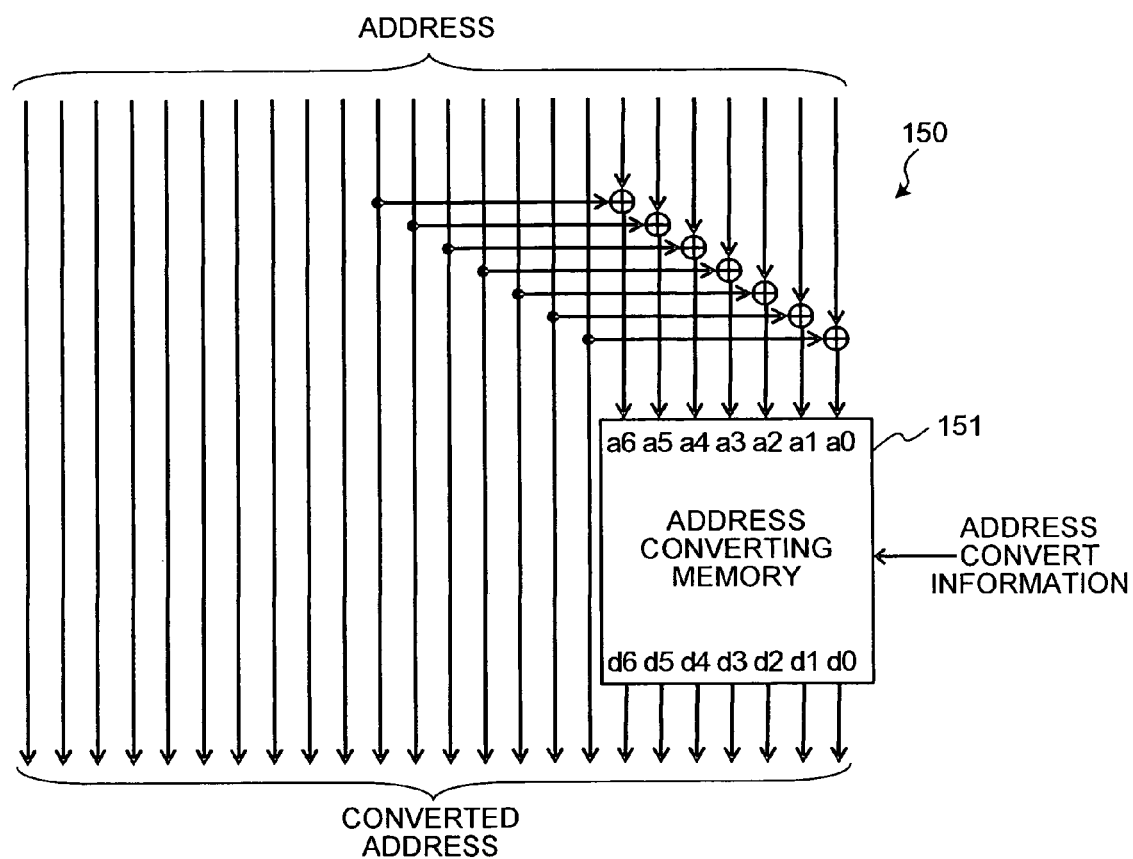
FIG. 45 is a diagram showing a configuration of an address converting device according to a first modification of the eighth embodiment.

FIG. 45 is a diagram showing a configuration of an address converting device 150 according to a first modification of the eighth embodiment. The address converting device 150 according to the first modification calculates an XOR between intermediate bits of an address and lower bits of the address. The address converting device 150 according to the first modification outputs the address converted as described above. In this manner, conversion patterns of the lower bits obtained by an address converting memory can be increased in number.

Figure 46:
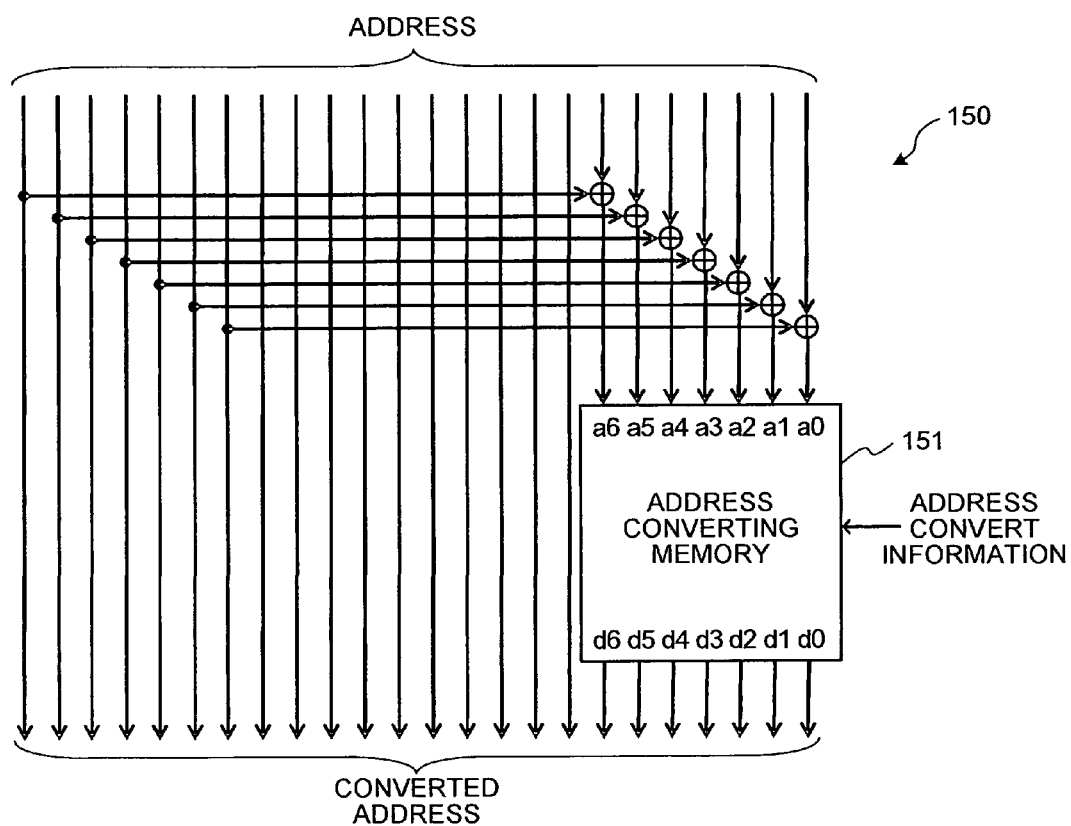
FIG. 46 is a diagram showing a configuration of an address converting device according to a second modification of the eighth embodiment.

FIG. 46 is a diagram showing a configuration of an address converting device 150 according to a second modification of the eighth embodiment. In this manner, in comparison with a case shown in FIG. 45, an XOR between higher bits of an address and lower bits of the address may be calculated.

Figure 47:
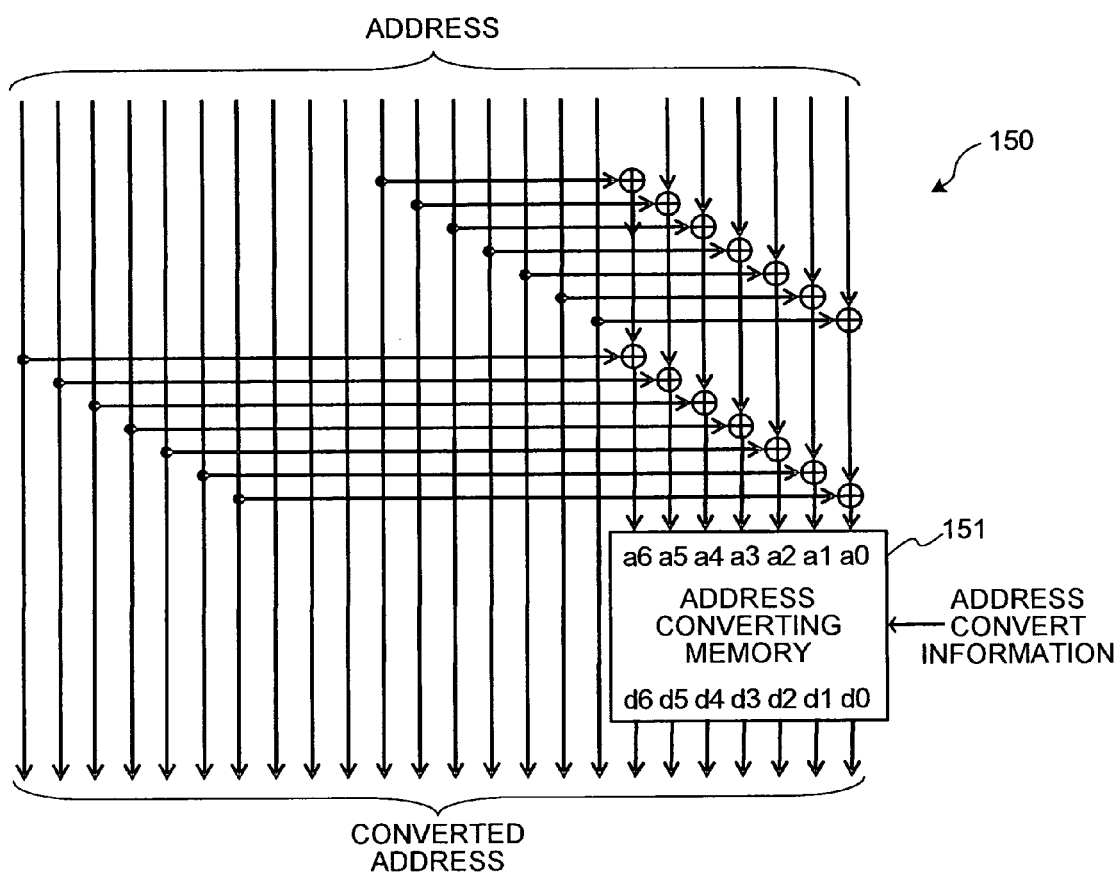
FIG. 47 is a diagram showing a configuration of an address converting device according to a third modification of the eighth embodiment.

FIG. 47 is a diagram showing a configuration of an address converting device 150 according to a third modification of the eighth embodiment. In this manner, an XOR between intermediate bits of the address and the lower bits of the address may be calculated, and an XOR between the calculation result and the upper bits of the address may be calculated.

The access control systems 1 according to the first to eighth embodiments are described above. However, the access control apparatus 10 characterized in the embodiments may be applied to following other systems.

Figure 48:
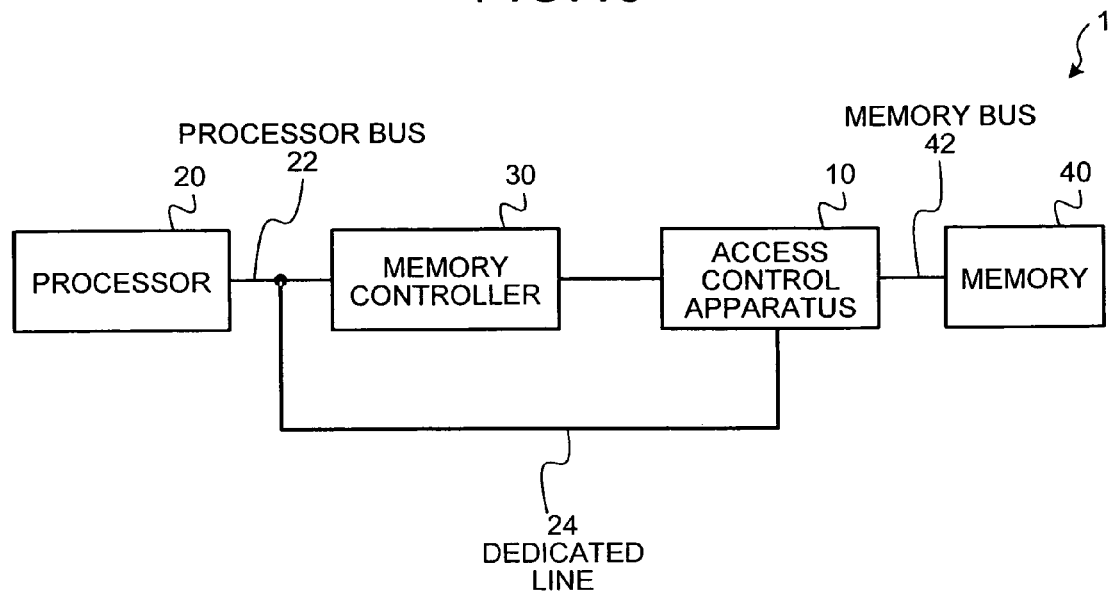
FIG. 48 is a diagram showing an entire configuration of an access control system according to a first modification.

FIG. 48 is a diagram showing an entire configuration of an access control system 1 according to a first modification. The access control system 1 according to the first modification includes an access control apparatus 10 as in the access control system 1 according to any of the foregoing embodiment.

In the access control system 1 according to the first modification, the processor 20 sets the information related to the access authority into the access control device 10. Therefore, the access control system 1 further includes a dedicated line 24.

Information related to an access authority is input or output through the dedicated line to make it possible to prevent unauthorized access.

Figure 49:
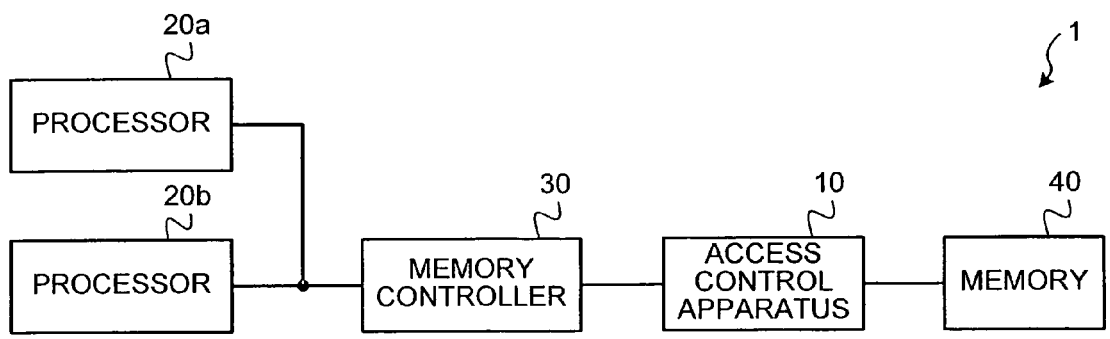
FIG. 49 is a diagram showing an entire configuration of an access control system according to a second modification.

FIG. 49 is a diagram of an entire configuration of the access control system 1 according to a second modification. The access control system 1 according to the second modification includes a plurality of processors 20*a* and 20*b*. In this case, the processors 20*a* and 20*b* may serve as requesters of access to the memory 40. The access control apparatus 10 may control access to the memory 40 in units of processors. More specifically, access IDs are allocated to the processors, respectively. Furthermore, the access IDs are allocated to the memory areas to be accessed of the processors.

Figure 50:
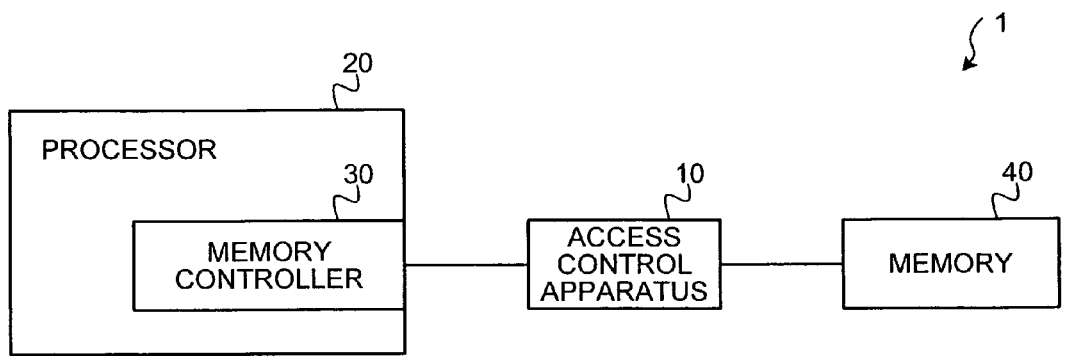
FIG. 50 is a diagram showing an entire configuration of an access control system according to a third modification.

FIG. 50 is a diagram showing an entire configuration of the access control system 1 according to a third modification. In the access control system 1 according to the third modification, a memory controller 30 is built in the processor 20. The processor 20 is connected to the memory 40 through the access control system 1.

Figure 51:
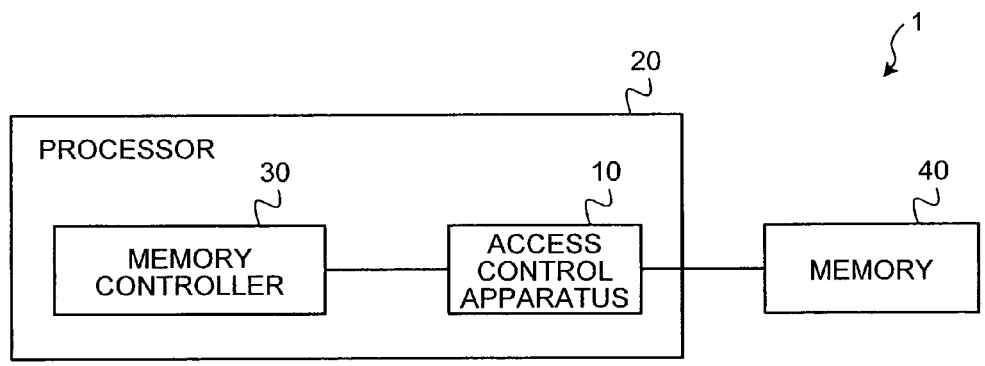
FIG. 51 is a diagram showing an entire configuration of an access control system according to a fourth modification.

FIG. 51 is a diagram showing an entire configuration of an access control system 1 according to a fourth modification. In the access control system 1 according to the fourth modification, a memory controller 30 and an access control apparatus 10 are built in a processor 20. The processor 20 is directly connected to a memory 40.

Figure 52:
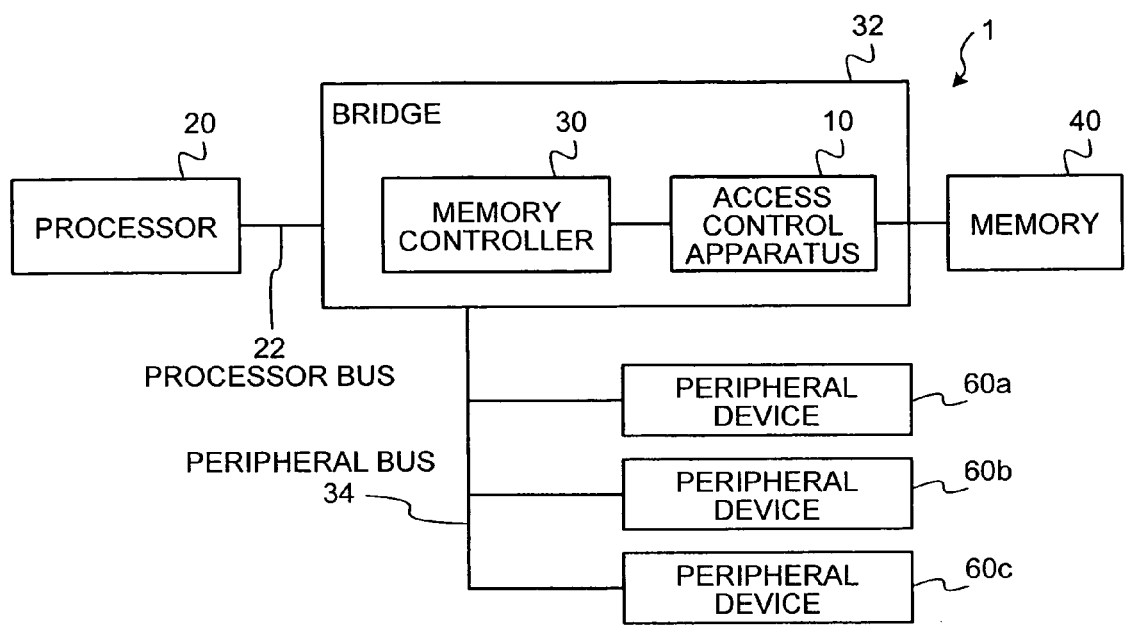
FIG. 52 is a diagram showing an entire configuration of an access control system according to a fifth modification.

FIG. 52 is a diagram showing an entire configuration of an access control system 1 according to a fifth modification. The access control system 1 according to the fifth modification includes the processor 20, the memory 40, a bridge 32, and peripheral devices 60*a*, 60*b*, and 60*c*.

The bridge 32 is connected to a processor bus 22 and has the memory controller 30 and an access control apparatus 10. For example, when the bridge 32 contains a controller of a peripheral device connected to a peripheral bus 34, the access control apparatus 10 can be built in the bridge 32 as described above. Furthermore, as another example, the access control apparatus 10 may be arranged between the bridge 32 and the memory 40.

Figure 53:
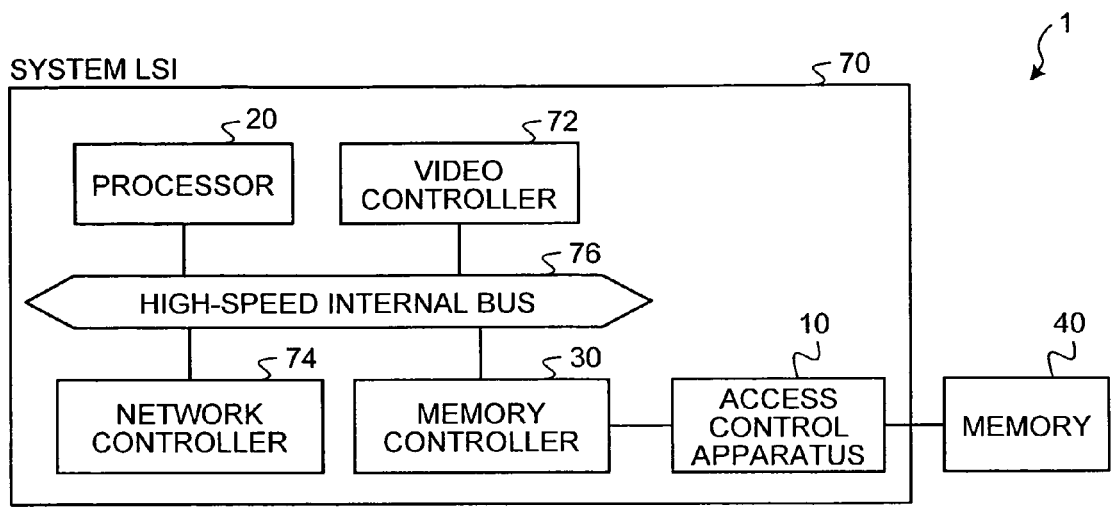
FIG. 53 is a diagram showing an entire configuration of an access control system according to a sixth modification.

FIG. 53 is a diagram showing an entire configuration of an access control system 1 according to the sixth modification. The access control system 1 according to the sixth modification is formed as a system LSI (Large Scale Integration). The access control apparatus 10, as shown in FIG. 53, is mounted in the system LSI together with a memory controller 30 connected to a processor 20 through a high-speed internal bus 76.

Figure 54:
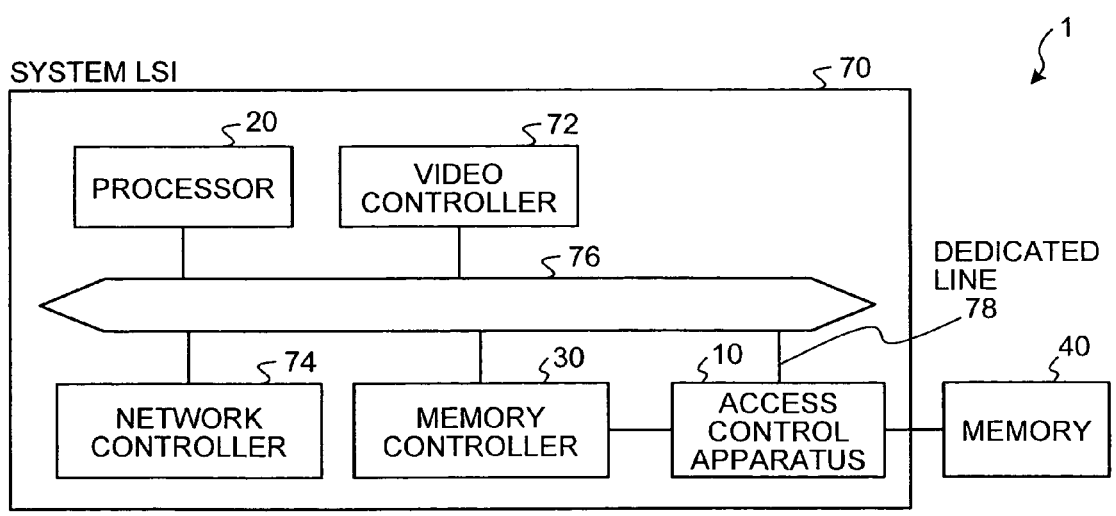
FIG. 54 is a diagram showing an entire configuration of an access control system according to a seventh modification.

FIG. 54 is a diagram showing an entire configuration of an access control system 1 according to a seventh modification. The access control system 1 according to the seventh modification is formed as a system LSI like the access control system 1 according to the sixth modification. Furthermore, in the access control system 1 according to the seventh modification, a dedicated line 78 for setting information related to an access authority is arranged between the processor 20 and the access control apparatus 10. In this manner, the processor 20 can directly access the access control apparatus 10 through the high-speed internal bus 76.

As another example, the memory controller and the access control circuit may be mounted as an integrated circuit.

Ninth Embodiment

Figure 55:
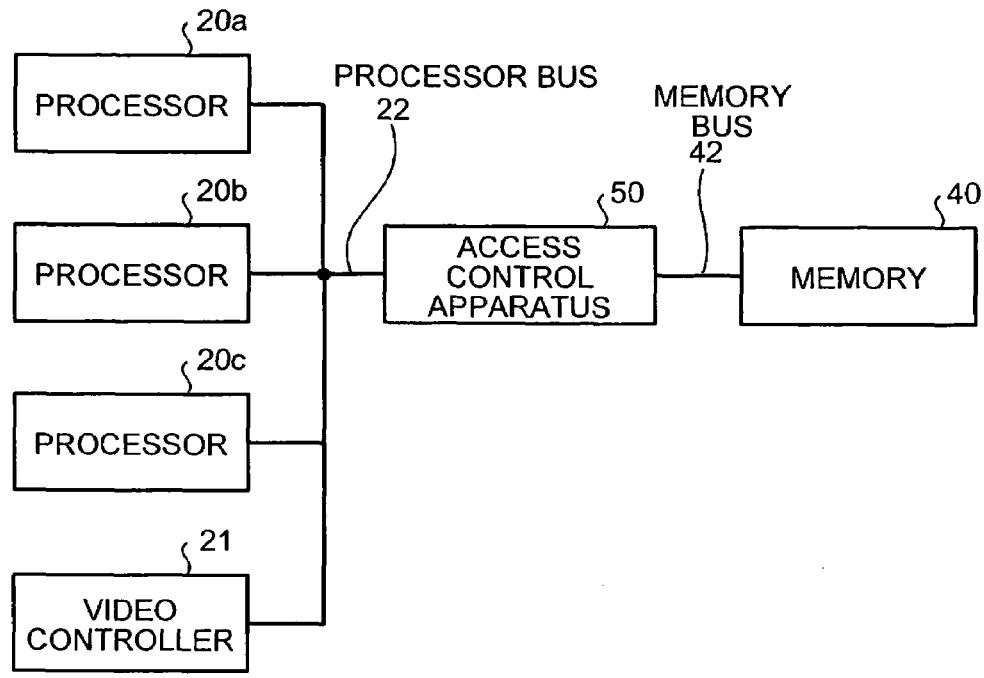
FIG. 55 is a diagram showing an entire configuration of an access control system according to a ninth embodiment.

An access control system 1 according to a ninth embodiment will be described below. The access control system 1 according to the ninth embodiment performs control of access to a cache memory. FIG. 55 is a diagram showing an entire configuration of the access control system 1 according to the ninth embodiment. The access control system 1 includes a plurality of processors 20a to 20c, a video controller 21, a memory 40, and an access control apparatus 50 having a cache memory.

The access control apparatus 50 is connected to a processor bus 22 and a memory bus 42 to control access to the cache memory from the plurality of processors 20a to 20c and the video controller 21 connected through the processor bus 22. Furthermore, as needed, the access control apparatus 50 writes data in the memory 40 or reads data from the memory 40 in place of the processor 20a or the like. More specifically, the access control apparatus 50 also has the function of the memory controller 30 according to the other embodiments.

As in the access control system 1 according to the ninth embodiment, when the plurality of processors and the input/output device such as the video controller 21 are arranged, a cache memory shared by the processors and the input/output device is used to make it possible to increase a speed of memory access.

Figure 56:
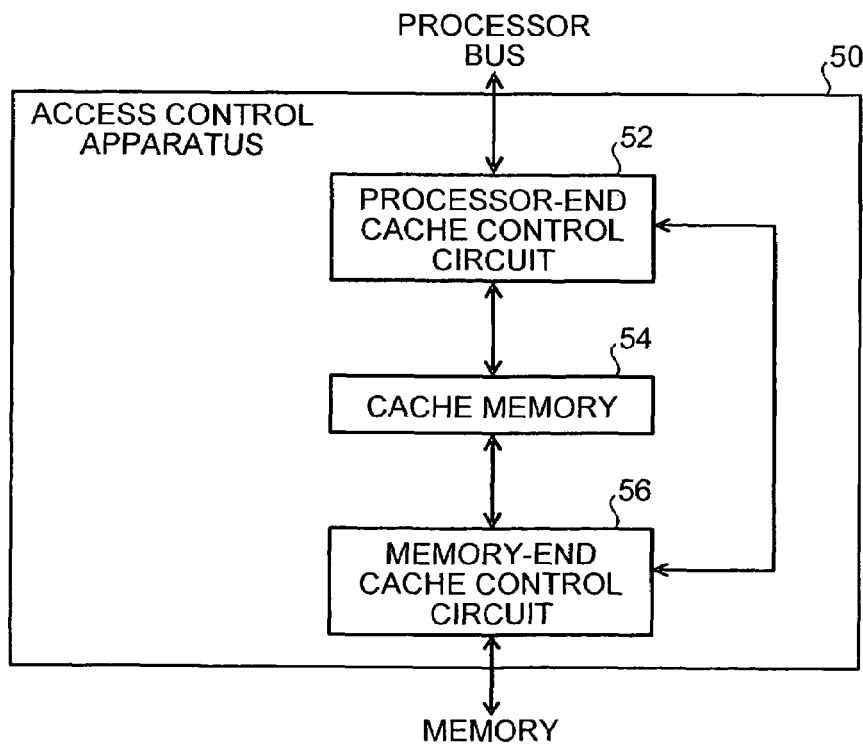
FIG. 56 is a block diagram showing a detailed functional configuration of an access control apparatus.

FIG. 56 is a block diagram showing a detailed functional configuration of the access control apparatus 50. The access control apparatus 50 includes a processor-end cache control circuit 52, a cache memory 54, and a memory-end cache control circuit 56. The processor-end cache control circuit 52 writes data in the cache memory 54 or read data from the cache memory 54 on the basis of a designation from the processor. The cache memory 54 temporarily holds data, memory addresses, and the like associated with each other.

The memory-end cache control circuit 56 writes data in the memory 40 and reads data from the memory 40 on the basis of a designation from the processor-end cache control circuit 52.

Figure 57:
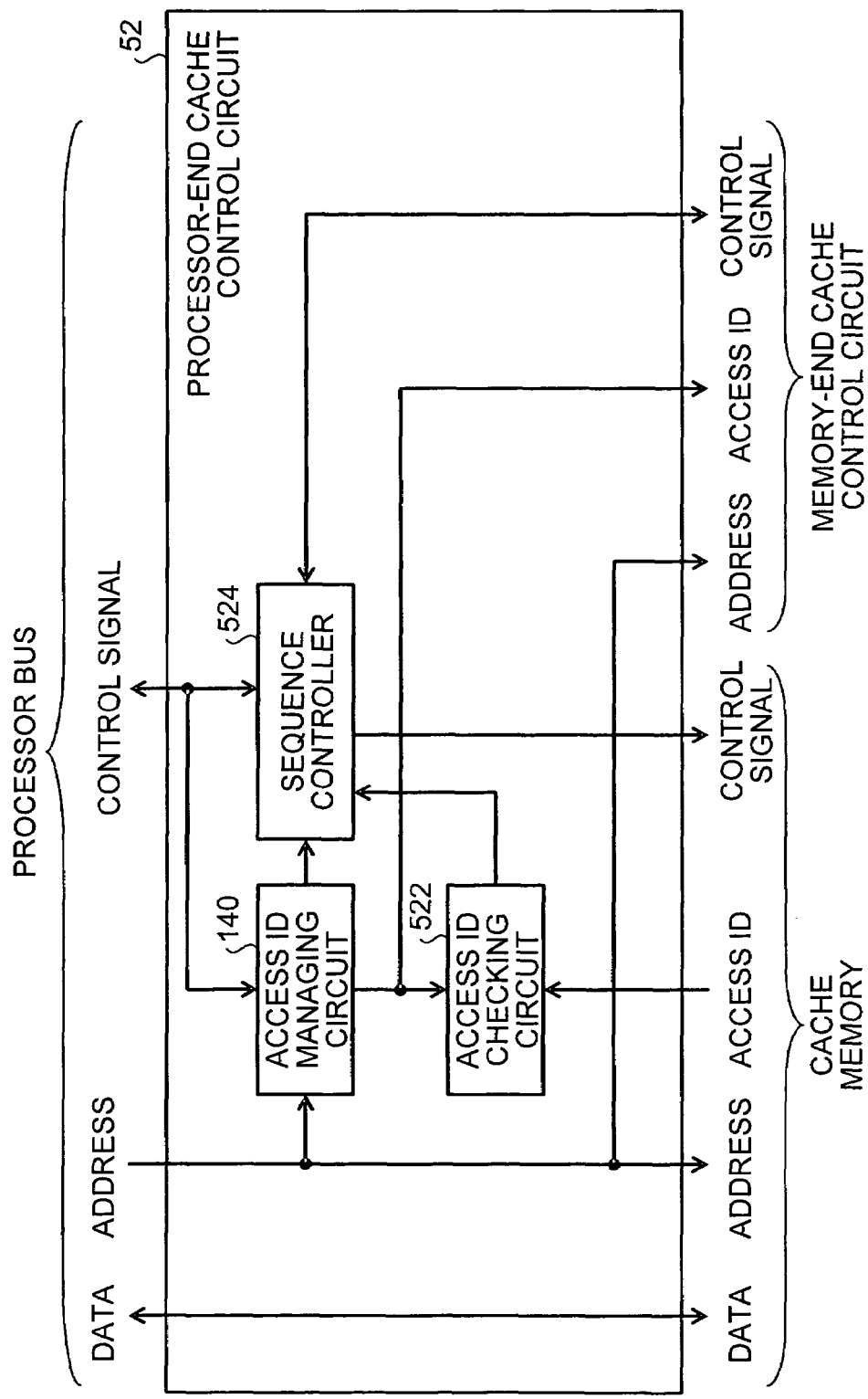
FIG. 57 is a block diagram of a detailed functional configuration of a processor-end cache control circuit.

FIG. 57 is a block diagram showing a detailed functional configuration of the processor-end cache control circuit 52. The processor-end cache control circuit 52 has an access ID management circuit 140, an access ID checking circuit 522, and a sequence controller 524.

The functional configuration of the access ID management circuit 140 is the same as the functional configuration of the access ID management circuit 140 explained with reference to FIG. 19 in the second embodiment. The access ID management circuit 140 specifies an access ID on the basis of an address. The access ID checking circuit 522 compares the access ID specified by the access ID management circuit 140 with the access ID stored in the cache memory 54 to check whether the access IDs are equal to each other. The sequence controller 524 controls an entire operation of the processor-end cache control circuit 52.

Figure 58:
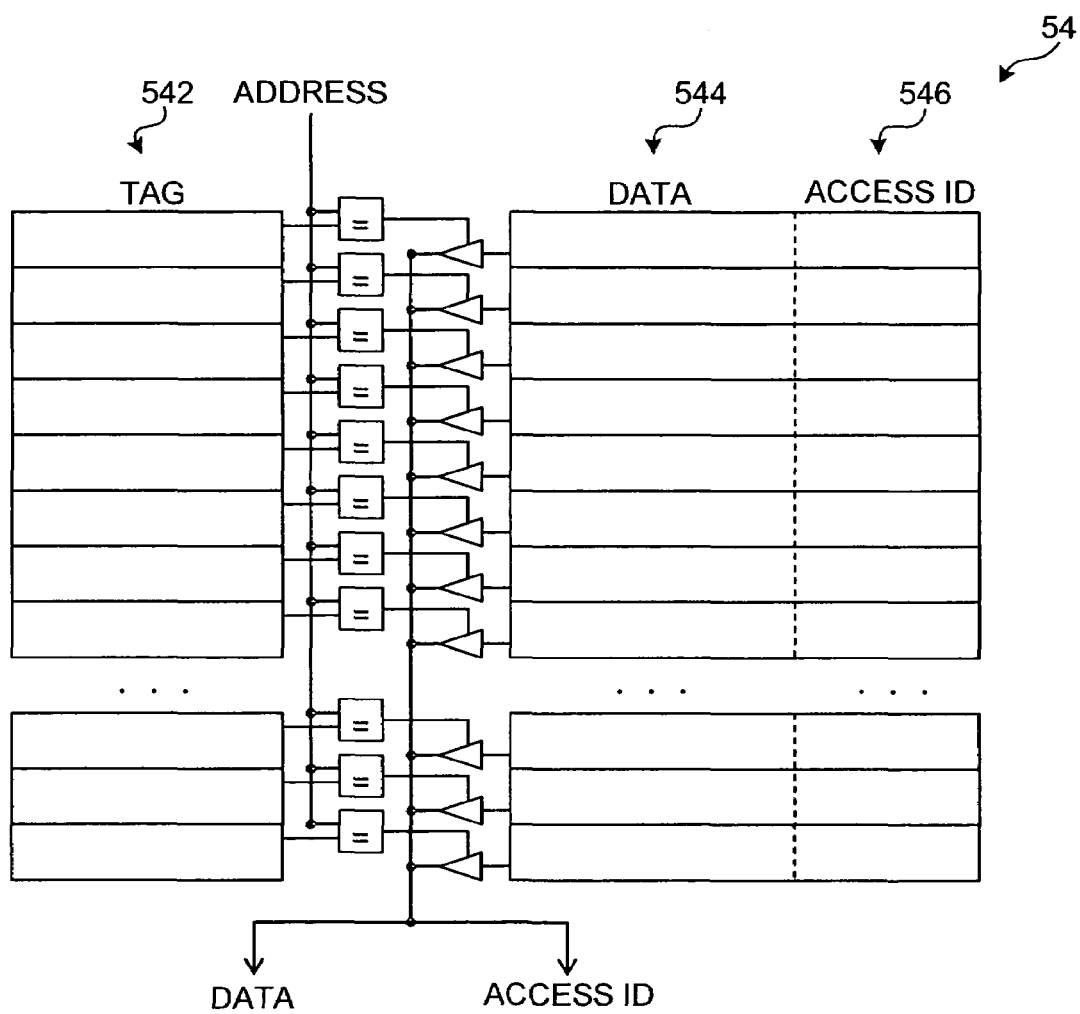
FIG. 58 is a block diagram showing a detailed functional configuration of a cache memory.

FIG. 58 is a block diagram showing a detailed functional configuration of the cache memory 54. The cache memory 54 has a data area 544 which stores data accessed in the past, a tag storing area 542 which stores an address of data in the memory 40, and an access ID storing area 546 which stores an access ID which can access data. In the areas, the address, the data, and the access ID are stored associated with each other.

When data is stored in the cache memory 54 and an access to the same address is requested, data stored in the data area 544 is returned associated with the address to make it possible to reduce delay caused by the access to the memory 40. Although the cache memory 54 can use various systems such as direct mapping type or set associative type, the system is not specified to these types. Any system may be used.

Figure 59:
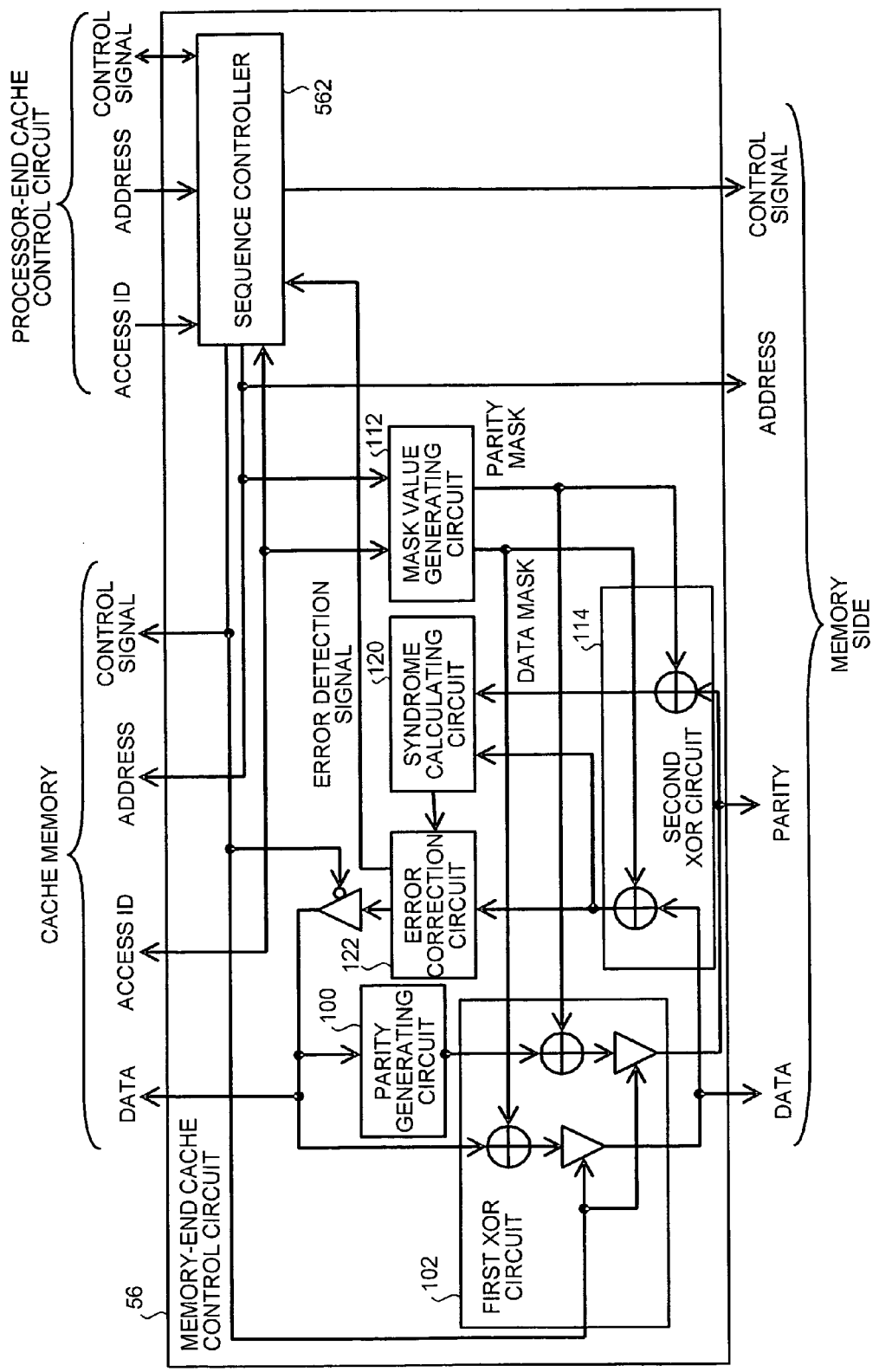
FIG. 59 is a block diagram showing a detailed functional configuration of a memory-end cache control circuit.

FIG. 59 is a block diagram showing a detailed functional configuration of the memory-end cache control circuit 56. The memory-end cache control circuit 56 includes a parity generating circuit 100, a first XOR circuit 102, a mask value generating circuit 112, a second XOR circuit 114, a syndrome calculating circuit 120, an error correction circuit 122, and a sequence controller 562.

The sequence controller 562 controls an entire operation of the memory-end cache control circuit 56. The functional configurations of parity generating circuit 100, the first XOR circuit 102, the mask value generating circuit 112, the second XOR circuit 114, the syndrome calculating circuit 120, and the error correction circuit 122 are the same as the functional configurations of the parity generating circuit 100, the first XOR circuit 102, the mask value generating circuit 112, the second XOR circuit 114, the syndrome calculating circuit 120, and the error correction circuit 122 according to the first embodiment.

In the memory-end cache control circuit 56 according to the ninth embodiment, data read from the memory 40 is stored in the cache memory 54 together with a corresponding access ID. When data is written in the memory 40, data is acquired from the cache memory 54.

Figure 60:
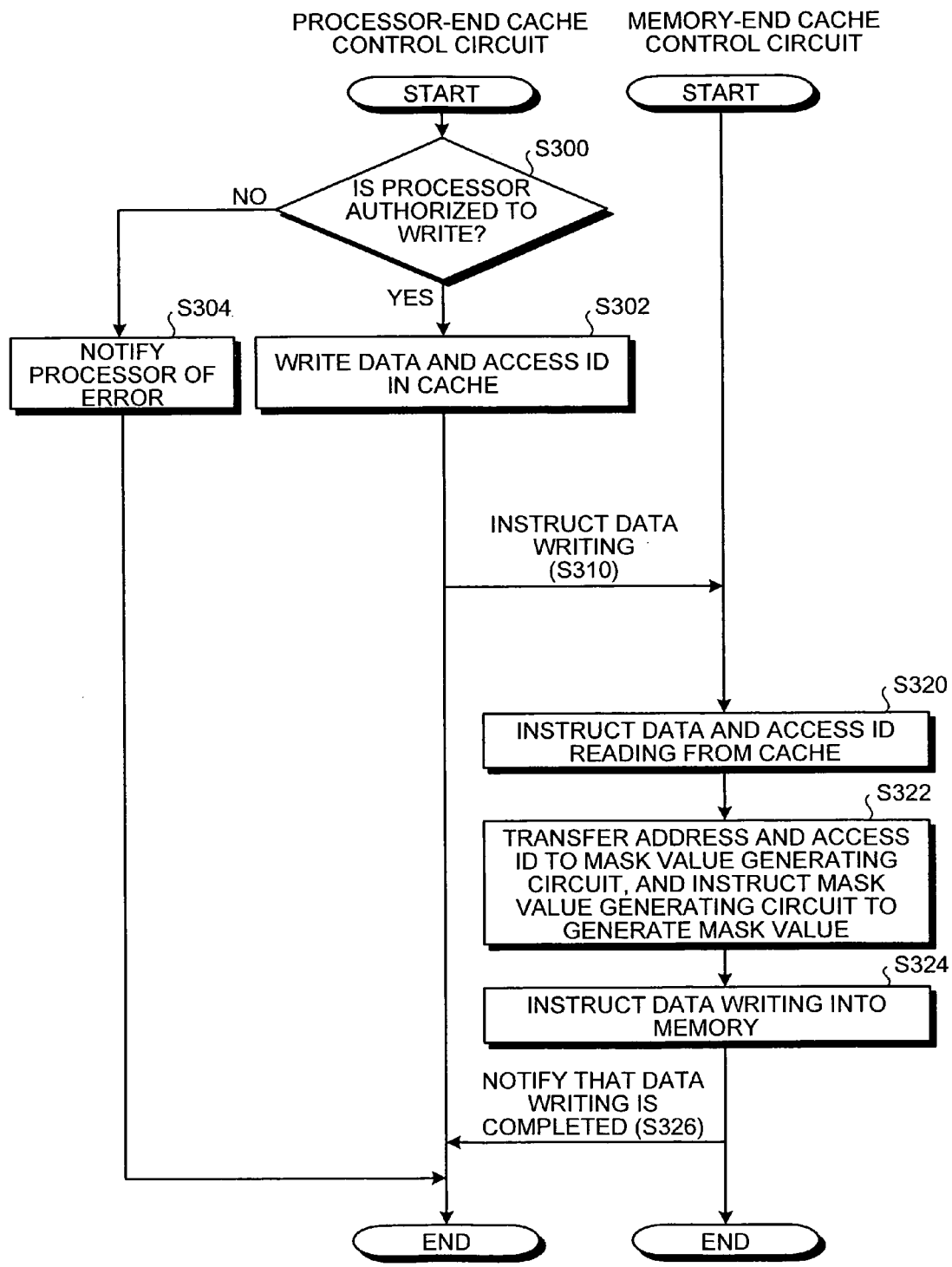
FIG. 60 is a flow chart showing a write process included in an access control process in the access control system according to the ninth embodiment.

FIG. 60 is a flow chart showing a write process included in the access control process in the access control system 1 according to the ninth embodiment. First, the access ID management circuit 140 of the processor-end cache control circuit 52 checks whether the processor 20 has a write authority (step S300). More specifically, an access ID and an address of a write destination are acquired from the processor 20. In the access ID table 142, it is determined whether the acquired ID and the address are associated with each other.

When the access ID and the address are associated with each other, it is determined that the processor 20 has a write authority. When the processor 20 has no write authority (No in step S300), the processor 20 is notified that an error occurs (step S304), and the process is completed.

On the other hand, when the processor 20 has a write authority (Yes in step S300), the data acquired from the processor 20 and the access ID are written in the cache memory 54 associated with each other (step S302).

Next, the sequence controller 524 outputs a data write designation to the memory-end cache control circuit 56 (step S310). More specifically, the designation is made by a control signal. When the sequence controller 562 of the memory-end cache control circuit 56 receives a write designation, the sequence controller 562 designates the cache memory 54 to read the data and the access ID and acquires the data and the access ID from the cache memory 54 (step S320).

Then, the sequence controller 524 gives the address of a storing destination and an access ID to the mask value generating circuit 112 to generate a mask value (step S322). The mask value generating circuit 112 generates a mask value on the basis of the address and the access ID according to the designation. The sequence controller 562 designates the memory 40 to write data (step S324). According to the designation, by the processes of the first XOR circuit 102, the second XOR circuit 114, and the like, a parity is added. A first post-operation data obtained by calculating an XOR between the data and the mask value is written at an address designated by the processor 20.

Upon completion of the writing of the data in the memory 40, the sequence controller 562 notifies the processor-end cache control circuit 52 that the writing of the data is completed (step S326). Here, the write process comes to an end.

When a write through system is used, control is desirably given to the processor 20 after completion of the writing from the cache memory 54 to the memory 40. When a write back system is used, the control is desirably given to the processor 20 before the writing from the cache memory 54 to the memory 40 is completed.

As another example, an access ID permitted to write data and an access ID permitted to read data in the access ID table 142 may be associated with addresses. In this manner, the system can cope with a case in which reading and writing are limited differently.

Figure 61:
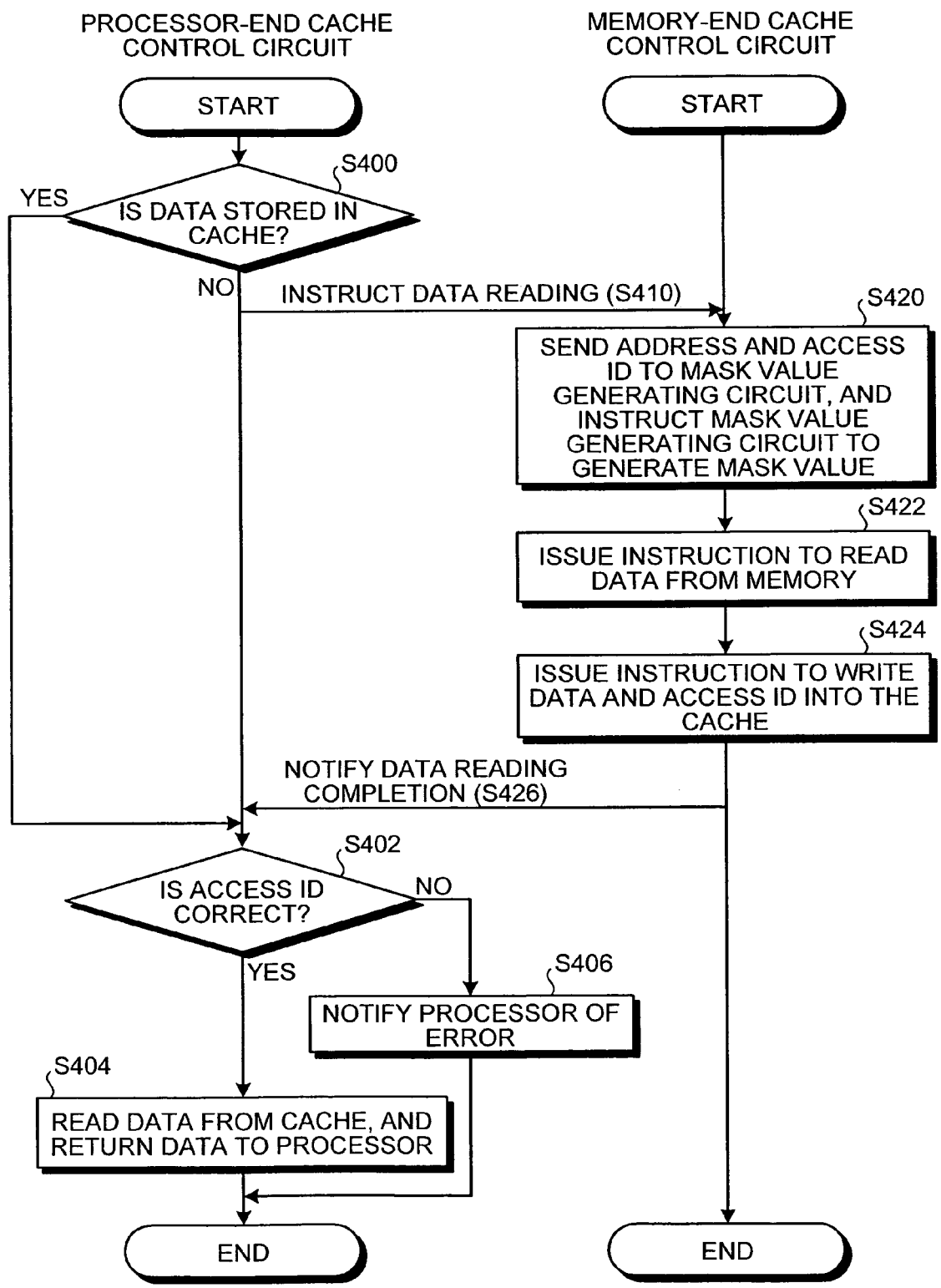
FIG. 61 is a flow chart showing a read process included in the access control process in the access control system according to the ninth embodiment.

FIG. 61 is a flow chart showing a read process included in the access control process in the access control system 1 according to the ninth embodiment. When the sequence controller 524 of the processor-end cache control circuit 52 acquires a data read request from the processor 20, it is checked whether corresponding data is stored in the cache memory 54 (step S400). When the data is stored in the cache memory 54 (Yes in step 400), the access ID check circuit 522 checks whether the access ID acquired from the processor 20 is correct, i.e., whether the processor 20 has an access authority (step S402).

When the access ID is correct (Yes in step S402), the corresponding data is read from the cache memory 54 and given to the processor 20 (step S404). On the other hand, when the access ID is not correct (No in step S402), the access ID check circuit 522 notifies the processor 20 that an error occurs (step S406).

It is determined whether the access ID is correct by comparing an access ID in the cache memory 54 associated with the corresponding data with an access ID acquired from the processor 20. When the access IDs are equal to each other, it is determined that the access ID is correct.

On the other hand, no data is stored in the processor-end cache control circuit 52 (No in step S400), the memory-end cache control circuit 56 is designated to read the data (step S410). When the sequence controller 562 of the memory-end cache control circuit 56 receives a data read designation, the address and the access ID are given to the mask value generating circuit 112 to designate the mask value generating circuit 112 to generate a mask value (step S420). According to the designation, the mask value generating circuit 112 generates a mask value.

The memory 40 is designated to read data (step S422). According to the designation, the data is read from the memory 40. The first post-operation data read here is restored to the original state by the processes in the first XOR circuit 102, the second XOR circuit 114, and the like.

As described above, according to the access control system 1 according to the ninth embodiment, data which is temporarily accessed is stored in the cache memory 54. For this reason, subsequently, when the data is read, the data may be read from the cache memory 54, and a processing speed can be increased. Furthermore, when the data is read from the cache memory 54, it is only checked whether the access IDs are equal to each other. For this reason, a processing speed can be made higher than that achieved in the process of reading data from the memory 40.

The other configurations and the other processes of the access control system 1 according to the ninth embodiment are the same as the configurations and the processes of the access control system 1 according to the first embodiment. A process related to reading/writing of data through a cache memory characterized in the access control system 1 according to the ninth embodiment can also be applied to other embodiments.

Tenth Embodiment

Figure 62:
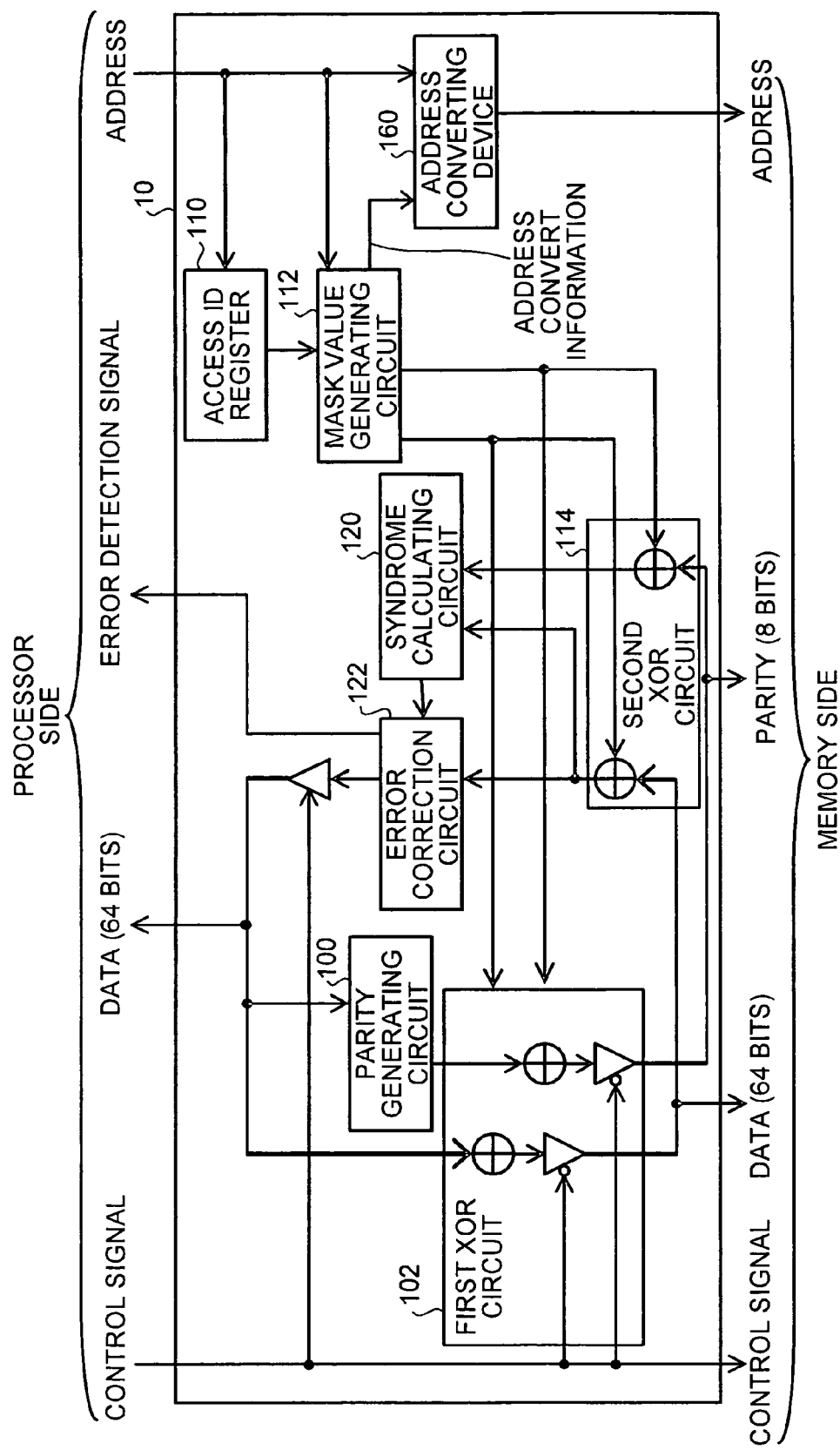
FIG. 62 is a block diagram showing a functional configuration of an apparatus according to a tenth embodiment.

FIG. 62 is a block diagram showing a functional configuration of an access control apparatus 10 according to a tenth embodiment. The access control apparatus 10 according to the tenth embodiment includes, in addition to the functional configuration of the access control apparatus 10 according to the second embodiment, an address converting device 160. The access control apparatus 10 converts an address acquired from the processor 20 to perform data access to the converted address. The address converting device 160 performs address conversion on the basis of address convert information held by the mask value generating circuit 112.

Figure 63:
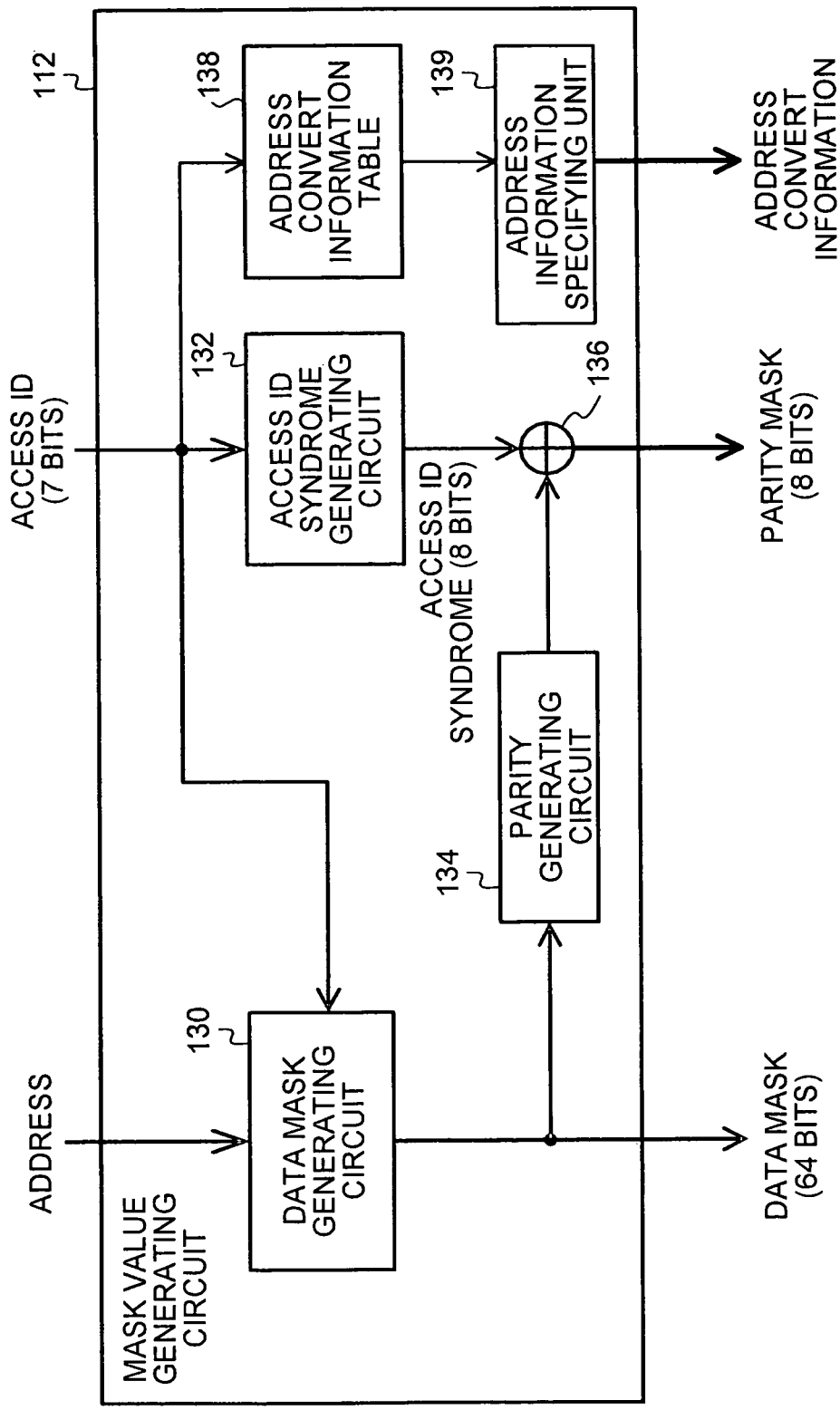
FIG. 63 is a block diagram showing a detailed functional configuration of a mask value generating circuit according to the tenth embodiment.

FIG. 63 is a block diagram showing a detailed functional configuration of the mask value generating circuit 112 according to the tenth embodiment. The mask value generating circuit 112 includes, in addition to a data mask generating circuit 130, the access ID syndrome generating circuit 132, and the parity generating circuit 134, an address information table 138 and the address information specifying unit 139. The address information specifying unit 139 refers to the address convert information table 138 to specify address convert information on the basis of an access ID.

Figure 64:
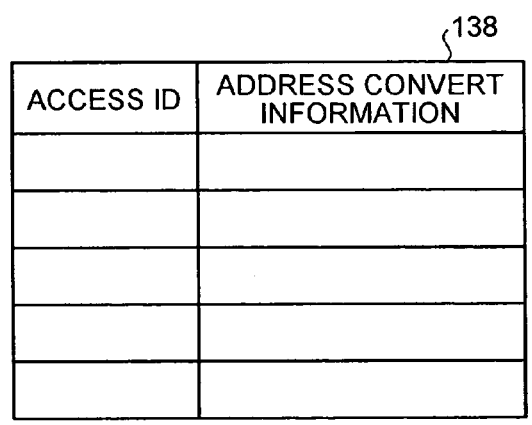
FIG. 64 is a diagram schematically showing a data configuration of an address information table.

FIG. 64 is a diagram schematically showing a data configuration of the address convert information table 138. The address convert information table 138 associates access IDs and pieces of address convert information with each other. In this manner, the pieces of address convert information are desirably converted depending on the access IDs.

Each time access IDs are switched, the address information specifying unit 139 gives address convert information associated with the switched access ID in the address convert information table 138 to the address converting device 160.

In address conversion by the address converting device 160, it is necessary that a predetermined address is not always converted to the same address and that a plurality of addresses are not converted to the same address. Any conversion which satisfies this condition may be used. The converting method is not limited to the method of the embodiment.

Figure 65:
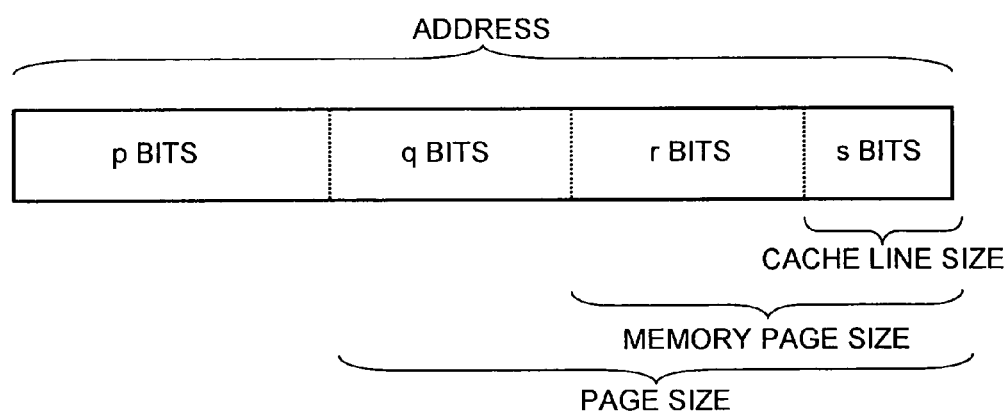
FIG. 65 is a diagram for explaining a memory address.

FIG. 65 is a diagram for explaining a memory address. In general, in a memory address, the number of bits required to access a range (s) corresponding to a size of a cache line, a range (r+s) corresponding to a page size held by a memory element, and a range (q+r+s) corresponding to a page size managed by a page table are determined.

For example, the range (s) corresponding to the size of the cache line has two bits when one word of the memory has 64 bits and the cache line has 256 bits. The range (r+s) corresponding to the page size held by the memory element, i.e., a range in which burst transfer can be performed has 7 bits in, for example, 128 words. Therefore, in address conversion, conversion based on the relationship is performed to make it possible to prevent a memory access speed from being decreased.

For example, words of memories belonging to the same cache line are desirably converted to continuous addresses such that reading/writing can be performed by burst transfer at a high speed. At this time, when the addresses are continued, the addresses may be shuffled.

A word in a page held by a memory element is desirably converted to continuous addresses in the same page range such that the word can be read or written at a high speed by burst transfer. Also in this case, when the addresses are continuous, the addresses may be shuffled.

Figure 66A:
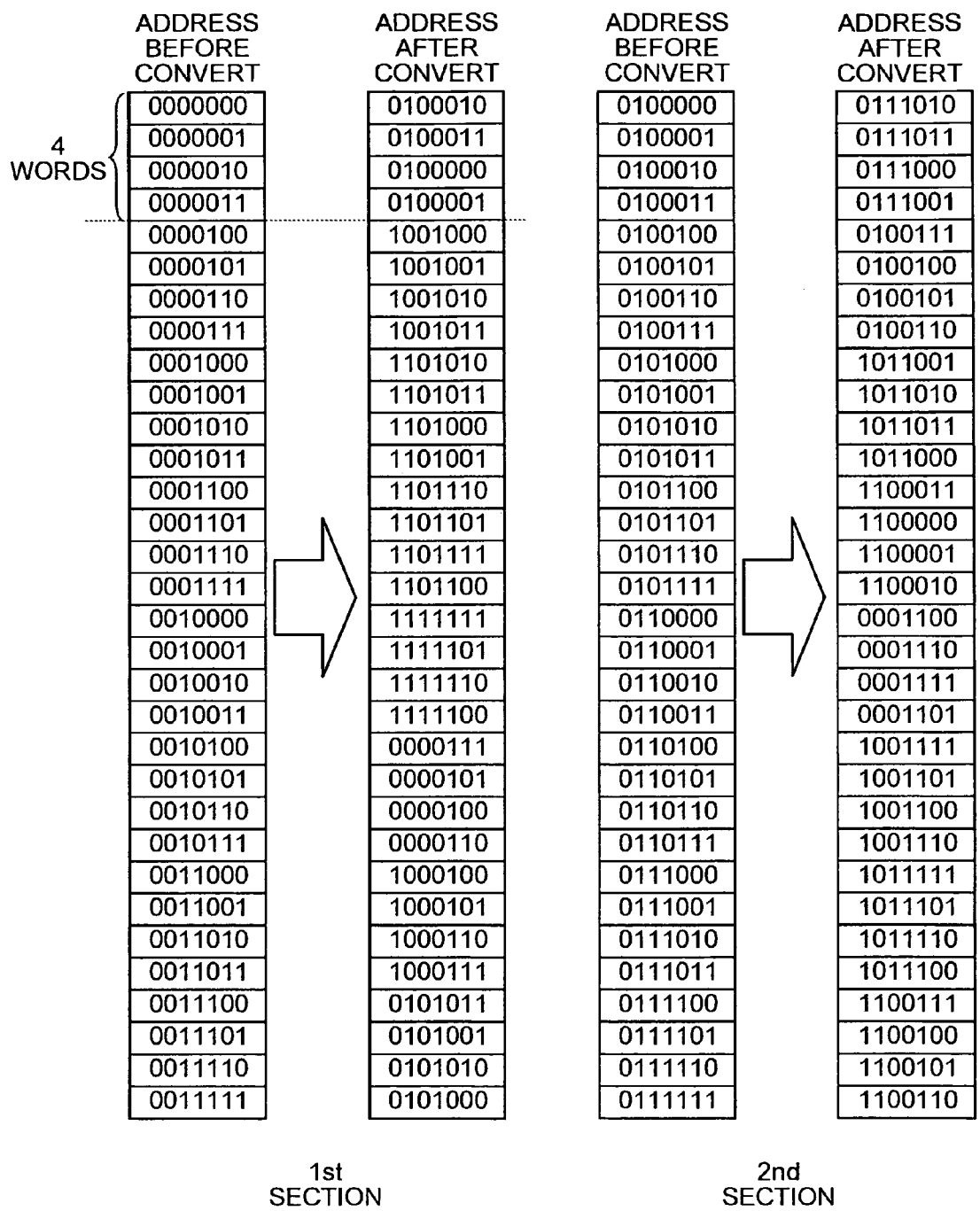
FIG. 66A is a diagram for explaining an address converting process performed by an address converting device.

The address converting device 160 performs address conversion which satisfy the above conditions. FIGS. 66A and 66B are diagrams for explaining an address converting process performed by the address converting device 160. FIGS. 66A and 66B show lower 7 bits of a memory address. The address converting device 160 converts only the lower 7 bits. In this case, it is assumed that one cache line is constituted by four words.

As shown in FIGS. 66A and 66B, a combination is constituted by four words, and words are converted at random in the combination. However, the combination is converted to addresses of continuous memories. For this reason, although addresses are arranged at random in one cache line, the words are not converted to addresses arranged across different cache lines. Therefore, transfer efficiency can be prevented from being deteriorated.

Figure 67:
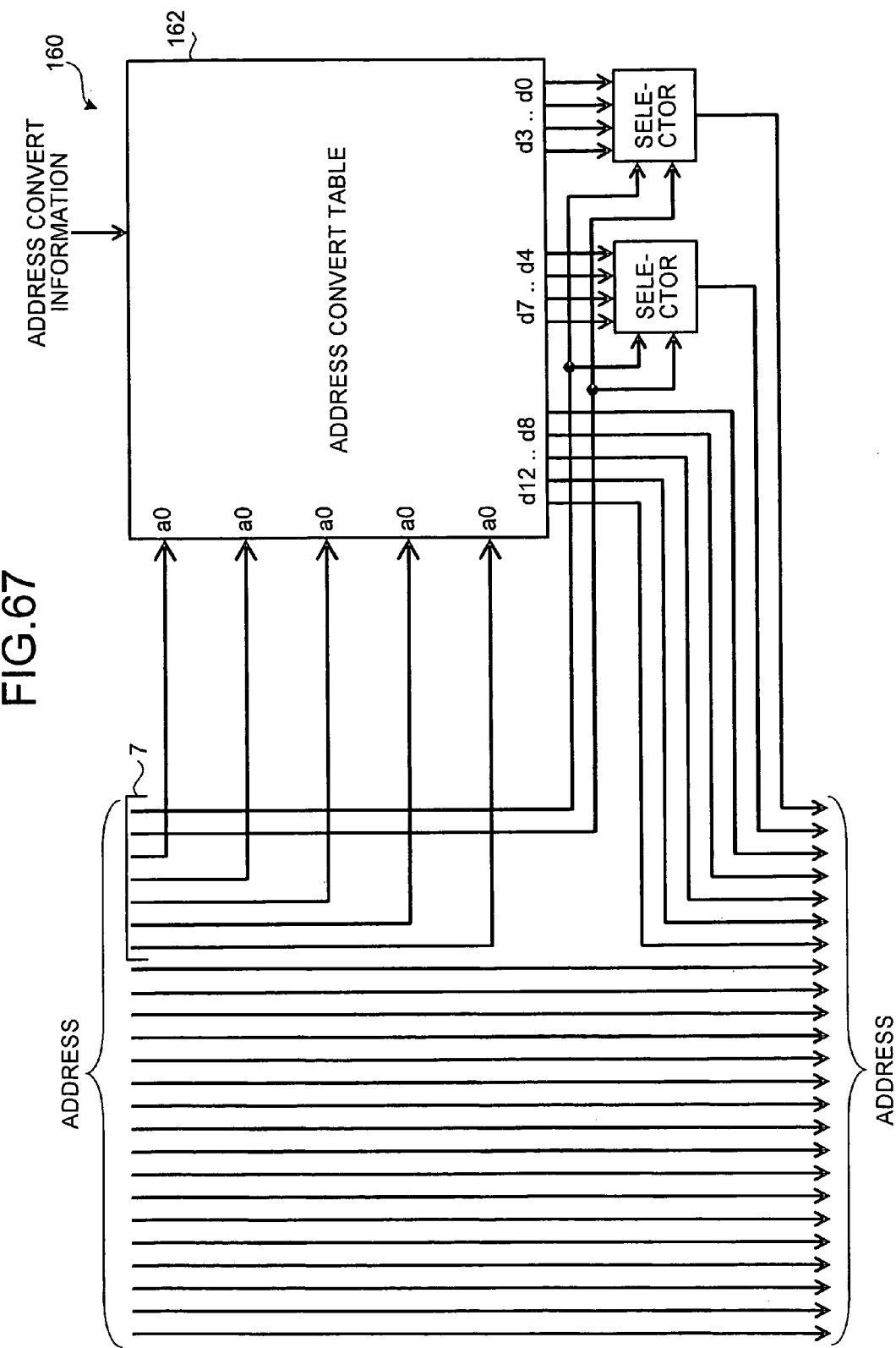
FIG. 67 is a diagram showing a concrete configuration of the address converting device.

FIG. 67 is a diagram showing a concrete configuration of the address converting device 160. Address convert information is stored in the address convert table 162 constituted by a memory. FIG. 68 is a diagram showing an address convert table which realizes address conversion shown in FIGS. 66A and 66B.

The address convert table 162 is checked by upper 5 bits in the lower 7 bits of the address, and upper 5 bits of obtained 13-bit information are defined as upper 5 bits in the lower 7 bits of the address. Furthermore, conversion is performed such that 2 bits selected from remaining 8 bits according to lower 2 bits of the address are defined as the lower 2 bits of the address.

Figure 69:
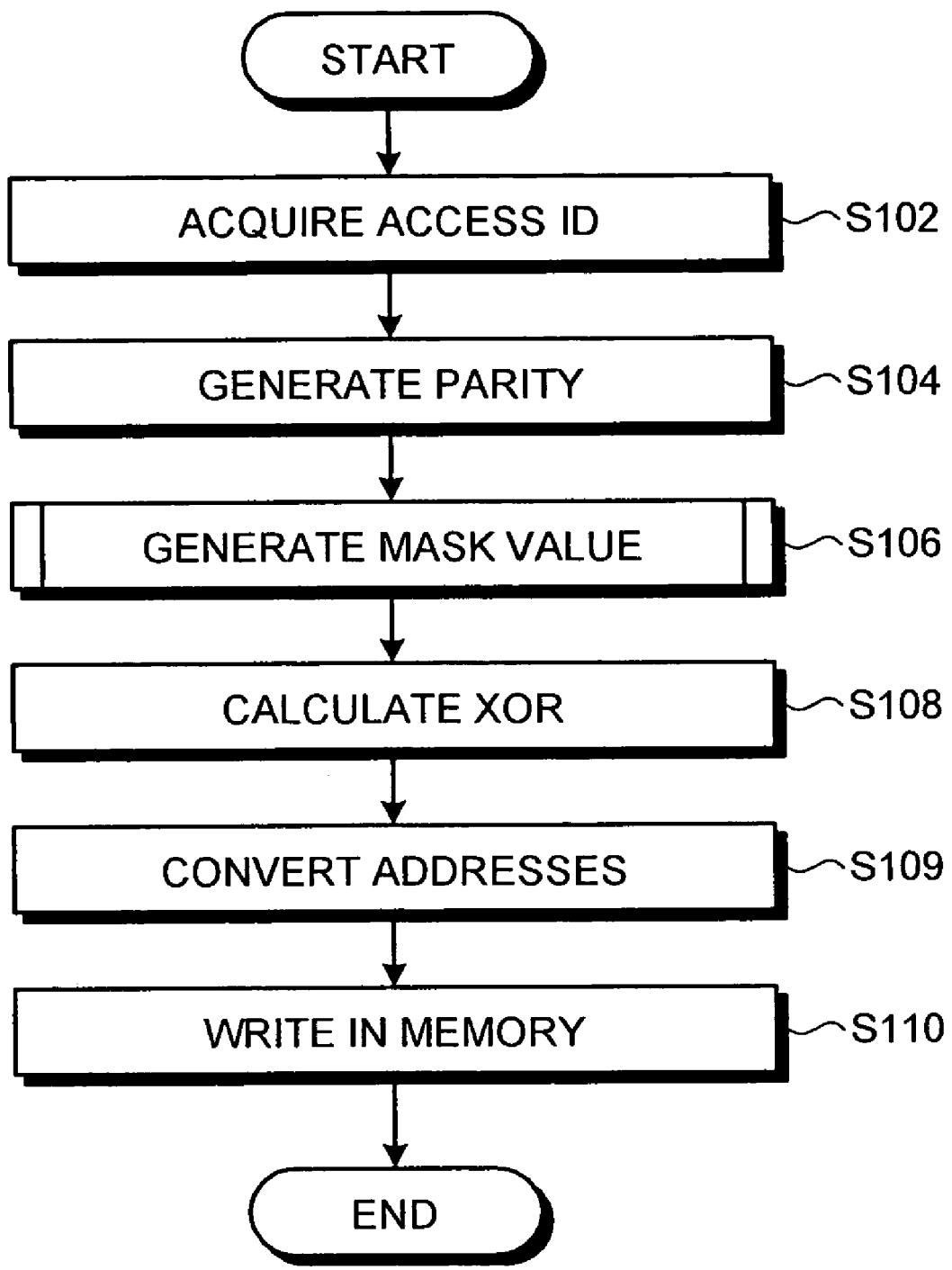
FIG. 69 is a flow chart showing a write process performed by an access control system according to the tenth embodiment.

FIG. 69 is a flow chart showing a write process performed by the access control system 1 according to the tenth embodiment. In the access control system 1 according to the tenth embodiment, after an XOR is calculated (step S108), the above address converting process is performed (step S109). Data is written at the converted memory address (step S110).

Figure 70:
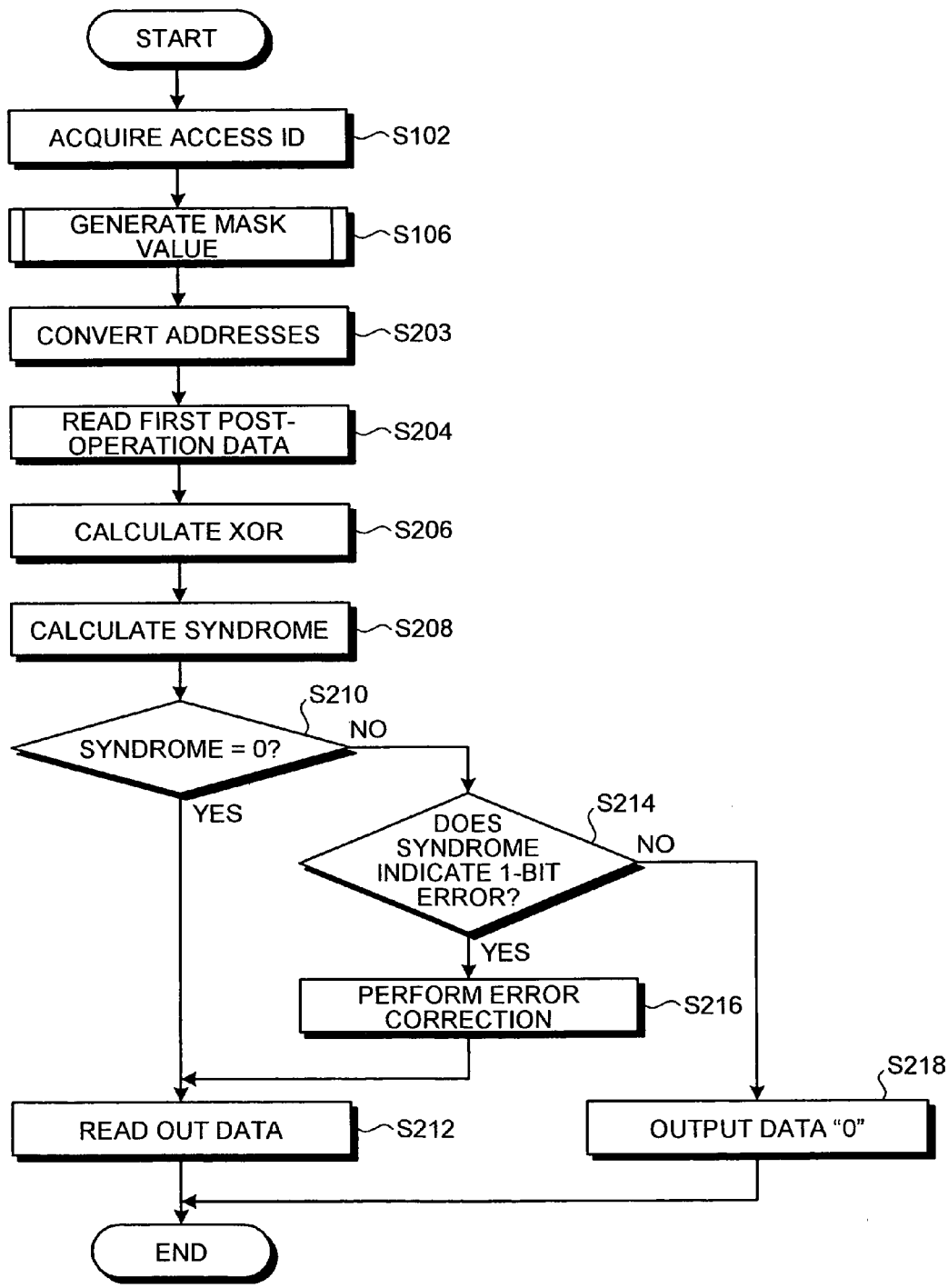
FIG. 70 is a flow chart showing a read process performed by the access control system according to the tenth embodiment.

FIG. 70 is a flow chart showing a read process performed by the access control system 1 according to the tenth embodiment. After a mask value is generated (step S106), the address converting process is performed (step S203). First post-operation data is then read from a memory address obtained after the address convert (step S204).

The other configurations and the other processes of the access control system 1 according to the tenth embodiment are the same as the configurations and the processes of the access control system 1 according to the first embodiment.

Figure 71:
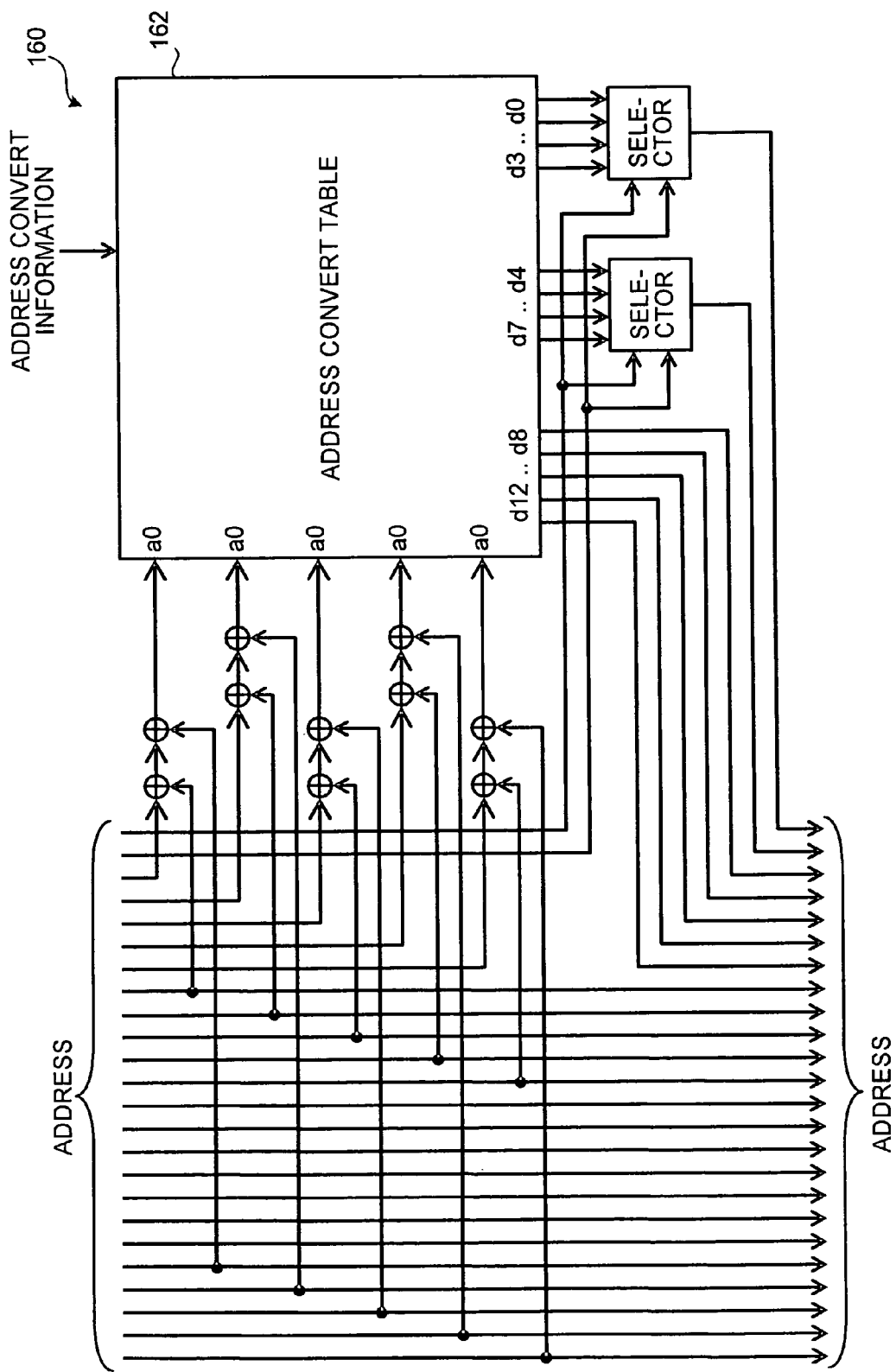
FIG. 71 is a diagram showing a concrete configuration of an address converting device according to a first modification of the tenth embodiment.

FIG. 71 is a diagram showing a concrete configuration of the address converting device 160 according to a first modification of the tenth embodiment. In this modification, an upper address is superposed on a lower address used to check the address convert table 162 by an XOR to increase the number of variations of convert. In this manner, a pattern for address convert can be prevented from being easily guessed.

As a second modification of the tenth embodiment, although address convert information is stored in the data mask generating circuit 130 in the tenth embodiment, a storing destination of the address convert information is not limited to the data mask generating circuit 130. For example, when the address converting process according to the tenth embodiment is applied to the access control system 1 according to the fifth embodiment, the address convert information may be recorded in the data mask generation information table 1302.

FIG. 72 is a diagram schematically showing a data configuration of the data mask generation information table 1302 according to the second modification. In this manner, in the data mask generation information table 1302, the address convert information is recorded associated with an access ID. In this case, with reference to the data mask generation information table 1302, the address convert information can be specified on the basis of the access ID.

Eleventh Embodiment

Figure 73:
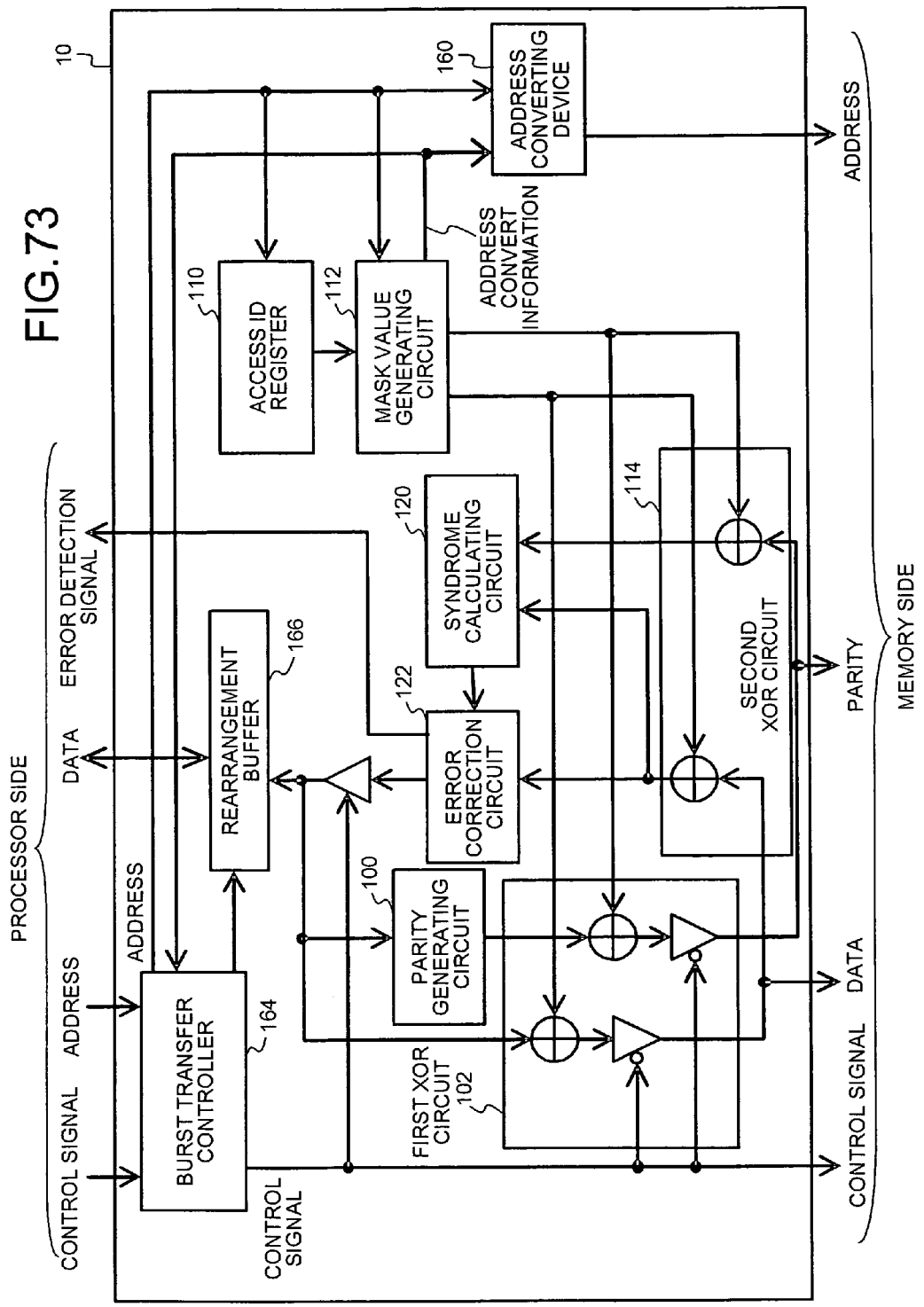
FIG. 73 is a block diagram showing a functional configuration of an apparatus according to an eleventh embodiment.

FIG. 73 is a block diagram showing a functional configuration of the access control apparatus 10 according to an eleventh embodiment. In the access control apparatus 10 according to the eleventh embodiment, in addition to the functional configuration of the access control apparatus 10 according to the tenth embodiment, a burst transfer controller 164 and a rearrangement buffer 166 are arranged.

The burst transfer controller 164 manages processes when burst transfer is performed in an order of addresses on the memory 40. The rearrangement buffer 166 is a buffer used at this time. When an order of words in a cache line is converted by the address converting device 160, the words are accessed in the converted order, a burst transfer function of a memory element cannot be used. For this reason, transfer efficiency cannot be improved. Therefore, the burst transfer controller 164 accesses the words in the order of addresses on the memory 40 by burst transfer and rearranges the order of addresses on the memory 40 and an order obtained after the convert performed by address converting device 160 by using the rearrangement buffer 166.

Figure 74:
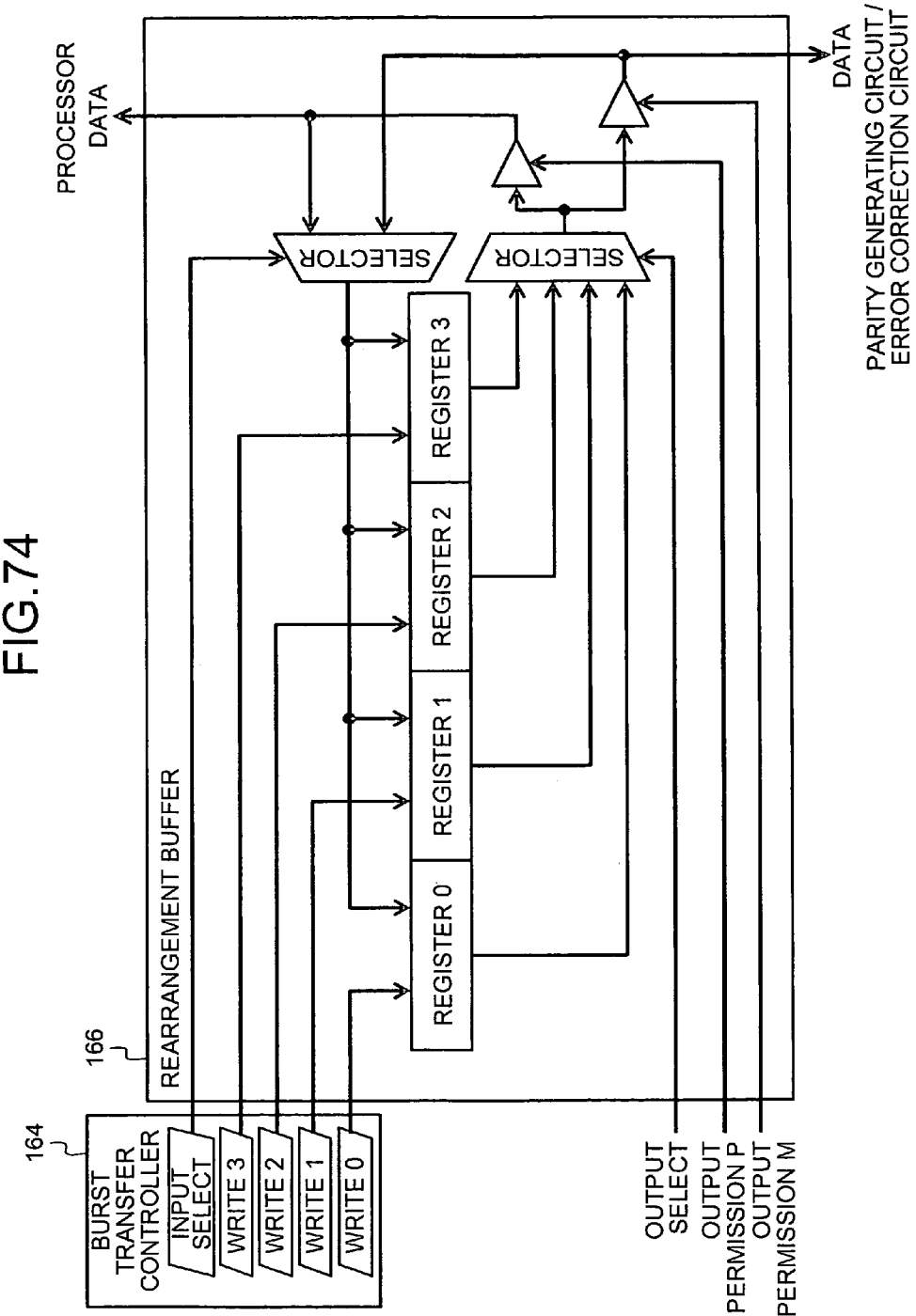
FIG. 74 is a diagram showing a concrete configuration of a rearrangement buffer 166.

FIG. 74 is a diagram showing a concrete configuration of the rearrangement buffer 166. In this example, one cache line has 256 bits, one word of a memory has 64 bits, and one cache line is constituted by four words.

As shown in FIG. 74, the rearrangement buffer 166 includes registers 0 to 3 for four words of one cache line. In response to a designation from the burst transfer controller 164, data from the processor 20 or the memory 40 is written in a designated register of the four registers. Furthermore, data is read from the designated register of the four registers and sent to the processor 20 or the memory 40.

At this time, an address "1010000" is converted to an address "0110011" by the address converting device 160 shown in FIG. 67. Similarly, an address "1010001" is converted to an address "0110010", an address "1010010" is converted to an address "0110000", and an address "1010011" is converted to "0110001".

On the other hand, when a designation of burst transfer is present (Yes in step S500), data sent from the processor 20, i.e., data to be written in the memory 40 is temporarily written in the rearrangement buffer 166 (S502). Address convert information is then obtained from the address information table 138 in the mask value generating circuit 112 (step S504). According to an order of memory addresses converted on the basis of the address convert information, the data is written in the memory 40 by burst transfer (step S506). The process then comes to an end.

Figure 75:
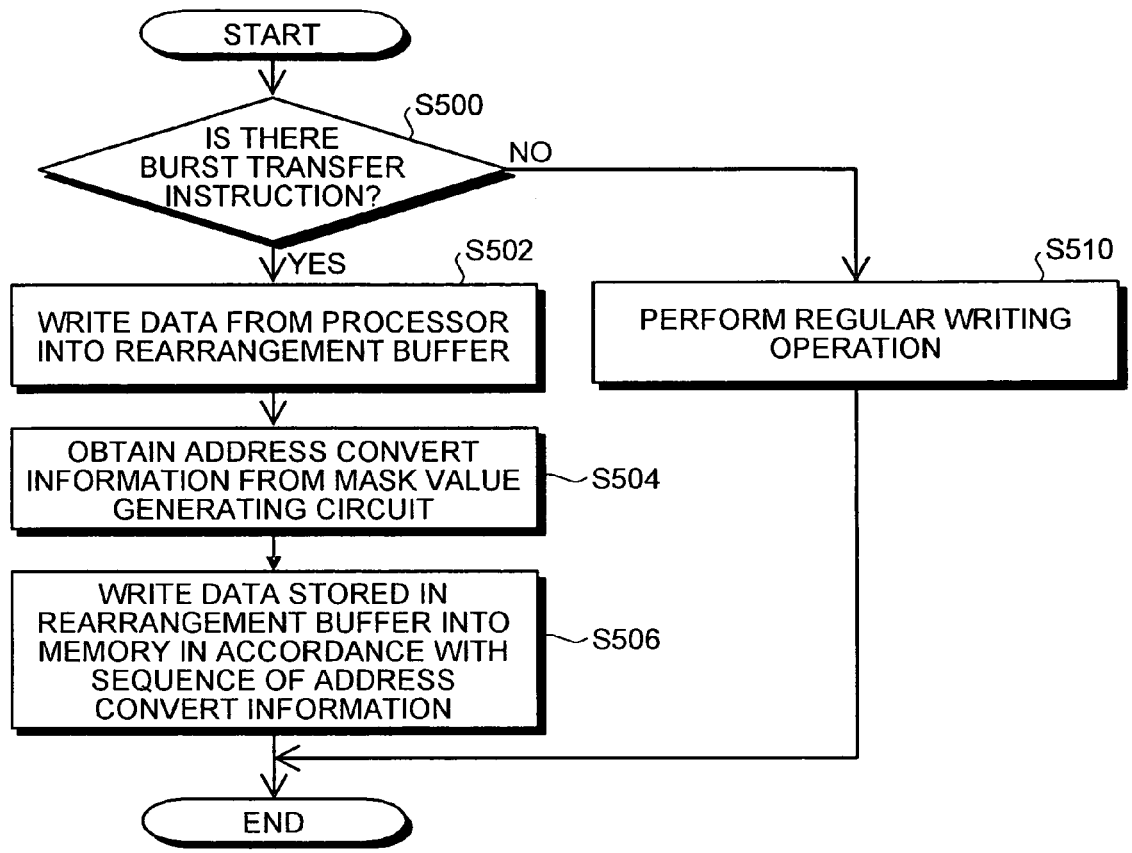
FIG. 75 is a flow chart showing a process of writing data in a memory by a burst transfer controller.
Figure 76:
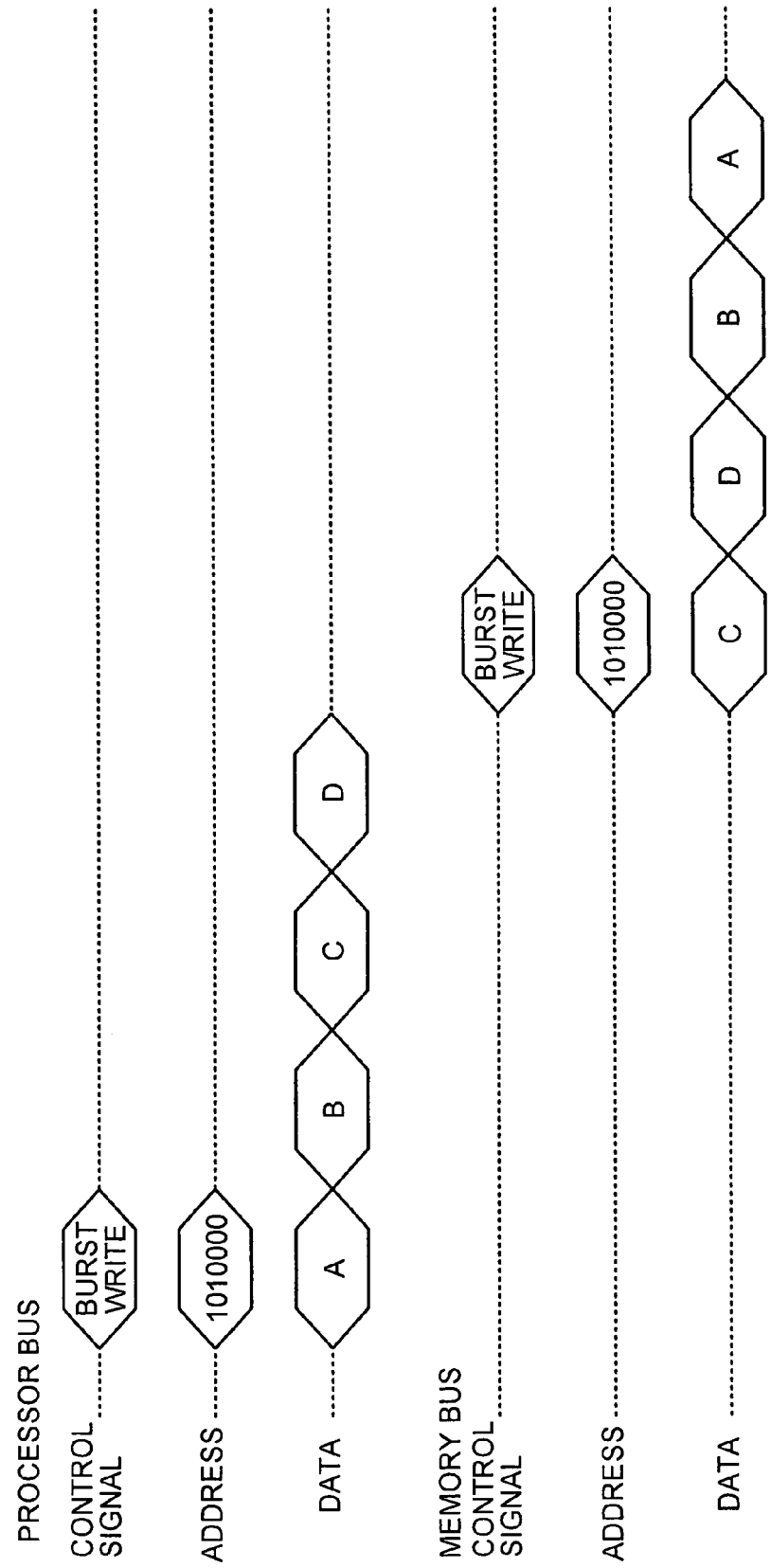
FIG. 76 is a diagram for more concretely explaining the write process explained with reference to FIG. 75.

FIG. 76 is a diagram for more concretely explaining the write process explained with reference to FIG. 75. FIG. 76 shows a case in which the processor 20 writes data A, B, C, and D in four words starting from a word having an address the lower 7 bits of which is "1010000".

At this time, the address "1010000" is converted converted to an address "0110011" by the address converting device 160 shown in FIG. 67. Similarly, an address "1010001" is converted to an address "0110010", an address "1010010" is converted to an address "0110000", and an address "1010011" is converted to an address "0110001".

When data is to be written in an order of converted memory addresses, burst transfer cannot be used. The burst transfer controller 164 temporarily stores the data in the rearrangement buffer 166. On the basis of the address convert information, the data are rearranged to obtain continuous addresses. In the example shown in FIG. 76, data C is written at an address "0110000", data D is written at an address "0110001", data B is written at an address "0110010", and data A is written at an address "0110011". Data are written from the address "0110000" by burst transfer in the order named; C, D, B, and A.

Figure 77:
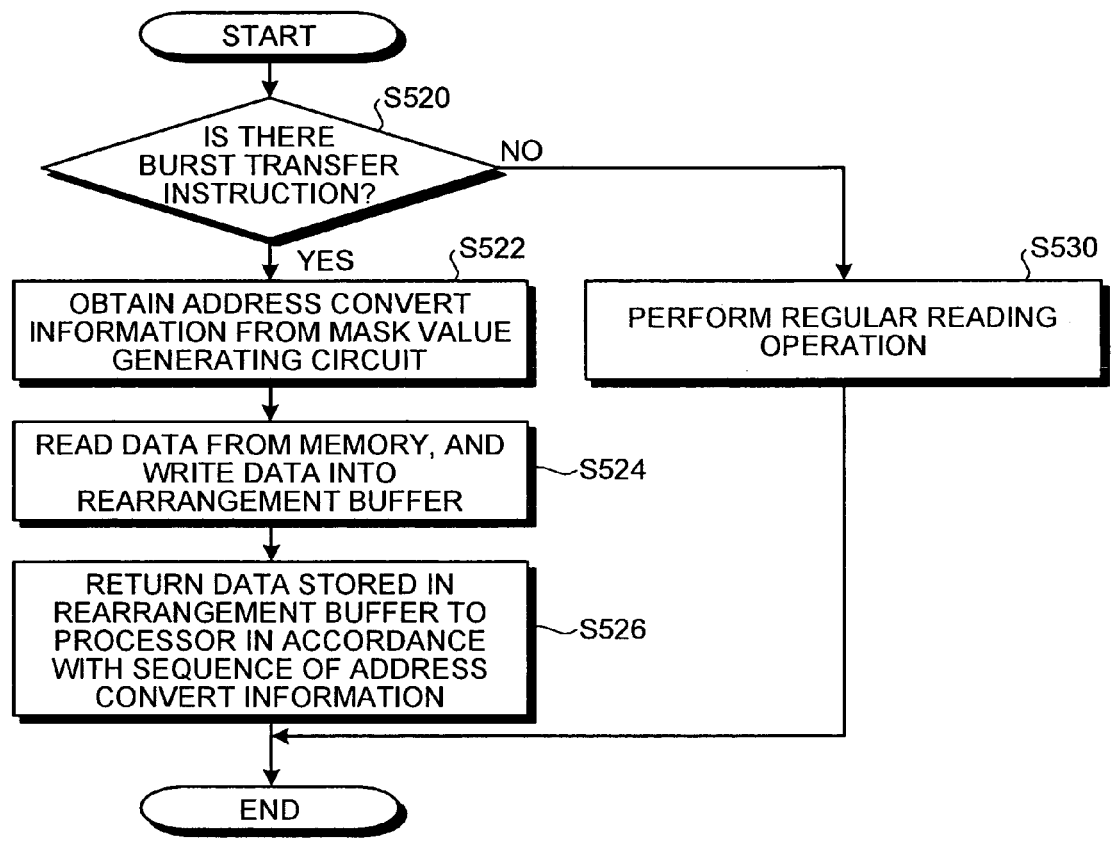
FIG. 77 is a flow chart showing a process of reading data from the memory by a burst transfer controller.

FIG. 77 is a flow chart showing a process of reading data from the memory 40 by the burst transfer controller 164. When burst transfer is not designated (No in step S520), a normal read process is performed (step S530). In this case, the normal read process is the read process described in the tenth embodiment. The process sequentially reads data of a memory address obtained by the address converting device 160.

On the other hand, when burst transfer is designated (Yes in step S520), address convert information is obtained from the address information table 138 in the mask value generating circuit 112 (step 522). According to an order of memory addresses converted on the basis of address convert information, 4 words starting from a start address are read from the memory 40, and the words are temporarily written in the rearrangement buffer 166 (step S524). Data in the rearrangement buffer 166 is sent back to the processor 20 by burst transfer according to the order of memory addresses converted on the basis of the address convert information (step S526). Here, the operation comes to an end.

Figure 78:
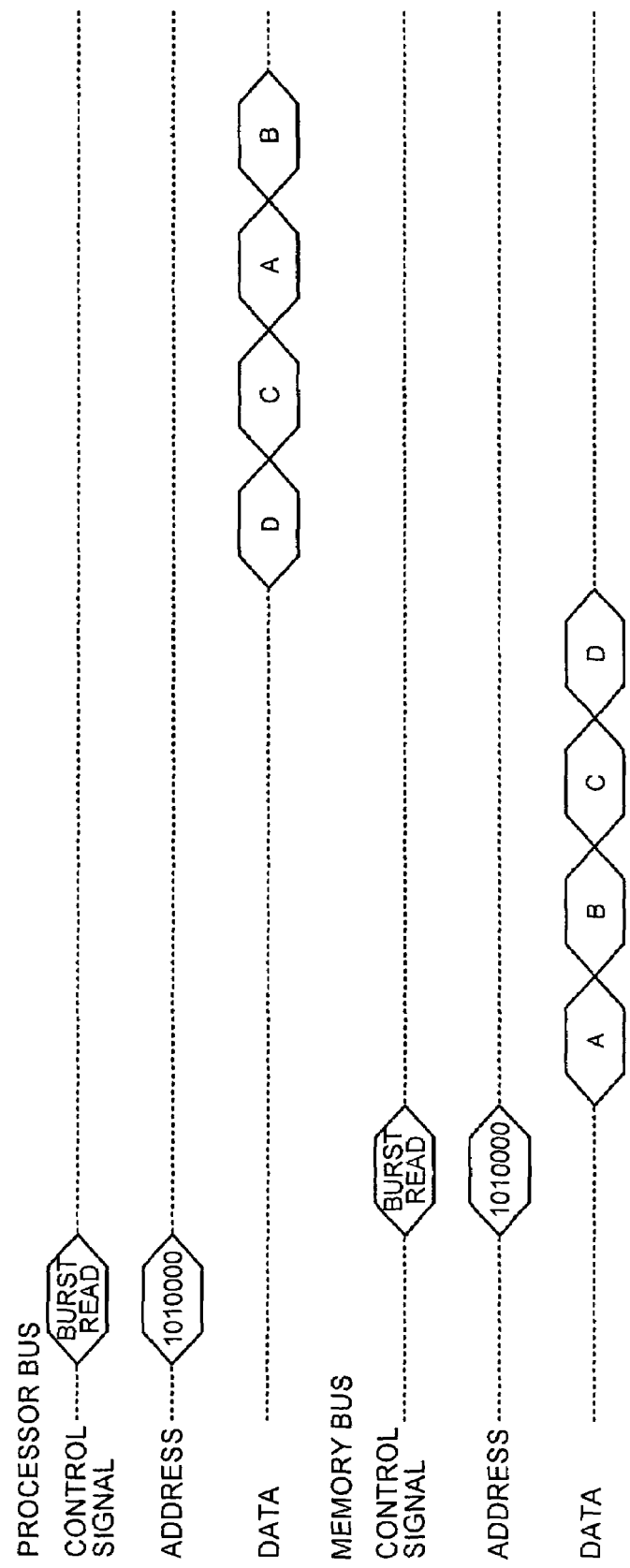
FIG. 78 is a diagram for more concretely explaining the read process explained with reference to FIG. 77.

FIG. 78 is a diagram for more concretely explaining a read process explained with reference to FIG. 77. FIG. 78 shows a case in which the processor reads 4 words from words each having an address the lower 7 bits of which are "1010000".

At this time, the address "1010000" is converted to an address "0110011" by the address converting device 160 shown in FIG. 67. Similarly, an address "1010001" is converted to an address "0110010", an address "1010010" is converted to an address "0110000", and an address "1010011" is converted to an address "0110001".

The burst transfer controller 164 reads 4 words from an address "0110000" expressing the start in the converted address by burst transfer and temporarily stores data in the rearrangement buffer 166. The data read at this time are sequentially defined as A, B, C, and D.

Next, the burst transfer controller 164 rearranges data in an order of original addresses on the basis of address convert information. In the example shown in FIG. 78, the data D is read to an address "0110000", the data C is read to an address "0110001", the data A is read to an address "0110010", and the data B is read to an address "0110011". The data is returned from the address "0110000" to the processor by burst transfer in the order of D, C, A, and B.

As described above, according to the access control system 1 according to the eleventh embodiment, a real address of a memory is converted to eliminate correlation between the real address and a mask value, so that the probability that the mask value is guessed can be reduced. More specifically, the security can be improved.

The other configurations and the other processes of the access control system 1 according to the eleventh embodiment are the same as the configurations and the processes of the access control system 1 according to the tenth embodiment.

Figure 79:
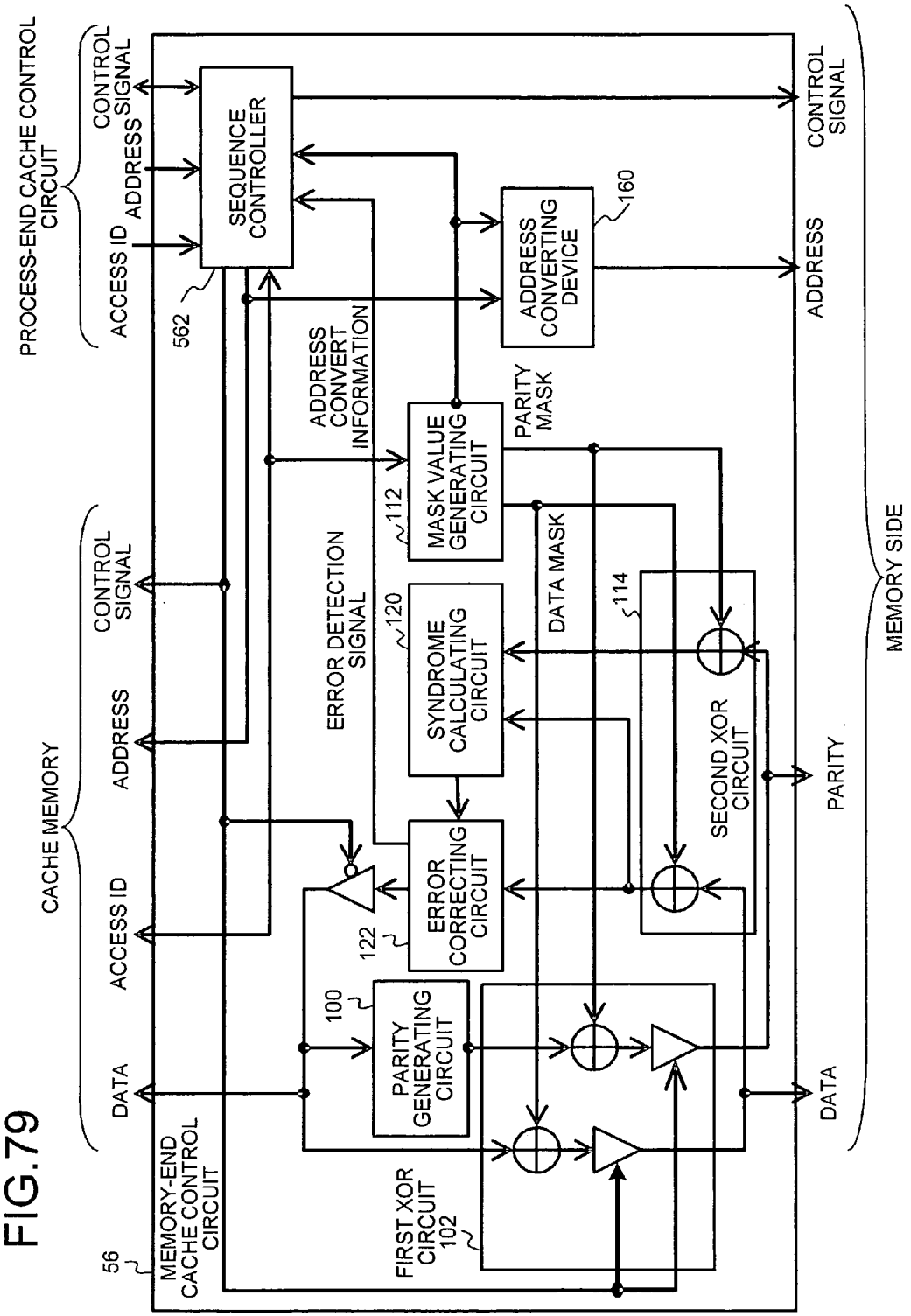
FIG. 79 is a block diagram showing a functional configuration of a memory-end cache control circuit according to a modification of an eleventh embodiment.

A modification of an address converting process according to the eleventh embodiment will be described below. In this modification, the address converting process according to the eleventh embodiment is applied to the access control system 1 according to the ninth embodiment. FIG. 79 is a block diagram showing a functional configuration of the memory-end cache control circuit 56 according to the modification. The memory-end cache control circuit 56 according to the modification includes, in addition to the functional configuration of the access control apparatus 10 according to the eleventh embodiment, an address converting device 160.

The sequence controller 562 further performs the same process as that performed in the burst transfer controller 164. In this manner, also in the access control system 1 according to the ninth embodiment, the same process as in the eleventh embodiment can be performed, and the same effect as in the eleventh embodiment can be obtained.

The memory-end cache control circuit 56 according to the eleventh embodiment has no rearranging buffer. In this configuration, data in burst transfer are not rearranged on a rearranging buffer, and the cache memory 54 is designed to be accessed in units of words. The cache memory 54 is used as a rearranging buffer.

Twelfth Embodiment

Figure 80:
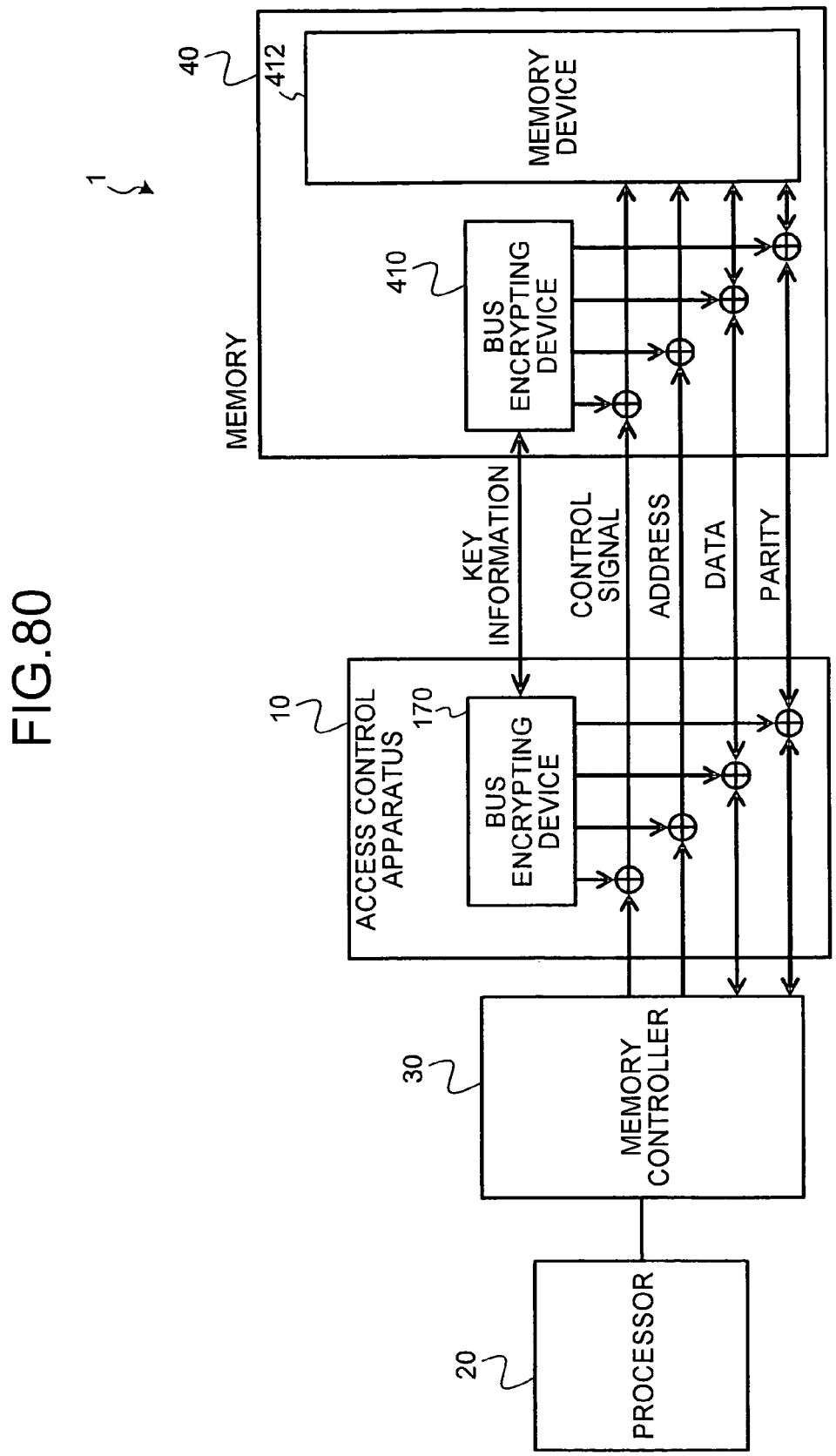
FIG. 80 is a diagram showing an entire configuration of an access control system according to a twelfth embodiment.

FIG. 80 is a diagram showing an entire configuration of an access control system 1 according to a twelfth embodiment. In the access control system 1 according to the twelfth embodiment, an access control apparatus 10 and a memory 40 include bus encrypting devices 170 and 410 which are equal to each other. The bus encrypting devices 170 and 410 share a cryptic key. A signal on a memory bus 42 is encrypted by a random number generated on the basis of the cryptic key.

Figure 81:
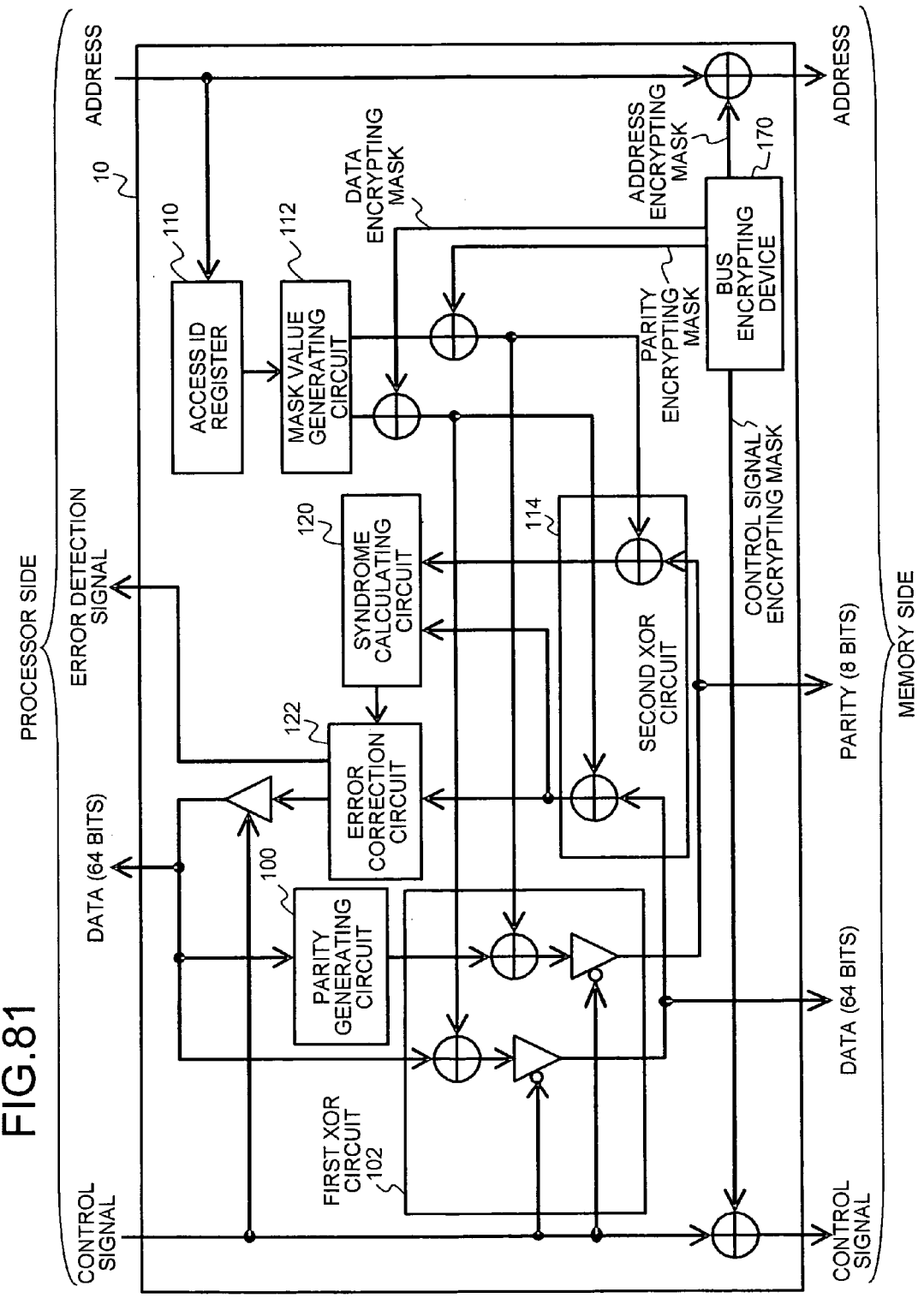
FIG. 81 is a diagram showing a functional configuration of an access control apparatus.

FIG. 81 is a diagram showing a functional configuration of the access control apparatus 10. The access control apparatus 10 according to the twelfth embodiment includes, in addition to the functional configuration of the access control apparatus 10 according to the first embodiment, the bus encrypting device 170. The bus encrypting device 170 generates a control signal mask which encrypts a control signal, an address mask which encrypts a memory address, a data mask which encrypts data, and a parity mask which encrypts a parity. The respective signals are masked and sent to the memory bus 42.

Figure 82:
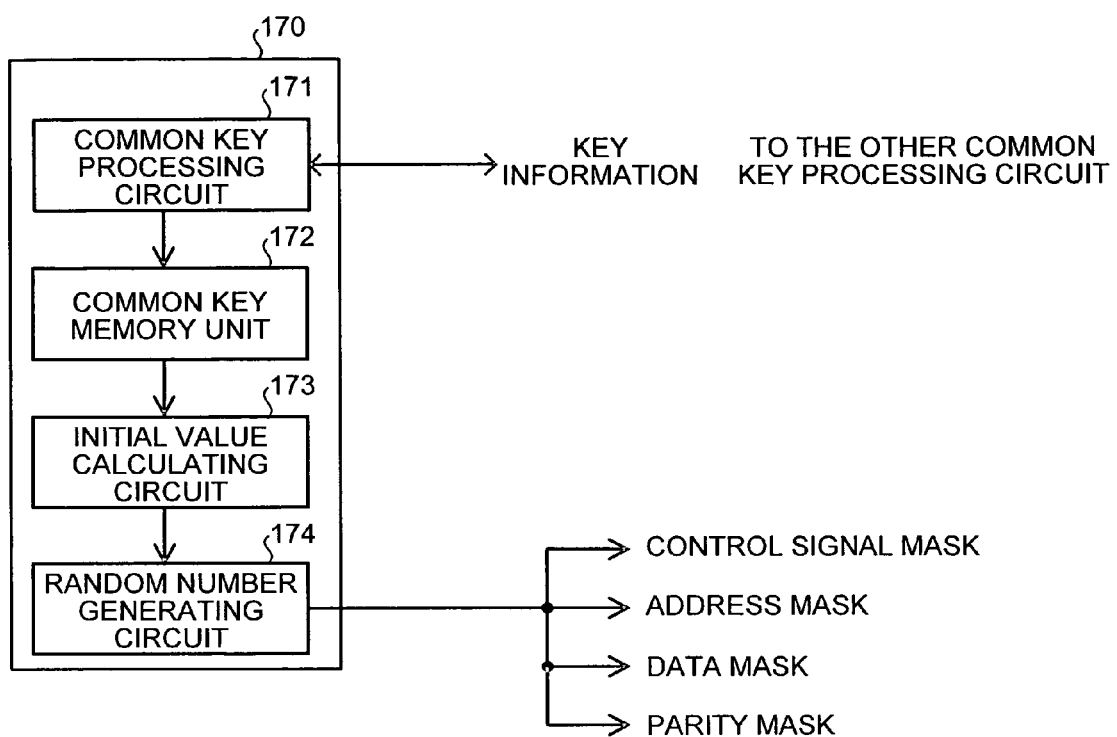
FIG. 82 is a block diagram showing a detailed functional configuration of a bus encrypting device.

FIG. 82 is a block diagram showing a detailed functional configuration of the bus encrypting device 170. The bus encrypting device 170 includes a common key processing circuit 171, a common key memory unit 172, an initial value calculating circuit 173, and a random number generating circuit 174.

The common key processing circuit 171 performs a process of sharing a cryptic key between the bus encrypting devices 170 and 410. Various means which share cryptic keys can be realized. For example, the means executed as follows. That is, a first key is written in both the bus encrypting devices 170 and 410 in an initial state of the access control system 1, and, subsequently, new keys are periodically generated between the bus encrypting devices 170 and 410 and converted therebetween.

The common key memory unit 172 stores a cryptic key. The initial value calculating circuit 173 generates an initial value of the random number generating circuit 174 on the basis of the cryptic key. A one-way function or the like is preferably used to prevent the cryptic key from being guessed. For example, a value generated from the cryptic key by using a hash function can be used as an initial value. The random number generating circuit 174 generates a random number sequence by using the value calculated by the initial value calculating circuit 173 as an initial value.

The functional configuration of the bus encrypting device 410 of the memory 40 is the same as the functional configuration of the bus encrypting device 170. The common key processing circuits of both the devices share a cryptic key. The random number generating circuits of both the devices generate the same random number at the same timing on the basis of the cryptic key. By using the random numbers generated as described above as encrypting masks, XORs of the encrypting masks are calculated on a sending-end and a receiving-end of signals on the memory bus 42 to diffuse the signals on the memory bus 42 by the random numbers.

In this manner, both a mask value generated by an access control apparatus associated with an address to check an access authority and a mask value generated by the bus encrypting device regardless of an address are superposed on original data by an XOR operation. For this reason, the data and the mask values of two types can be made more difficult to be guessed, and the security can be improved.

Figure 83:
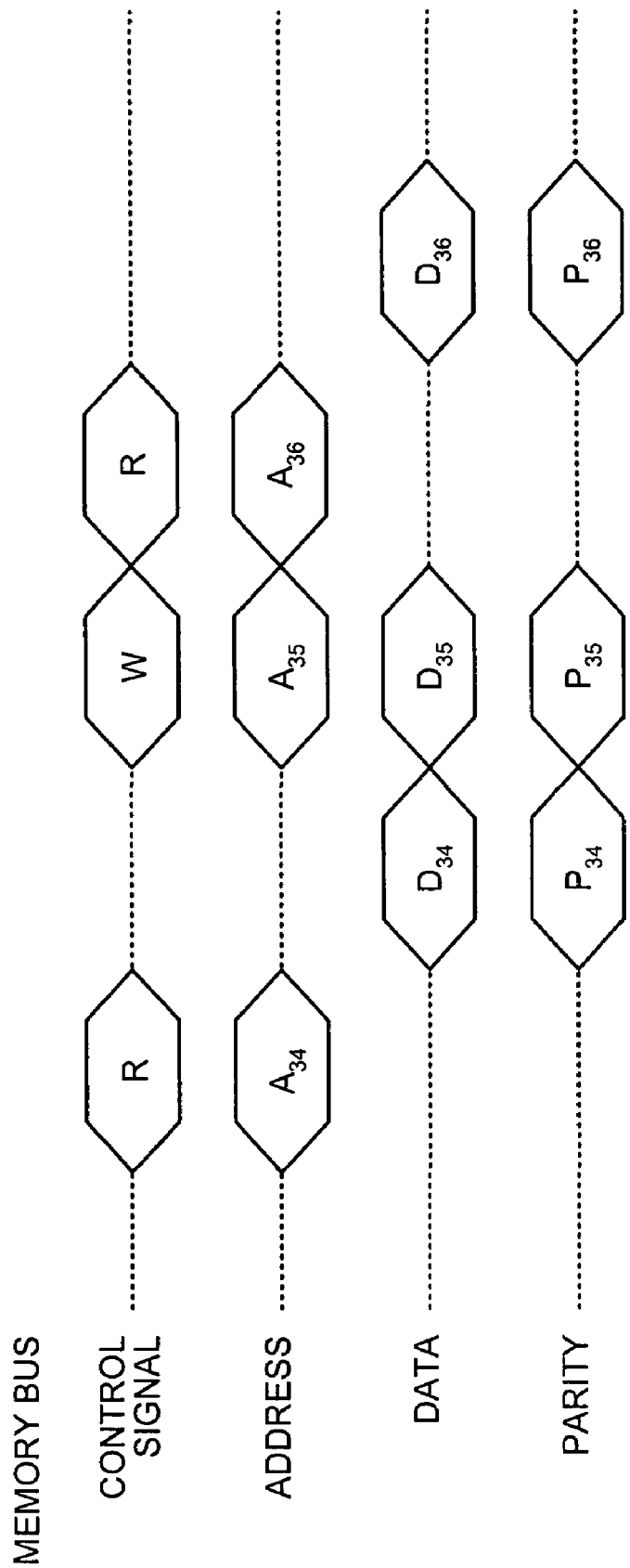
FIG. 83 is a diagram showing a signal which is not masked by the bus encrypting devices.
Figure 84:
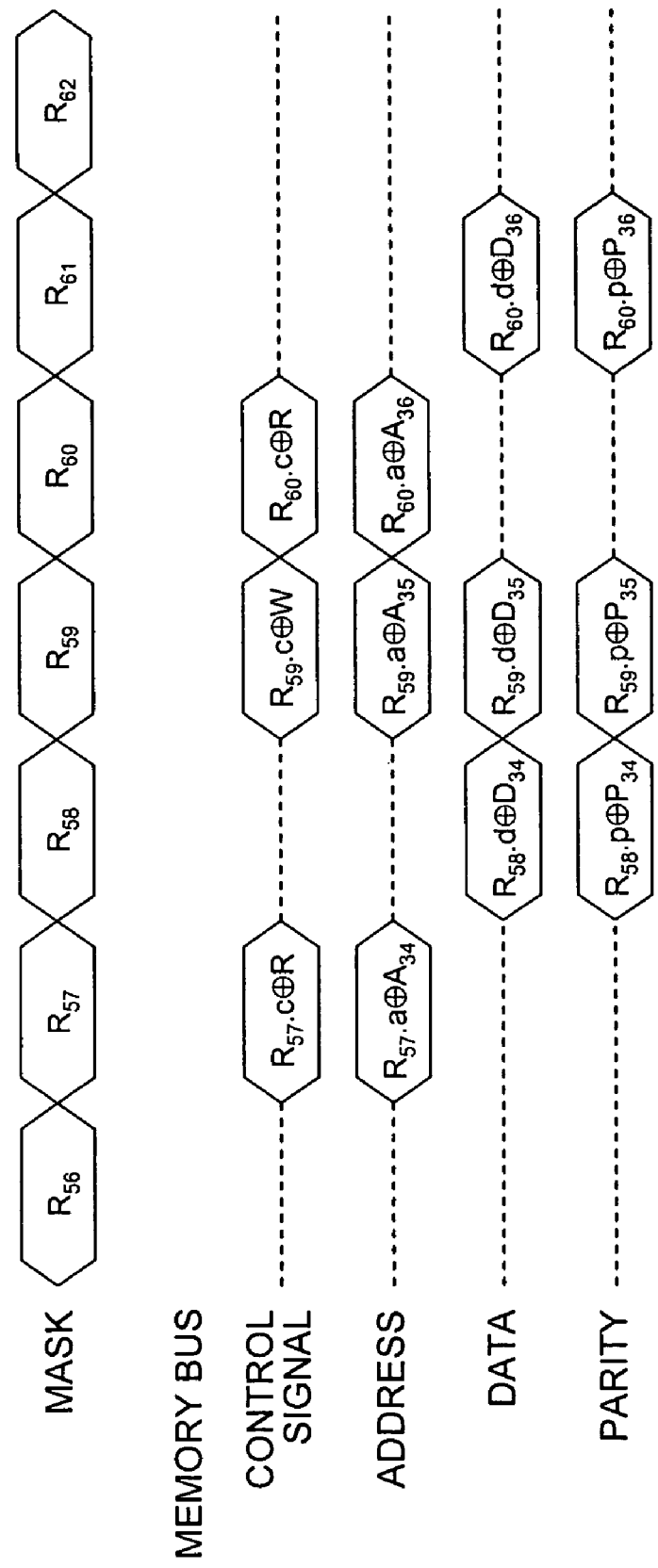
FIG. 84 is a diagram showing a signal which is masked by the bus encrypting devices.

FIGS. 83 and 84 are diagram for explaining a signal flowing in the memory bus 42 according to the twelfth embodiment. FIG. 83 is a diagram showing a signal which is not masked by the bus encrypting devices 170 and 410. Reading from address A34, writing to address A35, and reading from address A36 are sequentially performed. In this case, a corresponding memory address, corresponding data, and a corresponding parity flow on the memory bus 42.

FIG. 84 is diagram showing a signal which is masked by the bus encrypting devices 170 and 410. In FIG. 84, Ri.c, Ri.a, Ri.d, and Ri.p represent a control signal encrypting mask, an address encrypting mask, a data encrypting mask, and a parity encrypting mask, respectively, for Ri. The bus encrypting devices 170 and 410, as shown in FIG. 84, generate random numbers for mask in units of clocks. On each signal of the memory bus 42, the value of the random number for mask is superposed by an XOR operation.

As a first modification of the twelfth embodiment, the bus encrypting device 170 has no initial value calculating circuit 173, and a cryptic key may be directly given as an initial value of a random number generating circuit. From a viewpoint of security, in order to prevent a cryptic key from being guessed, an initial value converted by the initial value calculating circuit 173 is desirably used.

Figure 85:
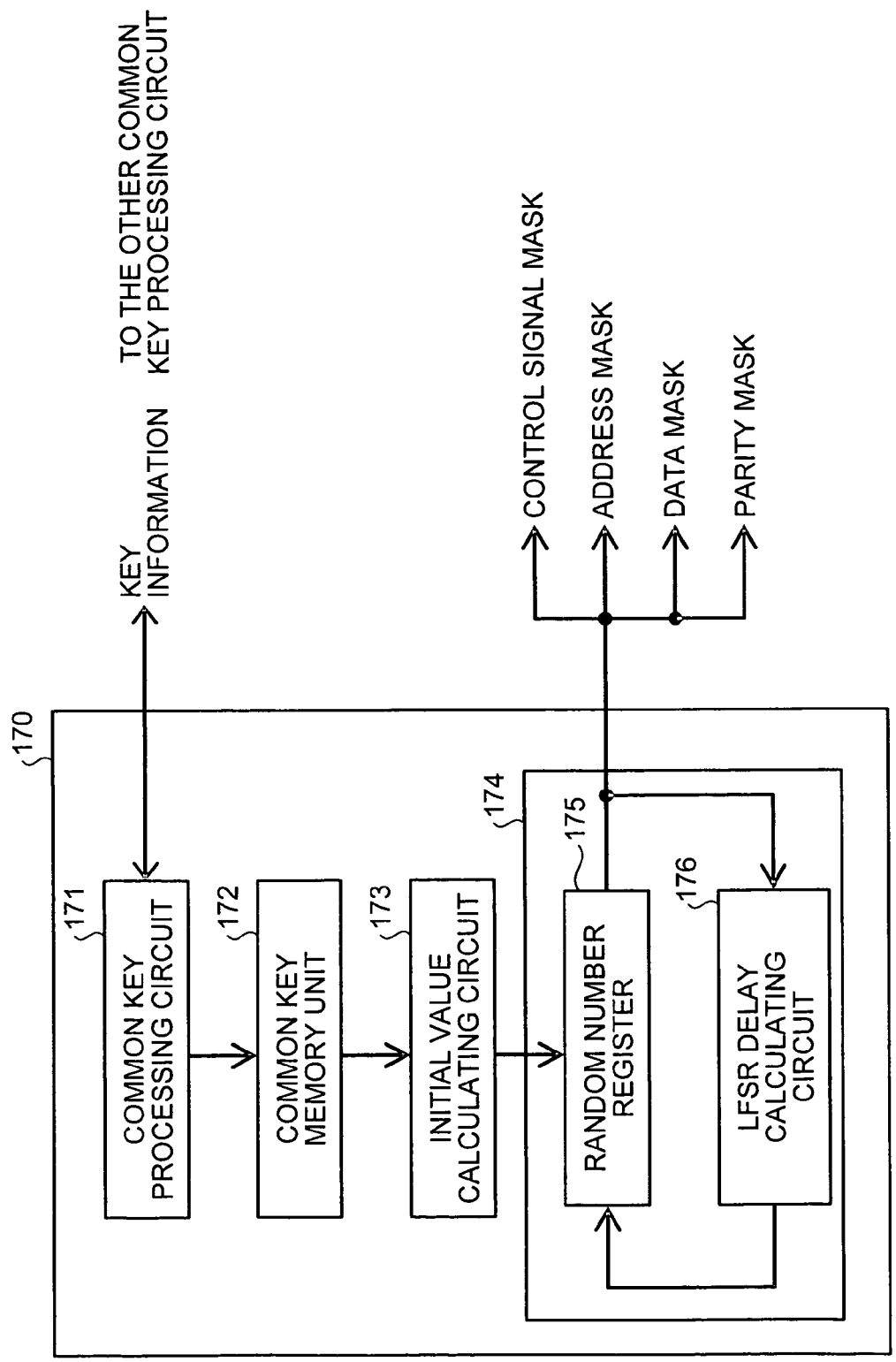
FIG. 85 is a block diagram showing a detailed functional configuration of a bus encrypting device according to a second modification of the twelfth embodiment.

As a second modification, an LFSR may be used as the random number generating circuit 174. FIG. 85 is a block diagram showing a detailed functional configuration of a bus encrypting device 170 according to a second modification. The random number generating circuit 174 includes a random number register 175 and an LFSR delay calculating circuit 176.

A present state is recorded in the random number register 175. A state delayed from the present state by a predetermined step is calculated by the LFSR delay calculating circuit 176. The resultant state is defined as the next state, and the value of the next step is output as an encrypting mask.

Figure 86:
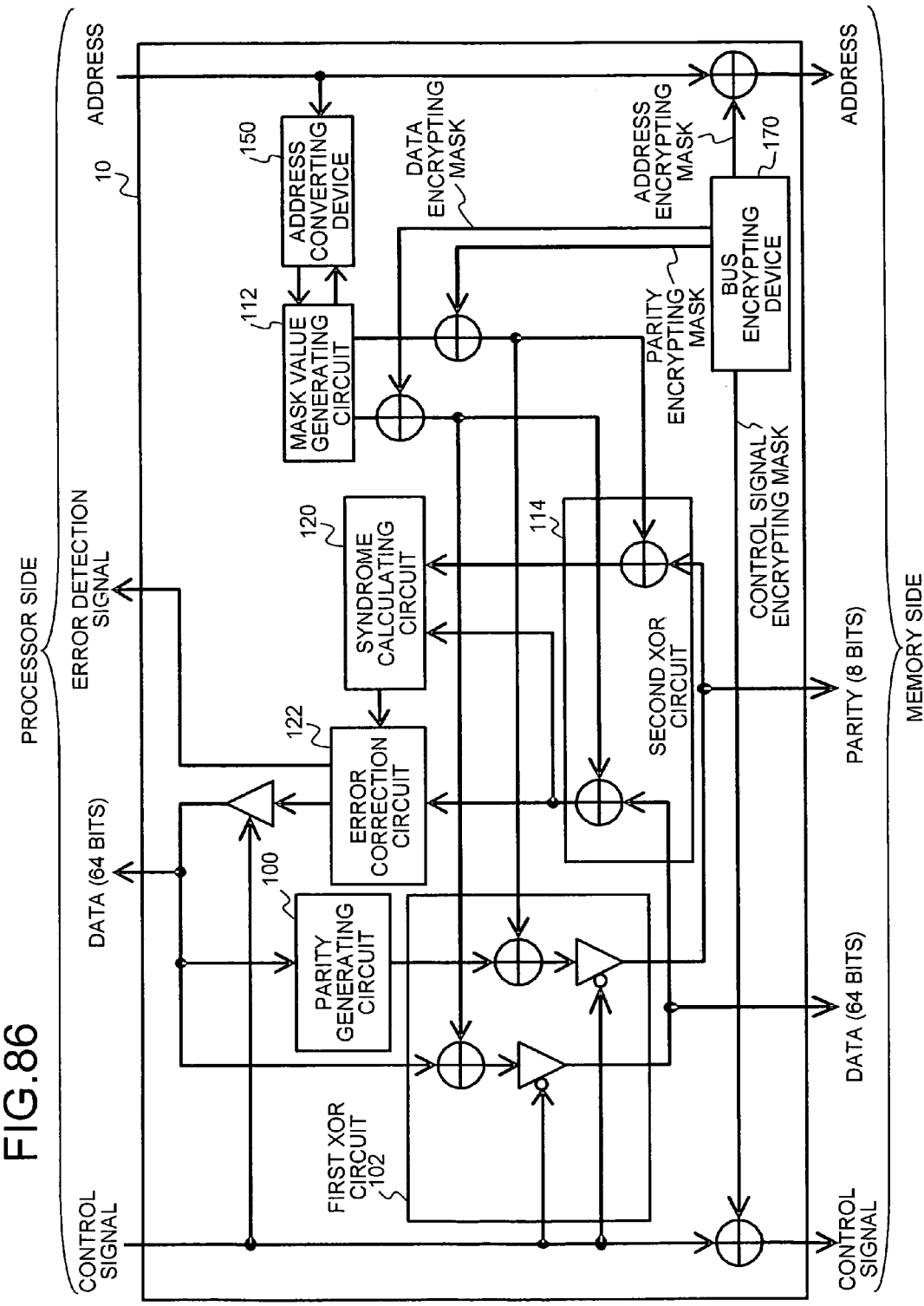
FIG. 86 is a block diagram showing a functional configuration of an apparatus according to a third modification of the twelfth embodiment.

FIG. 86 is a block diagram showing a functional configuration of an access control apparatus 10 according to a third modification. The access control apparatus 10 according to the third modification includes, in addition to the functional configuration of the access control apparatus 10 according to the eighth embodiment, a bus encrypting device 170.

Figure 87:
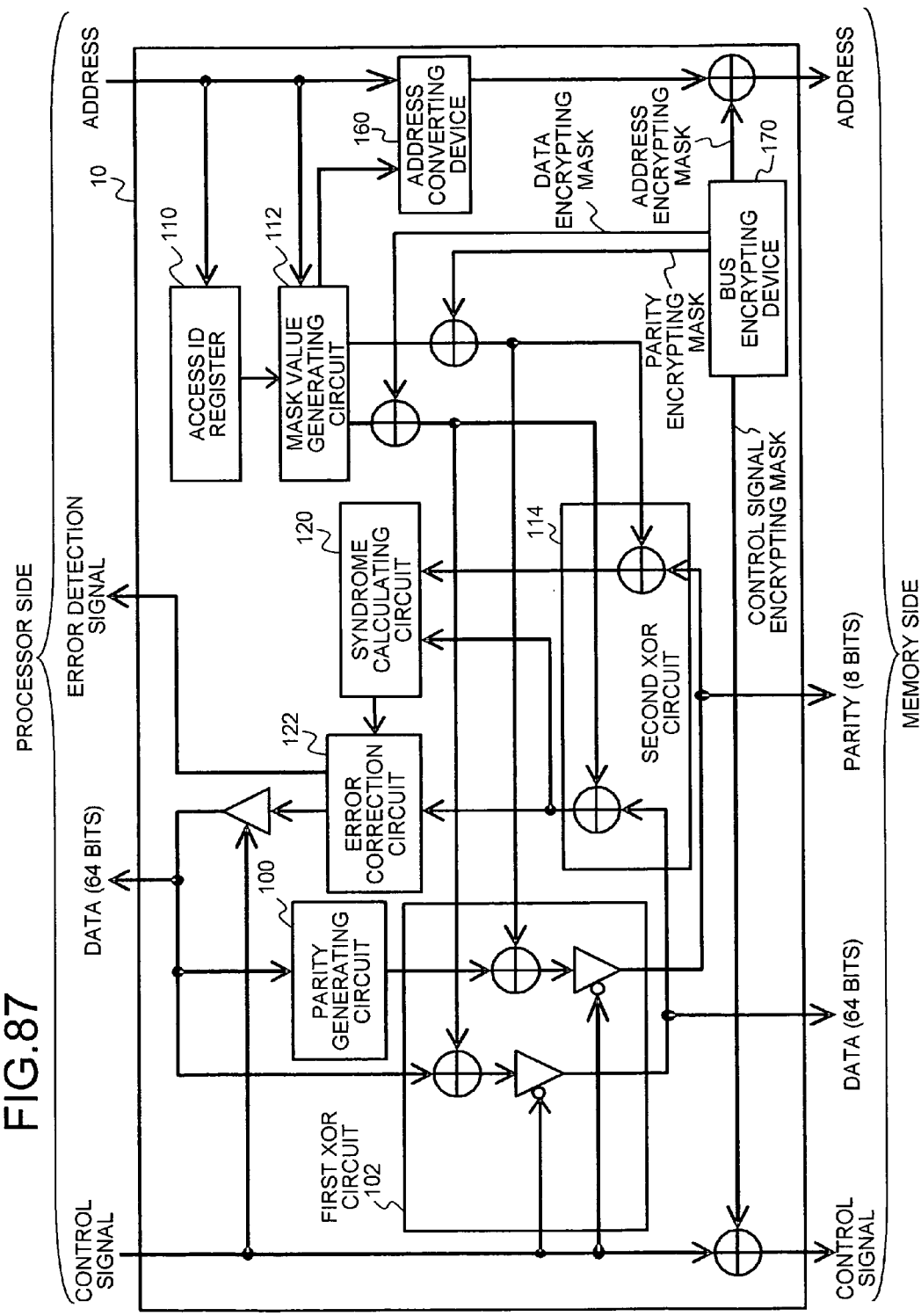
FIG. 87 is a block diagram showing a functional configuration of a apparatus according to a fourth modification of the twelfth embodiment.

FIG. 87 is a block diagram showing a functional configuration of an access control apparatus 10 according to a fourth modification. The access control apparatus 10 according to the fourth modification includes, in addition to the functional configuration of the access control apparatus 10 according to the tenth embodiment, a bus encrypting device 170.

Figure 88:
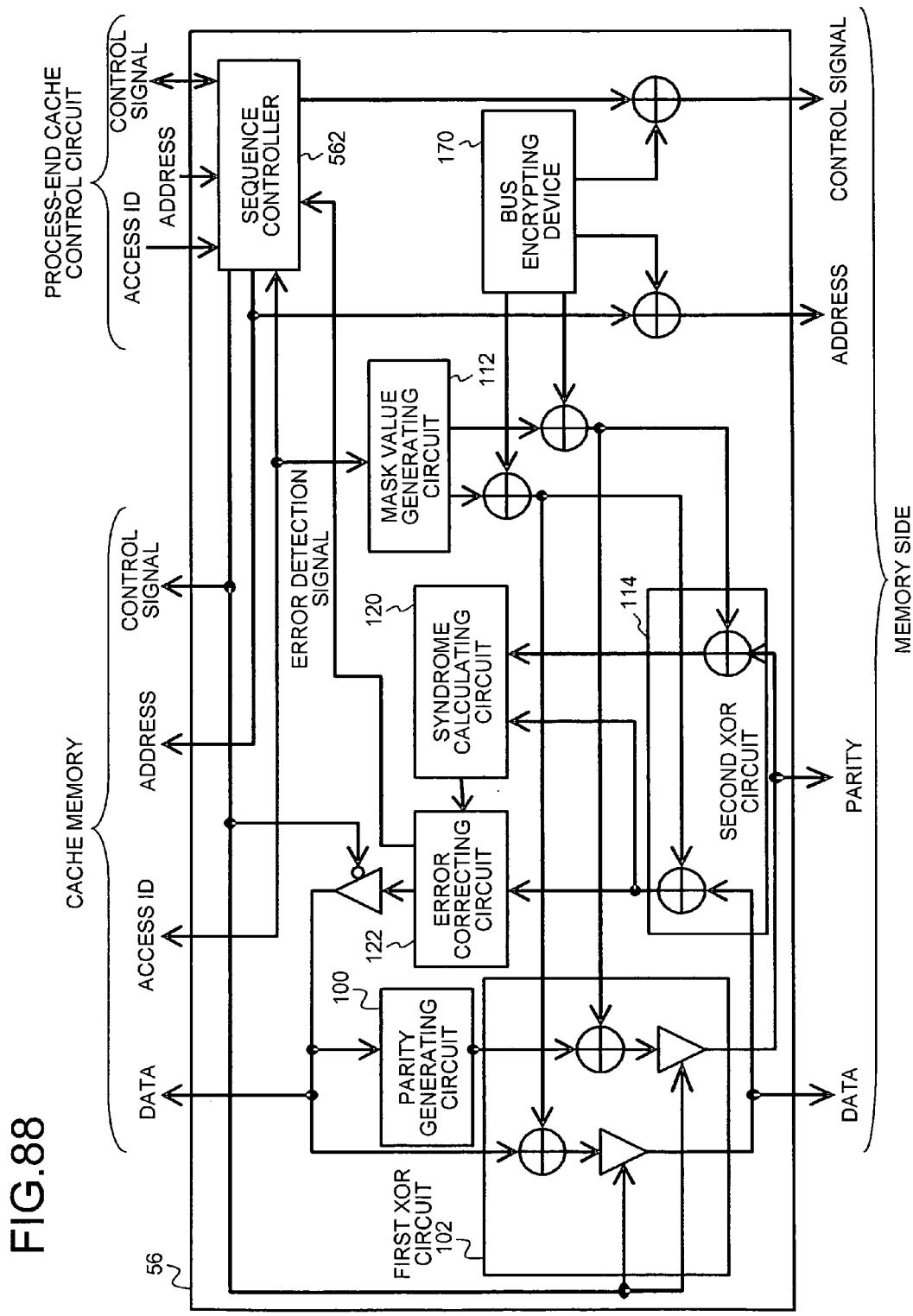
FIG. 88 is a block diagram showing a functional configuration of an apparatus according to a fifth modification of the twelfth embodiment.

FIG. 88 is a block diagram showing a functional configuration of an access control apparatus 10 according to a fifth modification. The access control apparatus 10 according to the fifth modification includes, in addition to the functional configuration of the access control apparatus 10 according to the ninth embodiment, a bus encrypting device 170.

As described above, the bus encrypting device 170 according to the twelfth embodiment can be applied to the access control system 1 according to the other embodiments. In this manner, also in the access control system 1 according to the other embodiments, both a mask value generated by the access control apparatus associated with an address to check an access authority and a mask value generated by the bus encrypting device regardless of an address are superposed on original data by an XOR operation. For this reason, the data and the mask values of two types can be made more difficult to be guessed, and the security can be improved.

Regarding the access control systems 1 according to the ninth embodiment to the twelfth embodiment, as in the other embodiments, the access control apparatuses 10 characterized in the embodiments may be applied to the other systems explained with reference to FIGS. 48 to 54.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An access control apparatus to control an access among a writer, a reader, and a memory, comprising:

a parity generator that generates a parity of write data to be written in the memory;

a parity adder that adds the parity to the write data to generate parity-added data;

a writer syndrome generator that generates a writer syndrome of writer mask data to mask the parity-added data, the writer syndrome being associated with a writer access ID used when the writer accesses the memory, the writer requesting writing of the write data into the memory;

a write mask generator that generates the writer mask data based on the writer syndrome, the writer access ID, and a write address in the memory at which the writer writes the write data;

a first XOR calculator that obtains first post-operation data by calculating an XOR between the parity-added data and the writer mask data;

a write address converter that converts the write address into another address determined by the writer access ID;

a write unit that writes the first post-operation data to the address converted by the write address converter;

a reader syndrome generator that generates a reader syndrome of reader mask data to mask the first post-operation data, the reader syndrome being associated with a reader access ID used when the reader accesses the memory, the reader requesting reading of data from the memory;

a reader mask generator that generates the reader mask data based on the reader syndrome, the reader access ID, and a read address in the memory at which the reader reads the read data from;

a read address converter that converts the read address into another address determined based on the reader access ID;

a read unit that reads the first post-operation data from the address converted by the read address converter;

a second XOR calculator that obtains second post-operation data by calculating an XOR between the reader mask data and the first post-operation data;

a data syndrome calculator that calculates an actual data syndrome from the second post-operation data; and an output determining unit that determines whether the second post-operation data is to be output as the read data which is requested by the reader to read, based on the actual data syndrome.

2. The apparatus according to claim 1, further comprising:
a first table that holds the writer access ID and write address convert information associated with each other, the write address convert information being used when the write address is converted to another address; and a second table that holds the reader access ID and read address convert information associated with each other, the read address convert information being used when the read address is converted to another address, wherein the write address converter converts the write address into another address by using the write address convert information associated with the writer access ID in the first table, and the read address conversion unit converts the read address into another address by using the read address convert information associated with the reader access ID in the second table.

3. The apparatus according to claim 1, wherein
the write unit writes data in units of write sizes capable of writing the data continuously, the write address converter converts the write addresses of a plurality of words corresponding to a unit for accessing to the memory included in the write size to other continuous addresses, and the read unit reads the first post-operation data in units of read sizes capable of reading data continuously.

4. The apparatus according to claim 3, further comprising:
a data transfer unit that transfers the first post-operation data read by the read unit to the reader according to an order of the addresses associated with the respective words in units of the words.

5. An access control apparatus to control an access among a writer, a reader, a cache memory, and a memory, comprising:

a read request receiver that acquires a read address from a reader;

a cache monitor that determines whether the read address acquired by the read request receiver is stored in the cache memory, where the cache memory stores data requested by the writer or the reader, an address of the data, and a requester access ID used when the writer or the reader capable of accessing the data accesses the memory, the data, the address, and the requester access ID being associated with each other;

a reader syndrome generator that generates a reader syndrome of the reader mask data to mask the data stored in the memory, the reader syndrome being associated with the reader access ID used when the reader accesses the memory, when the cache monitor determines that the read address acquired by the read request receiver is not stored in the cache memory;

a reader mask generator that generates the reader mask data based on the reader syndrome, the reader access ID, and the read address;

a read address converter that converts the address acquired by the read request receiver to another address determined by the reader access ID;

a read unit that reads first post-operation data subjected to a predetermined calculation to the data from the address converted by the read address converter;

a first XOR calculator that obtains second post-operation data by calculating an XOR between the reader mask data and the first post-operation data read by the read unit;

a data syndrome calculator that calculates an actual data syndrome from the second post-operation data; and an output determining unit that determines whether the second post-operation data is output as the data which is requested by the reader to be read, based on the actual data syndrome.

6. The apparatus according to claim 5, further comprising:
a first data transfer unit that uses the second post-operation data as the data, and writes a plurality of words in the data corresponding to a unit for accessing the memory in the cache memory associated with the addresses obtained before converting by the read address converter of the respective words, when the output determining unit determines that the data is output; and a second data transfer unit that transfers the data written in the cache memory by the first data transfer unit from the cache memory to the reader according to an order of the addresses associated with the respective words in units of the words.

7. The apparatus according to claim 5, further comprising:
a second data transfer unit that transfers the data written in the cache memory from the cache memory to the reader according to an order of the addresses associated with the respective words in units of the word.

8. The apparatus according to claim 5, further comprising:
a write request receiver that acquires data to be written in the memory and a write address at which the data is to be written from a writer which requests the data to be written in the memory;

a parity generator that generates parity of data to be written in the memory;

a parity adder that adds the parity generated by the parity generator to the data to generate a parity-added data;

a writer syndrome generator that generates a writer syndrome of writer mask data to mask the parity-added data, the writer syndrome being associated with a writer access ID used when the writer accesses the memory;

a write mask generator that generates the writer mask data based on the writer syndrome, the writer access ID, and a write address;

a first XOR calculator that obtains first post-operation data by calculating an XOR between the parity-added data and the writer mask data;

a write address converter that converts the write address into another address determined by the writer access ID; and a write unit that writes the first post-operation data to the address converted by the write address converter, wherein the read unit reads the first post-operation data from the address converted by the write address converter.

9. The apparatus according to claim 8, further comprising: a data storage that stores the data and the write address which are acquired by the write request receiver, and the writer access ID in the cache memory associated with each other.

10. An access control system comprising:
a processor;
a memory controller; and
a memory access control apparatus that controls access to a memory, wherein
the memory access control apparatus includes:
a parity generator that generates a parity of write data to be written in the memory;
a parity adder that adds the parity to the write data to generate parity-added data;
a writer syndrome generator that generates a writer syndrome of writer mask data to mask the parity-added data, the writer syndrome being associated with a writer access ID used when a writer accesses the memory, the writer requesting writing of the write data into the memory;
a write mask generator that generates the writer mask data based on the writer syndrome, the writer access ID, and a write address in the memory at which the writer writes the write data;
a first XOR calculator that obtains first post-operation data by calculating an XOR between the parity-added data and the writer mask data;
a write address converter that converts the write address into another address determined by the writer access ID;
a write unit that writes the first post-operation data to the address converted by the write address converter;
a reader syndrome generator that generates a reader syndrome of reader mask data to mask the first post-operation data, the reader syndrome being associated with a reader access ID used when a reader accesses the memory, the reader requesting reading of data from the memory;
a reader mask generator that generates the reader mask data based on the reader syndrome, the reader access ID, and a read address at which the reader data is to be read;
a read address converter that converts the read address into another address determined based on the reader access ID;
a read unit that reads the first post-operation data from the address converted by the read address converter;
a second XOR calculator that obtains second post-operation data by calculating an XOR between the reader mask data and the first post-operation data;
a data syndrome calculator that calculates an actual data syndrome from the second post-operation data; and
an output determining unit that determines whether the second post-operation data is to be output as the read data which is requested by the reader to read, based on the actual data syndrome.

11. An access control system comprising:
a processor; and
a memory access control apparatus that controls access to a memory, wherein
the memory access control apparatus includes:
a parity generator that generates a parity of write data to be written in the memory;
a parity adder that adds the parity generated by the parity generator to the write data to generate parity-added data;
a writer syndrome generator that generates a writer syndrome of writer mask data to mask the parity-added data, the writer syndrome being associated with a writer access ID used when a writer accesses the memory, the writer requesting writing of the write data into the memory;
a write mask generator that generates the writer mask data based on the writer syndrome, the writer access ID, and a write address in the memory at which the writer writes the write data;
a first XOR calculator that obtains first post-operation data by calculating an XOR between the parity-added data and the writer mask data;
a write address converter that converts the write address into another address determined by the writer access ID;
a write unit that writes the first post-operation data to the address converted by the write address converter;
a reader syndrome generator that generates a reader syndrome of reader mask data to mask the first post-operation data, the reader syndrome being associated with a reader access ID used when a reader accesses the memory, the reader requesting reading of data from the memory;
a reader mask generator that generates the reader mask data based on the reader syndrome, the reader access ID, and a read address at which the reader data is to be read;
a read address converter that converts the read address into another address determined based on the reader access ID;
a read unit that reads the first post-operation data from the address converted by the read address converter;
a second XOR calculator that obtains second post-operation data by calculating an XOR between the reader mask data and the first post-operation data;
a data syndrome calculator that calculates an actual data syndrome from the second post-operation data; and
an output determining unit that determines whether the second post-operation data is to be output as the read data which is requested by the reader to read, based on the actual data syndrome.

12. An access control system comprising:
a processor;
a memory controller; and
a memory access control apparatus that controls access to a memory, wherein
the memory access control apparatus includes:
a read request receiver that acquires data to be read from the memory, and a read address of the data from a reader which requests read out of data from the memory;
a cache monitor that determines whether the read address acquired by the read request receiver is stored in a cache memory, where the cache memory stores data requested by a writer which requests data to be written in the memory or the reader, an address of the data, and a requester access ID used when the writer or the reader capable of accessing the data accesses the memory, the data, the address, and the requester access ID being associated with each other;
a reader syndrome generator that generates a reader syndrome of the reader mask data to mask the data stored in the memory, the reader syndrome being associated with the reader access ID used when the reader accesses the memory, when the cache monitoring unit determines that the read address acquired by the read request receiver is not stored in the cache memory;

a reader mask generator that generates the reader mask data based on the reader syndrome, the reader access ID, and the read address;
a read address converter that converts the address acquired by the read request receiver to another address determined by the reader access ID;
a read unit that reads first post-operation data subjected to a predetermined calculation to the data from the address converted by the read address converter;
a first XOR calculator that obtains second post-operation data by calculating an XOR between the reader mask data and the first post-operation data read by the read unit;
a data syndrome calculator that calculates an actual data syndrome from the second post-operation data; and
an output determining unit that determines whether the second post-operation data is output as the data which is requested by the reader to be read, based on the actual data syndrome.

13. An access control system comprising:
a processor; and
a memory access control apparatus that controls access to a memory, wherein
the memory access control apparatus includes:
a read request receiver that acquires data to be read from the memory, and a read address of the data from a reader which requests read out of data from the memory;
a cache monitor that determines whether the read address acquired by the read request receiver is stored in a cache memory, where the cache memory stores data requested by a writer which requests data to be written in the memory or the reader, a address of the data, and a requester access ID used when the writer or the reader capable of accessing the data accesses the memory, the data, the address, and the requester access ID being associated with each other;
a reader syndrome generator that generates a reader syndrome of the reader mask data to mask the data stored in the memory, the reader syndrome being associated with the reader access ID used when the reader accesses the memory, when the cache monitoring unit determines that the read address acquired by the read request receiver is not stored in the cache memory;
a reader mask generator that generates the reader mask data based on the reader syndrome, the reader access ID, and the read address;
a read address converter that converts the address acquired by the read request receiver to another address determined by the reader access ID;
a read unit that reads first post-operation data subjected to a predetermined calculation to the data from the address converted by the read address converter;
a first XOR calculator that obtains second post-operation data by calculating an XOR between the reader-mask data and the first post-operation data read by the read unit;
a data syndrome calculator that calculates an actual data syndrome from the second post-operation data; and
an output determining unit that determines whether the second post-operation data is output as the data which is requested by the reader to be read, based on the actual data syndrome.

14. A processor comprising:
a memory controller; and
a memory access control apparatus that controls access to a memory, wherein
the memory access control apparatus includes:
a parity generator that generates a parity of write data to be written in the memory;
a parity adder that adds the parity generated by the parity generator to the write data to generate parity-added data;
a writer syndrome generator that generates-a writer syndrome of writer mask data to mask the parity-added data, the writer syndrome being associated with a writer access ID used when a writer accesses the memory, the writer requesting writing of the write data into the memory;
a write mask generator that generates the writer mask data based on the writer syndrome, the writer access ID, and a write address in the memory at which the writer writes the write data;
a first XOR calculator that obtains first post-operation data by calculating an XOR between the parity-added data and the writer mask data;
a write address converter that converts the write address into another address determined by the writer access ID;
a write unit that writes the first post-operation data to the address converted by the write address converter;
a reader syndrome generator that generates a reader syndrome of reader mask data to mask the first post-operation data, the reader syndrome being associated with a reader access ID used when a reader accesses the memory, the reader requesting reading of data from the memory;
a reader mask generator that generates the reader mask data based on the reader syndrome, the reader access ID, and a read address at which the reader data is to be read;
a read address converter that converts the read address into another address determined based on the reader access ID;
a read unit that reads the first post-operation data from the address converted by the read address converter;
a second XOR calculator that obtains second post-operation data by calculating an XOR between the reader mask data and the first post-operation data;
a data syndrome calculator that calculates an actual data syndrome from the second post-operation data; and
an output determining unit that determines whether the second post-operation data is to be output as the read data which is requested by the reader to read, based on the actual data syndrome.

15. An access control method to control an access among a writer, a reader, and a memory, comprising:
generating a parity of write data to be written in the memory;
adding the parity generated to the write data to generate parity-added data;
generating a writer syndrome of writer mask data to mask the parity-added data, the writer syndrome being associated with a writer access ID used when the writer accesses the memory, the writer requesting writing of the write data into the memory;
generating the writer mask data based on the writer syndrome, the writer access ID, and a write address in the memory at which the writer writes the write data;
obtaining first post-operation data by calculating an XOR between the parity-added data and the writer mask data;
converting the write address into another address determined by the writer access ID;
writing the first post-operation data to the address converted;
generating a reader syndrome of reader mask data to mask the first post-operation data, the reader syndrome being associated with a reader access ID used when the reader accesses the memory, the reader requesting reading of data from the memory;

generating the reader mask data based on the reader syndrome, the reader access ID, and a read address at which the reader data is to be read;

converting the read address into another address determined based on the reader access ID;

reading the first post-operation data from the address converted;

obtaining second post-operation data by calculating an XOR between the reader mask data and the first post-operation data;

calculating an actual data syndrome from the second post-operation data; and determining whether the second post-operation data is to be output as the read data which is requested by the reader to read, based on the actual data syndrome.

16. A memory access control method to control an access among a writer, a reader, and a memory, comprising:

acquiring data to be read from the memory, and a read address of the data from the reader which requests read out of data from the memory;

determining whether the read address is stored in a cache memory, where the cache memory stores data requested by the writer which requests data to be written in the memory or the reader, a address of the data, and a requester access ID used when the writer or the reader capable of accessing the data accesses the memory, the data, the address, and the requester access ID being associated with each other;

generating a reader syndrome of the reader mask data to mask the data stored in the memory, the reader syndrome being associated with the reader access ID used when the reader accesses the memory, when the read address is determined not to be stored in the cache memory;

generating the reader mask data based on the reader syndrome, the reader access ID, and the read address;

converting the address to another address determined by the reader access ID;

reading first post-operation data subjected to a predetermined calculation to the data from the address converted;

obtaining second post-operation data by calculating an XOR between the reader mask data and the first post-operation data;

calculating an actual data syndrome from the second post-operation data; and determining whether the second post-operation data is output as the data which is requested by the reader to be read, based on the actual data syndrome.

* * * * *

UNITED STATES PATENT AND TRADEMARK OFFICE
CERTIFICATE OF CORRECTION

PATENT NO. : 7,653,861 B2
APPLICATION NO. : 11/523003
DATED : January 26, 2010
INVENTOR(S) : Kanai et al.

It is certified that error appears in the above-identified patent and that said Letters Patent is hereby corrected as shown below:

Claim 14, column 44, line 5, change "generates-a" to --generates a--.

Signed and Sealed this

Thirteenth Day of April, 2010

David J. Kappos
*Director of the United States Patent and Trademark Office*